United States Patent
Mitsuya et al.

(10) Patent No.: US 8,233,062 B2
(45) Date of Patent: Jul. 31, 2012

(54) IMAGE PROCESSING APPARATUS, IMAGE PROCESSING METHOD, AND IMAGING APPARATUS

(75) Inventors: Koji Mitsuya, Tokyo (JP); Tohru Kurata, Saitama (JP); Nobuyuki Matsushita, Kanagawa (JP)

(73) Assignee: Sony Corporation (JP)

( * ) Notice: Subject to any disclaimer, the term of this patent is extended or adjusted under 35 U.S.C. 154(b) by 254 days.

(21) Appl. No.: 12/657,469

(22) Filed: Jan. 21, 2010

(65) Prior Publication Data

US 2010/0188535 A1     Jul. 29, 2010

(30) Foreign Application Priority Data

Jan. 23, 2009    (JP) ................................ P2009-012556

(51) Int. Cl.
H04N 5/217        (2011.01)
(52) U.S. Cl. ....................................................... 348/241
(58) Field of Classification Search .. 348/208.4–208.16, 348/241
See application file for complete search history.

(56) References Cited

U.S. PATENT DOCUMENTS

| | | | |
|---|---|---|---|
| 6,778,210 B1 | 8/2004 | Sugahara et al. |
| 7,634,143 B2 | 12/2009 | Saito |
| 2008/0175510 A1 | 7/2008 | Matsushita |

FOREIGN PATENT DOCUMENTS

| | | |
|---|---|---|
| JP | 2001-086398 A | 3/2001 |
| JP | 2005175671 | 6/2005 |
| JP | 2005-321902 A | 11/2005 |
| JP | 2008-177801 A | 7/2008 |

OTHER PUBLICATIONS

Office Action from Japanese Application No. 2009-012556, dated Feb. 15, 2011.

*Primary Examiner* — Sinh Tran
*Assistant Examiner* — Mark Monk
(74) *Attorney, Agent, or Firm* — Lerner, David, Littenberg, Krumholz & Mentlik, LLP

(57) ABSTRACT

An image processing apparatus includes an image adding unit to perform noise reduction processing in the spatial direction by adding multiple images while performing motion compensation, an intra-screen noise reducing unit to perform noise reduction processing in the spatial direction within one image for each of the multiple images before adding with the image adding unit, and a control unit to vary the noise reduction strength in the spatial direction by the intra-screen noise reduction unit as to the multiple images to be added with the image adding unit.

10 Claims, 32 Drawing Sheets

OPTICAL SHOT NOISE FEATURE

RANDOM NOISE

FIG. 20

(EXPRESSION 3) AFFINE TRANSFORM $$\begin{bmatrix} v \\ w \end{bmatrix} = \begin{bmatrix} a & b & c \\ d & e & f \end{bmatrix} \begin{bmatrix} x \\ y \\ 1 \end{bmatrix} = \begin{bmatrix} a \cdot x + b \cdot y + c \\ d \cdot x + e \cdot y + f \end{bmatrix}$$

FIG. 21

(EXPRESSION 4)
APPLICATION 1 OF LEAST SQUARE AS TO AFFINE TRANSFORM $$Vn = \begin{bmatrix} a & b & c \\ d & e & f \end{bmatrix} \begin{bmatrix} xn \\ yn \\ 1 \end{bmatrix}$$

$$\varepsilon n^2 = \left| Vn - \begin{bmatrix} vn \\ wn \end{bmatrix} \right|^2$$

$$\varepsilon^2 = \sum \varepsilon n^2$$
$$= \sum \{(a \cdot xn + b \cdot yn + c - vn)^2 + (d \cdot xn + e \cdot yn + f - wn)^2\}$$

WHERE $xn$ = HORIZONTAL COMPONENT OF CENTER COORDINATE OF EACH BLOCK n
$yn$ = VERTICAL COMPONENT OF CENTER COORDINATE OF EACH BLOCK n
$vn$ = HORIZONTAL COMPONENT OF MOTION VECTOR OF EACH BLOCK n
$wn$ = VERTICAL COMPONENT OF MOTION VECTOR OF EACH BLOCK n
$Vn$ = THEORETICAL VECTOR OF EACH BLOCK n, FOUND FROM AFFINE TRANSFORM
$\varepsilon n$ = DIFFERENCE (DISTANCE) BETWEEN MOTION VECTOR OF EACH BLOCK n AND THEORETICAL THEORY VECTOR
$\varepsilon$ = SUM TOTAL OF $\varepsilon n$

FIG. 22

(EXPRESSION 5)
APPLICATION 2 OF LEAST SQUARE AS TO AFFINE TRANSFORM

FROM $\dfrac{\partial \varepsilon^2}{\partial a}=0,\ \dfrac{\partial \varepsilon^2}{\partial b}=0,\ \dfrac{\partial \varepsilon^2}{\partial c}=0$ $a \cdot x2 + b \cdot xy + c \cdot x = vx$ ⋯1
$a \cdot xy + b \cdot y2 + c \cdot y = vy$ ⋯2
$a \cdot x + b \cdot y + c \cdot n = v$ ⋯3

WHERE
n = SUM TOTAL OF BLOCK
$x2 = \Sigma x^2$
$xy = \Sigma xy$
$y2 = \Sigma y^2$
$x = \Sigma x$
$y = \Sigma y$
$vx = \Sigma vx$
$vy = \Sigma xy$
$v = \Sigma v$

FIG. 23

(EXPRESSION 6)
APPLICATION 3 OF LEAST SQUARE AS TO AFFINE TRANSFORM
FROM 1, 2, 3 OF (EXPRESSION 5)

$$a = \frac{(n \cdot y2 - y^2)(n \cdot vx - v \cdot x) - (n \cdot xy - x \cdot y)(n \cdot vy - v \cdot y)}{(n \cdot x2 - x^2)(n \cdot y2 - y^2) - (n \cdot xy - x \cdot y)^2}$$

$$b = \frac{(n \cdot xy - x \cdot y)(n \cdot vx - v \cdot x) - (n \cdot x2 - x^2)(n \cdot vy - v \cdot y)}{(n \cdot xy - x \cdot y)^2 - (n \cdot x2 - x^2)(n \cdot y2 - y^2)}$$

$$c = \frac{(x \cdot y2 - xy \cdot y)(x \cdot vx - v \cdot x2) - (xy \cdot x - x2 \cdot y)(vy \cdot x - v \cdot xy)}{(n \cdot y2 - xy \cdot y)(x2 - n \cdot x2) - (xy \cdot x - x2 \cdot y)(x \cdot y - n \cdot xy)}$$

FIG. 24

(EXPRESSION 7)
APPLICATION 4 OF LEAST SQUARE AS TO AFFINE TRANSFORM

$$d = \frac{(n \cdot y2 - y^2)(n \cdot wx - w \cdot x) - (n \cdot xy - x \cdot y)(n \cdot wy - w \cdot y)}{(n \cdot x2 - x^2)(n \cdot y2 - y^2) - (n \cdot xy - x \cdot y)^2}$$

$$e = \frac{(n \cdot xy - x \cdot y)(n \cdot wx - w \cdot x) - (n \cdot x2 - x^2)(n \cdot wy - w \cdot y)}{(n \cdot xy - x \cdot y)^2 - (n \cdot x2 - x^2)(n \cdot y2 - y^2)}$$

$$f = \frac{(x \cdot y2 - xy \cdot y)(x \cdot wx - w \cdot x2) - (xy \cdot x - x2 \cdot y)(wy \cdot x - w \cdot xy)}{(n \cdot y2 - xy \cdot y)(x2 - n \cdot x2) - (xy \cdot x - x2 \cdot y)(x \cdot y - n \cdot xy)}$$

WHERE $wx = \Sigma wx$
$wy = \Sigma wy$
$w = \Sigma w$

FIG. 36

| GAIN GA | HIT RATE $\beta$ | ADDITION RATE $\alpha$ AS TO STANDARD ADDITION RATE $\alpha_0$ (MULTIPLES) |
|---|---|---|
| 0 | 0 | ONE TIME ($\alpha = \alpha_0$) |
| | 0.25 | 1.25 TIMES ($\alpha = \alpha_0 + 0.25\alpha_0$) |
| | 0.5 | 1.5 TIMES ($\alpha = \alpha_0 + 0.5\alpha_0$) |
| | 1.0 | 2 TIMES ($\alpha = \alpha_0 + \alpha_0$) |
| 1 | 0 | ONE TIME ($\alpha = \alpha_0$) |
| | 0.25 | 1.5 TIMES ($\alpha = \alpha_0 + 0.5\alpha_0$) |
| | 0.5 | 2 TIMES ($\alpha = \alpha_0 + \alpha_0$) |
| | 1.0 | 3 TIMES ($\alpha = \alpha_0 + 2\alpha_0$) |
| 2 | 0 | ONE TIME ($\alpha = \alpha_0$) |
| | 0.25 | 2 TIMES ($\alpha = \alpha_0 + \alpha_0$) |
| | 0.5 | 3 TIMES ($\alpha = \alpha_0 + 2\alpha_0$) |
| | 1.0 | 5 TIMES ($\alpha = \alpha_0 + 4\alpha_0$) |
| 3 | 0 | ONE TIME ($\alpha = \alpha_0$) |
| | 0.25 | 3 TIMES ($\alpha = \alpha_0 + 2\alpha_0$) |
| | 0.5 | 5 TIMES ($\alpha = \alpha_0 + 4\alpha_0$) |
| | 1.0 | 9 TIMES ($\alpha = \alpha_0 + 8\alpha_0$) |

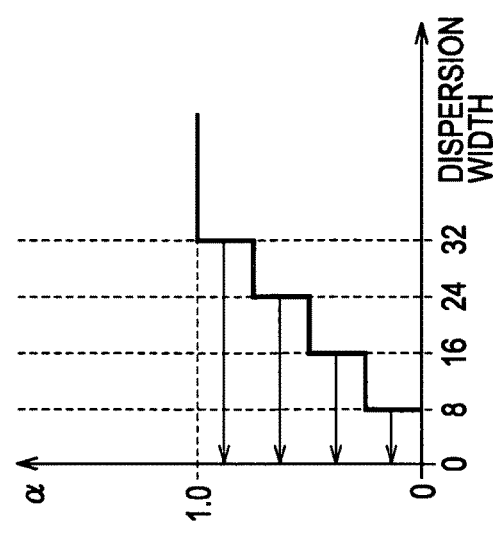
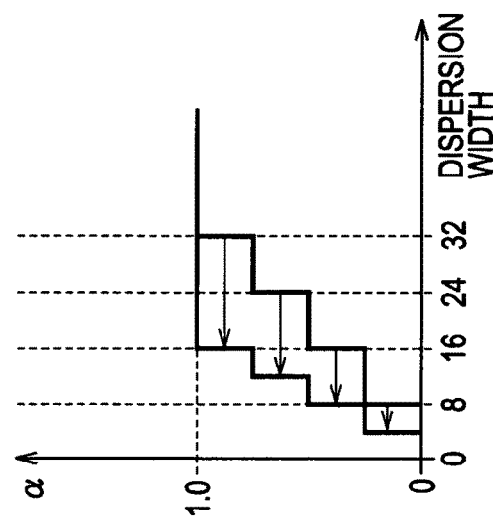
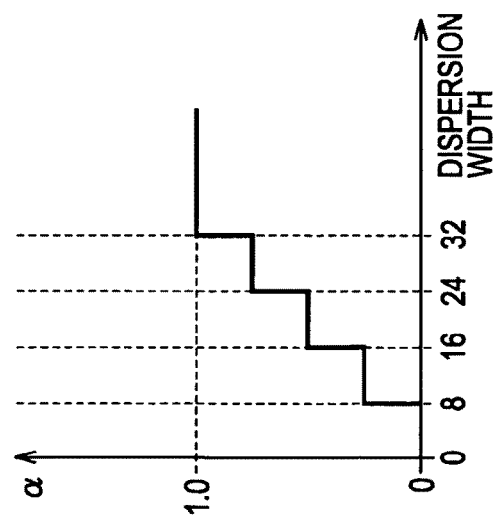

FIG. 38

| GAIN GA | HIT RATE β | STEP WIDTH |
|---|---|---|
| 0 | 0 | 8 |
| | 0.25 | 8 |
| | 0.5 | 8 |
| | 1.0 | 4 |
| 1 | 0 | 8 |
| | 0.25 | 8 |
| | 0.5 | 4 |
| | 1.0 | 2 |
| 2 | 0 | 8 |
| | 0.25 | 4 |
| | 0.5 | 2 |
| | 1.0 | 1 |
| 3 | 0 | 8 |
| | 0.25 | 2 |
| | 0.5 | 1 |
| | 1.0 | 0 |

FIG. 41

$$f_i = \frac{\sum_j w(i,j) d_j}{\sum_j w(i,j)}$$

$w(i,j) = w_s(x_i, x_j) w_d(d_i, d_j)$ ... (EXPRESSION 10)

$w_s(x_i, x_j)$: WEIGHTING COEFFICIENT DETERMINED WITH POSITION $x_i$ OF PIXEL $p_i$ AND POSITION $x_j$ OF PIXEL $p_j$ $w_d(d_i, d_j)$: WEIGHTING COEFFICIENT DETERMINED WITH POSITION $d_i$ OF PIXEL $p_i$ AND POSITION $d_j$ OF PIXEL $p_j$

IMAGE PROCESSING APPARATUS, IMAGE PROCESSING METHOD, AND IMAGING APPARATUS

CROSS-REFERENCE TO RELATED APPLICATION

The present application claims priority from Japanese Patent Application No. JP 2009-012556 filed in the Japanese Patent Office on Jan. 23, 2009, the entire content of which is incorporated herein by reference.

BACKGROUND OF THE INVENTION

1. Field of the Invention

The present invention relates to an image processing apparatus, image processing method, and imaging apparatus to enable noise reduction in an image that has been imaged with an imaging device, for example.

2. Description of the Related Art

For example, with an imaging apparatus such as a digital still camera or the like, various types of methods have been provided heretofore as methods to reduce noise in an imaged image. For example, in Japanese Unexamined Patent Application Publication No. 2008-177801 is disclosed a method of noise reduction processing in the spatial direction within one imaged image (hereafter this noise reduction processing will be referred to as "intra-screen NR" (NR is an abbreviation of "Noise Reduction")).

That is to say, in Japanese Unexamined Patent Application Publication No. 2008-177801 is disclosed the reduction or removal of noise components within one image of each of imaged images, by performing intra-screen NR processing using an $\epsilon$ filter or bilateral filter. This is primarily to remove optical shot noise of the imaging devices such as CCD (Charge Coupled Device) and CMOS (Complementary Metal Oxide Semiconductor). Therefore, the intra-screen NR processing is performed as to a RAW image from the imaging device.

With the intra-screen NR processing, post-processing pixel output for a pixel of interest is obtained by setting a window region surrounding the pixel of interest and performing processing for multiple pixels included in the window region.

The $\epsilon$ filter is a filter to perform noise reduction by leaving the edge portions and outputting an average value. That is to say, the $\epsilon$ filter calculates a absolute value of difference between the pixel value of the pixel of interest and the pixel values of the other pixels in the window region, selects the pixels having absolute values of difference that are at or below a predetermined threshold and executes average valuing processing, and the obtained average value is set as the pixel value of the pixel of interest.

Also, similar to the $\epsilon$ filter, the bilateral filter is a conditional average value filter. The bilateral filter performs average valuing processing using a weighted coefficient Wd that is dependent on the difference between the pixel values of the pixel of interest and the other pixels in the window region, and the weighted coefficient Ws that is dependent on the distance between the pixel of interest and the other pixels mentioned above.

That is to say, the post filter processing pixel value fi of a certain pixel of interest Pi (where i is the pixel position within one pixel screen) is expressed as shown in Expression 10 in FIG. 41.

In the case of using this bilateral filter, noise reduction can be made more smoothly while further retaining the edge portions, more so than in the case of using an $\epsilon$ filter, and improvements in image quality can be expected.

Methods of intra-screen NR processing may include not only the methods described above that use an $\epsilon$ filter or bilateral filter, but also methods that have a lower capability from the perspective of maintaining the edge portions but use a robust filter, or methods that use a medial filter.

Techniques of noise reduction of the imaged image are not only the above-described intra-screen NR, but methods to reduce noise in the temporal direction by adding multiple imaged images have also been proposed.

For example, in Japanese Unexamined Patent Application Publication No. 2001-86398 is disclosed a technique for sensor-less shaking correction for a still image. That is to say, in Japanese Unexamined Patent Application Publication No. 2001-86398 is disclosed a method to take multiple images with a high-speed shutter operation such that shaking does not occur, and considering the effects of shaking, layers low illuminance images that have been taken, to obtain one still image having high illuminance. This technique is based on an idea that if continuously taken images are layered, the noise that is random components is dispersed, whereby noise is reduced, and from the perspective of noise reduction is a technique similar to a frame NR (noise reduction) for moving images. The moving image frame NR method is a technique to layer the current frame and reference frame in real-time, and the current frame and reference frame are constantly layered with a 1:1 ratio.

On the other hand, in the case of still image noise reduction, the reference frame for one current frame normally becomes multiple frames. According to the still image noise reduction method, the higher the shutter speed the more the influence of shaking is reduced, and as the number of layers increase, greater noise reduction effects and greater sensitivity can be expected.

By layering multiple images, the method in Japanese Unexamined Patent Application Publication No. 2001-86398 for noise reduction is performed as to YC data (made up of luminance component Y and color component C) after gamma correction or the like is performed, not as to a RAW image from the image device.

SUMMARY OF THE INVENTION

As described above, the intra-screen NR processing and addition NR processing have different applicable image information, and addition NR processing can be performed as an imaged image that has been subjected to intra-screen NR processing. That is to say, intra-screen NR processing and addition NR processing can both be performed as to an imaged image signal.

In this case, the intra-screen NR processing is normally performed as to each imaged image constantly with a uniform noise reduction strength. Generally, intra-frame NR processing is performed as to each imaged image wherein shot noise that is generated with an imaging device is at a noise reduction strength reduced as much as possible.

Now, with intra-screen NR processing, a pixel value wherein the correlation value (absolute value of difference, etc) between the two pixels of the pixel of interest within the window region and other periphery pixels that is at or below a threshold $\theta$th is selected and averaging processing is performed, thereby reducing noise.

Accordingly, with the intra-screen NR processing, while noise that is at or below the threshold can be reduced, signal components that are smaller than the threshold are suppressed by the averaging processing. Even if adding of multiple imaged images is performed with addition NR processing, the suppressed signal components are not recovered, whereby there are cases wherein signal components are further deteriorated.

Therefore, the imaged image that is the result of performing intra-screen NR processing and addition NR processing becomes a generally unclear image because the detail information of the image information is deleted by the suppressed signal components. This will be described further using FIG. 42 and subsequent drawings.

FIGS. 42 and 43 are diagrams showing the state of noise riding on an imaged image signal from the imaging device. The bold line in step form shows the imaged image signal component Ss, and the fine line for higher frequency thereof shows the noise component Ns.

FIG. 42 shows the case wherein the threshold θth is smaller than the imaged image signal component Ss. In this case, the noise component Ns that is smaller than the threshold θth can be suppressed, but the noise component Ns that is greater than the threshold θth is not suppressed and therefore remains. On the other hand, the imaged image signal component Ss is greater than the threshold θth, so is saved without being suppressed.

That is to say, as shown in FIG. 42, in the case that the threshold θth is smaller than the imaged image signal component Ss, the noise reduction strength is weak, but the imaged image signal component Ss is saved without being suppressed.

Conversely, FIG. 43 illustrates a case wherein the threshold θth is greater, and the strength of the noise reduction is strengthened. In this case, most of the noise components Ns are at or below the threshold θth, whereby the noise components Ns can be suppressed favorably. However, the imaged image signal components Ss that are smaller than the threshold θth as shown in FIG. 43 are suppressed similar to the noise and eliminated.

In order to reduce the shot noise generated with the imaging device as much as possible, the noise reduction is strengthened. Strengthening the noise reduction by the intra-screen NR processing means to increase the threshold θth as shown in FIG. 43. Accordingly, as shown in FIG. 43, with the intra-screen NR processing, the signal components smaller than the threshold θth often are suppressed.

The signal components smaller than the threshold θth being suppressed means that the signal of the steep edge portions as shown by the dotted lines in FIG. 44 become a dulled signal Ss as shown by the solid lines in FIG. 44. With the addition NR processing, the two images to be added are added without position shifting due to position matching by a motion compensation, but in the case of shaking, or when motion compensation is not complete for the moving portion in a subject, position shifting occurs between the two pixels to be added.

Thus, in the case that there is position shifting between the two pixels to be added, the image signal Ss1 and Ss2 of the two image signals to be added are shifted from one another, as shown in FIG. 45, whereby the addition result thereof becomes an image signal Ss3, and becomes a further dulled signal.

With the addition NR processing, in the case that the two images to be added are added without position shifting due to position matching by a motion compensation, further dulling such as shown in FIG. 45 does not occur. However, even in this case, the dulling of the signal due to the intra-screen NR processing may become more prominent, as a result of the reduced noise remaining from the intra-screen NR processing. That is to say, the dulling of the signal generated with the intra-screen NR processing may not be prominent as an image because of the remaining noise components, but with the reduction/removal of the remaining noise components with the addition NR processing, the dulling of the signal thereof may become more prominent as an image.

Thus, if the strength of the noise reduction in the intra-screen NR processing is lowered and the threshold is made smaller so as to suppress the signal components to as little as possible, the signal components can remain, but on the other hand the noise reduction effect is weakened.

Also, with the intra-screen NR processing, determining an appropriate noise reduction strength that can achieve both a noise reduction effect and saving the signal components has been extremely difficult.

It has been found desirable to provide an image processing apparatus and method that can achieve both a noise reduction effect and saving of the signal components in the case of performing intra-screen NR processing and addition NR processing as to the image information.

An image processing apparatus according to an embodiment of the present invention includes: an image adding unit to perform noise reduction processing in the spatial direction by adding multiple images while performing motion compensation;

an intra-screen noise reducing unit to perform noise reduction processing in the spatial direction within one image for each of the multiple images, before adding with the image adding unit; and a control unit to vary the noise reduction strength in the spatial direction by the intra-screen noise reduction unit as to the multiple images to be added by the image adding unit.

According to the configuration described above, the noise reduction strength in the spatial direction for the multiple images subject to adding processing are not uniform, but can be changed with the control unit.

For example, with the control unit, the noise reduction strength in the spatial direction by the intra-screen noise reduction unit can be strengthened for one of the multiple images subject to the adding processing, and weakened for other images.

For the images subjected to strong noise reduction in the spatial direction by the intra-screen noise reduction unit, the noise in the spatial direction is suppressed, while the signal components are also suppressed. However, for the other images subjected to weak noise reduction in the spatial direction by the intra-screen noise reduction unit, the noise remains and the signal components are saved without being suppressed.

The other images that have had the signal components saved are added in the temporal direction by the image adding unit to the image that has had the signal components suppressed by the intra-screen noise reduction unit. With this image adding in the temporal direction, the signal components that have been suppressed with the intra-screen noise reduction unit are restored.

Accordingly, the signal components are restored in the image adding while performing strong intra-screen noise reduction, and an image output is obtained with favorable noise reduction effects.

Particularly, in the case of the imaged image, when the first image is subjected to strong noise reduction with the intra-screen noise reduction unit, even if the noise reduction in the temporal direction is weak by adding with the other images, maximum intra-screen noise reduction effects can be maintained in the moving subject region.

According to the above configuration, signal components are restored in the image adding while performing strong intra-screen noise reduction, and an image output is obtained with favorable noise reduction effects.

BRIEF DESCRIPTION OF THE DRAWINGS

FIG. 20 is a diagram to describe an Expression used to describe a processing example to find global motion from a local motion vector of an embodiment of the image processing apparatus according to the present invention;

FIG. 21 is a diagram to describe an Expression used to describe a processing example to find global motion from a local motion vector of an embodiment of the image processing apparatus according to the present invention;

FIG. 22 is a diagram to describe an Expression used to describe a processing example to find global motion from a local motion vector of an embodiment of the image processing apparatus according to the present invention;

FIG. 23 is a diagram to describe an Expression used to describe a processing example to find global motion from a local motion vector of an embodiment of the image processing apparatus according to the present invention;

FIG. 24 is a diagram to describe an Expression used to describe a processing example to find global motion from a local motion vector of an embodiment of the image processing apparatus according to the present invention;

FIG. 36 is a diagram used to describe a configuration example of one example of an addition rate calculating unit according to an embodiment of the present invention;

FIGS. 37A through 37C are diagrams used to describe a configuration example of one example of an addition rate calculating unit according to an embodiment of the present invention;

FIG. 38 is a diagram used to describe a configuration example of one example of an addition rate calculating unit according to an embodiment of the present invention;

FIG. 41 is a diagram used to describe intra-screen NR processing;

DESCRIPTION OF THE PREFERRED EMBODIMENTS

A case of applying embodiments of the image processing apparatus and image processing method according to the present invention to an imaging apparatus for taking still images will be described with reference to the diagrams.

The imaging apparatus according to the present embodiment performs intra-screen NR processing with an intra-screen NR processing unit as to a still image imaged by an imaging device (imager), followed by addition NR processing performed to add multiple still images from the intra-screen NR processing unit in the temporal direction, layering which position-matching the still images. Thus, the imaging apparatus according to the present embodiment obtains the still images subjected to noise reduction in the spatial direction and temporal direction and records these on a recording medium.

Hardware Configuration Example of Imaging Apparatus

Figure 1:
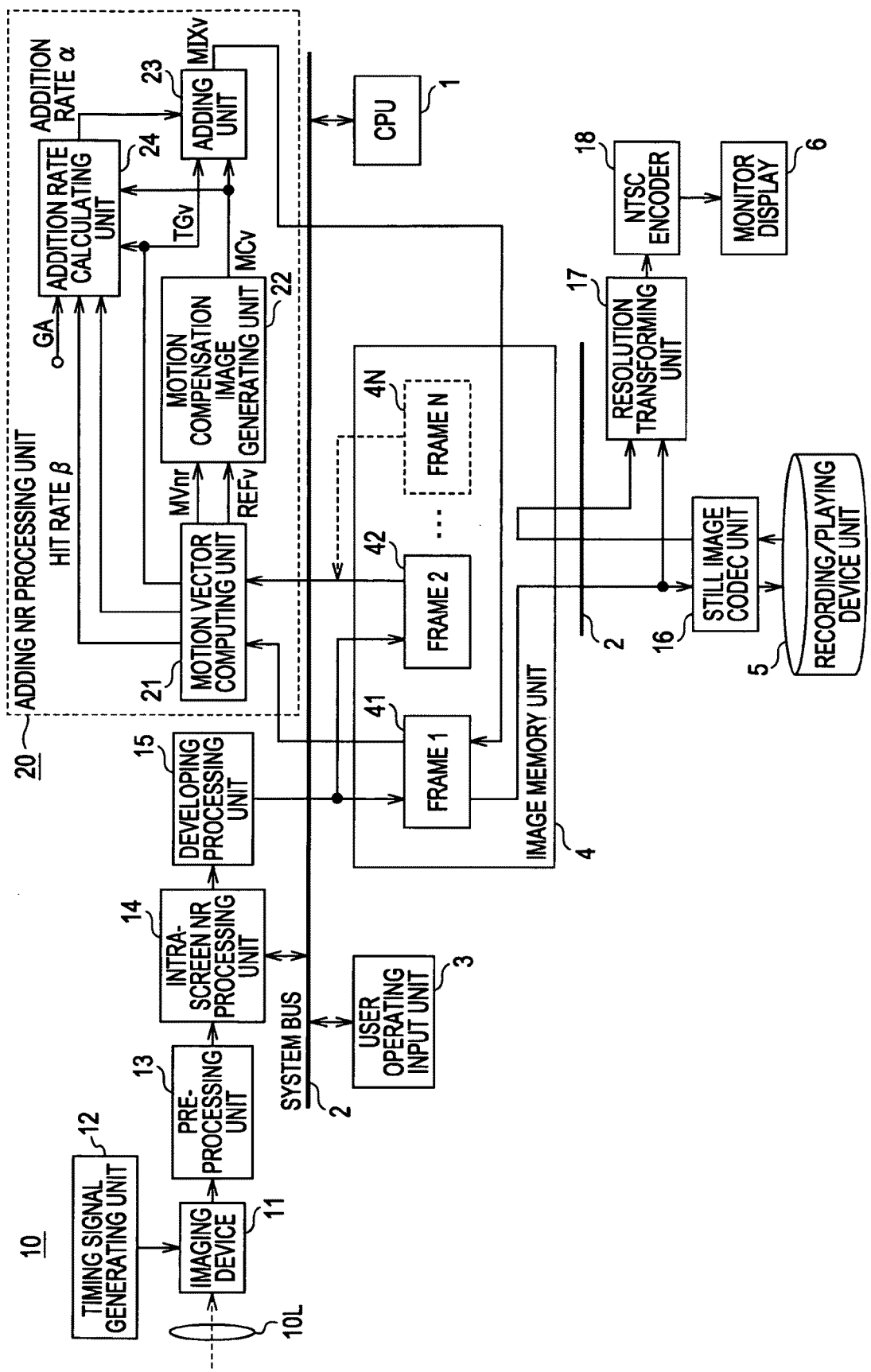
FIG. 1 is a block diagram illustrating a configuration example of an imaging apparatus to which an embodiment of the present invention is applied.
Figure 2:
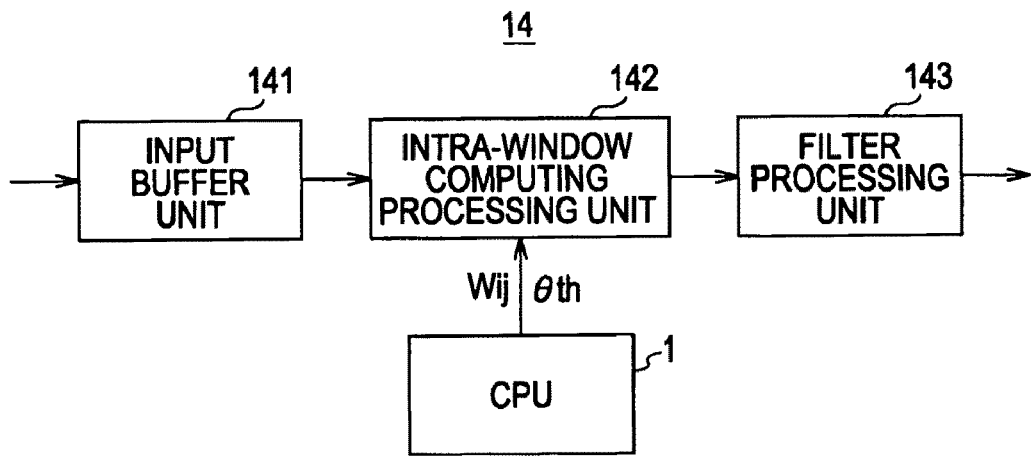
FIG. 2 is a block diagram illustrating a configuration example of an intra-screen NR processing unit to which an embodiment of the present invention is applied.

FIG. 1 shows a block diagram of an example of an imaging apparatus serving as an embodiment of the image processing apparatus of the present invention. As shown in FIG. 1, the imaging apparatus of the present embodiment has a CPU (Central Processing Unit) 1 connected to a system bus 2. Also, the imaging apparatus is configured so that the system bus 2 is connected to a user operating input unit 3, image memory unit 4, recording playing apparatus unit 5, and so forth. Note that according to the present Specification, the CPU 1 will be omitted from the diagrams but includes ROM (Read Only Memory) that stores various programs that perform software processing and RAM (Random Access Memory) for a work area, and so forth.

An image signal processing system of the imaging apparatus in FIG. 1 receives imaging recording start operations through the user operating input unit 3, and performs recording processing of imaged image data of a still image as described later. Also, the imaging apparatus in FIG. 1 receives playing start operation of the imaging recording image through the user operating input unit 3, and performs playing processing of the imaged image data recorded in the recording medium of the recording playing apparatus unit 5.

As shown in FIG. 1, at the imaging signal processing system 10, incident light from a subject through a camera optical system having an imaging lens 10L (omitted in diagram) is irradiated in the imaging device 11 and imaged. In this example, the imaging device 11 is made up of a CCD (Charge Coupled Device) imager. Note that the imaging device 11 may be configured with a CMOS (Complementary Metal Oxide Semiconductor).

With the imaging apparatus in this example, upon an imaging recording start operation being performed, the image input through the imaging lens 10L is converted in the imaged image signal by the imaging device 11. Analog imaging signals that are RAW signals (raw signals) of a Bayer array made up of three primary colors of red (R), green (G), and blue (B) as signal synchronized to the timing signal from the timing signal generating unit 12 are output from the imaging device 11. The output analog imaging signal is supplied to the processing unit 13, subjected to pre-processing such as defect correct and γ correction, and supplied to the intra-screen NR processing unit 14.

The intra-screen NR processing unit 14 according to the present embodiment has a configuration enabling change control of the noise reduction strength of the intra-screen NR processing which is a noise reduction processing in the spatial direction for each imaged image from the imaging device 11. The configuration example of the intra-screen NR processing unit 14 will be described below.

The CPU 1 can vary control of the noise reduction strength of the intra-screen NR processing 14 for each imaged image. With the present embodiment, the CPU 1 change-controls the noise reduction strength in the spatial direction of the intra-screen NR processing unit 14 within multiple images layered with the addition NR processing. The CPU 1 then repeats the control of the noise strength in the spatial direction within the multiple images in image group increments of the multiple images.

With the present embodiment, the first one of multiple images layered with the addition NR processing has the noise reduction strength strengthened with the intra-screen NR processing unit 14. The second and thereafter of the multiple images has the noise reduction strength of the intra-screen NR processing unit 14 weakened more than that of the first image. The imaged image signal (RAW signal) subjected to intra-frame NR processing with the intra-frame NR processing unit 14 is supplied to a developing processing unit 15.

The developing processing unit 15 performs demosaic processing, gamma correction processing, white balance adjusting processing, and image quality correction or image quality adjusting processing, as to an analog imaging signal which is a RAW signal input therein. The developing processing unit 15 converts from RAW signals of red (R), green (G), blue (B) which are input signals into digital imaging signals (YC data; YUV image) made up of a luminance signal component Y and color difference signal components Cb/Cr.

The digital imaging signal from the developing processing unit 15 has multiple N images (N is a natural number of 2 or greater) for addition NR processing written into the image memory unit 4, based on the shooting instructions for the still image through the user operation input unit 3.

That is to say, upon a still image shooting instruction given by pressing a shutter button as a shoot instruction through the user operation input unit 3, N images worth (N frames) of digital imaging signals from the developing processing unit 15 are written, one at a time, into each of N frame memory 41 through 4N. That is to say, N frames worth of the digital imaging signal from the developing processing unit 15 to be layered at the addition NR processing unit, are written to one frame each of the first through N'th (N is the number of still images to be layered) of the frame memory 41 through 4N of the image memory unit 4.

According to this example, the image data of the first frame counting from the point-in-time of pressing the shutter button is written in the first frame memory 41 as image data of a target frame to be described later. The data of the second frame image and thereafter counting from the point-in-time of pressing the shutter button is sequentially written as image data of the reference frame to be described later. In this example, N=6, for example.

Note that in the description below, the first, second, etc. image frames counting from the point-in-time of pressing the shutter button will simply be called the first, second, etc., image frames for simplification of description.

Upon the images of multiple frames worth being written into the image memory unit 4, the images of multiple frames worth from the image memory unit 4 are read out, and addition NR processing is executed with the addition NR processing unit 20.

As described below, according to the present embodiment, the CPU 1 reads out the first image frame and second image frame from the image memory unit 4 and detects the amount of motion (motion vector) of both with the addition NR processing unit 20. At the addition NR processing unit 20, the detected motion vector is used to layer two image frames while compensating the amount of motion.

Also, according to the present embodiment, detecting of motion vectors is performed in increments of blocks of a predetermined size, while determination is made as to whether the block thereof is the background portion of the still image or a moving subject portion, the addition rate is increased for the background portion, and the addition rate of the moving subject portion is decreased. Thus, having the same image state as a so-called multiple exposure by layering multiple frames at the moving subject portion can be prevented, while obtaining a desired noise reduction effect for the background still image portion.

Upon the first and second image frame addition ending, a third image frame is read out from the image memory unit 4, and this is layered with the first and second image frame addition result image, while compensating for the motion between the two. For the fourth image and thereafter, similar to the third image frame, this and the addition result image are layered while compensating for the motion between the two.

The image data MIXv of the layering result with the addition NR processing unit 20 is rewritten in the image memory unit 4, as described later. The image frame that is the layering result rewritten in the image memory unit 4 is used for motion detection between the layered image frames. The image frame that is the final layering result stored in the image memory unit 4 is the recording image frame to the recording medium.

That is to say, the image data MIXv of the addition image that is the NR image of the layering result stored in the image memory unit 4 is supplied to the still image codec unit 16 through the system bus 2 and subjected to codec processing. The output data from the still image codec unit 16 is recorded in the recording medium such as a DVD (Digital Versatile Disc) or hard disk for example of the recording/playing apparatus unit 5. According to the present embodiment, with the still image codec unit 16, image compression encoding processing for a still image is performed with JPEG (Joint Photographic Experts Group).

Also, at the time of the still image shooting mode, before the shutter button is pressed/operated, the image data from the current processing unit 5 is supplied to the resolution converting unit 17 through the image memory unit 4. Upon being transformed to a predetermined resolution with the resolution transforming unit 17, the image data is supplied to an NTSC (National Television System Committee) encoder 18. With the NTSC encoder 18, the image data is converted to a standard video signal of the NTSC method, and is supplied to a monitor display 6 made up of an LCD (Liquid Crystal Display) for example. A monitor image at the time of still image shooting mode is displayed on the display screen of the monitor display 6.

The image data of the still image recording on the recording medium of the recording/playing apparatus unit 5 is read out according to the playing start operation through the user operation input unit 6, and is supplied to the still image codec unit 16, and subjected to playing decoding. The image data of the still image subjected to playing decoding is supplied to the NTSC encoder 18 through the resolution transform unit 17. The image data converted into a standard color signal of the NTSC method with the NTSC encoder 18 is supplied to the monitor display 6, and the playing image is displayed on the display screen thereof.

Note that in FIG. 1, the output video signal from the NTSC encoder 18 can be output from a video output terminal, although omitted in the diagram.

Note that according to the present embodiment, the image data is compressed and recorded with the still image codec unit 16, but an arrangement may be made wherein the still image codec unit 16 is omitted and the image data is recorded without compressing.

Configuration and Processing Operation of Intra-Screen NR Processing Unit 14

First Example

The first example is in the case of the intra-screen NR processing unit 14 configured as an $\epsilon$ filter, and is a case of the hardware configuration made up of multiple discrete circuits. In this first example, the intra-screen NR processing unit 14 is made up of an input buffer unit 141, a window computing processing unit 142, and a filter processing unit 143.

The input buffer unit 141 has a line buffer worth multiple lines according to the size (number of lines) in the vertical direction of the above-described window region set in the periphery of the pixel of interest. The input buffer unit 141 temporarily stores the pixel of interest and multiple pixels within a window region of the periphery thereof from the RAW image data from the pre-processing unit 13.

For example, in the case that the size of the window region is vertical×horizontal=3×3=9, the input buffer unit has three line buffers, the pixel at the center position in the window region made up of nine pixels is set as the pixel of interest, and the eight pixels in the periphery thereof are set as the periphery pixels, and stored. Also, for example in the case that the size of the window region is vertical×horizontal=5×5=25, the input buffer unit has five line buffers, the pixel at the center position in the window region made up of 25 pixels is set as the pixel of interest, and the 24 pixels in the periphery thereof are set as the periphery pixels, and stored.

While sequentially changing the pixel of interest, the input buffer unit 141 supplies the pixel of interest and periphery pixels to the intra-window computing processing unit 142.

The intra-window computing processing unit 142 computes the difference as to the pixel of interest for each periphery pixel, compares the computed difference and the threshold $\theta$th, determines the pixel value according to the comparison results thereof, and sequentially supplies to the filter processing unit 143 as the pixel value of each pixel within the window. In this case, the intra-window computing processing unit 142 outputs the pixel value without change when the computed difference is at or below the threshold $\theta$th. Also, the intra-window computing processing unit 142 converts and outputs the peripheral pixels to the pixel value of the pixel of interest when the computed difference is greater than the threshold θth. The pixel of interest is output without change to the pixel value.

The filter processing unit 143 is made up of FIR (Finite Impulse Response) digital filters in the number of taps according to the number of pixels included in the window region. The filter coefficient as to each tap of the filter processing unit 143 has a value set according to the distance between each tap pixel and the pixel of interest, for example. Thus, with the filter processing unit 143, for the pixel of interest, a weighted average value using the peripheral pixels is obtained, and the obtained weighted average value is output as noise-reduced pixel of interest data.

The pixel of interest data thus subjected to noise reduction processing output from the filter processing unit 143 is sequentially stored in the frame memory of the image memory unit 4.

Figure 3:
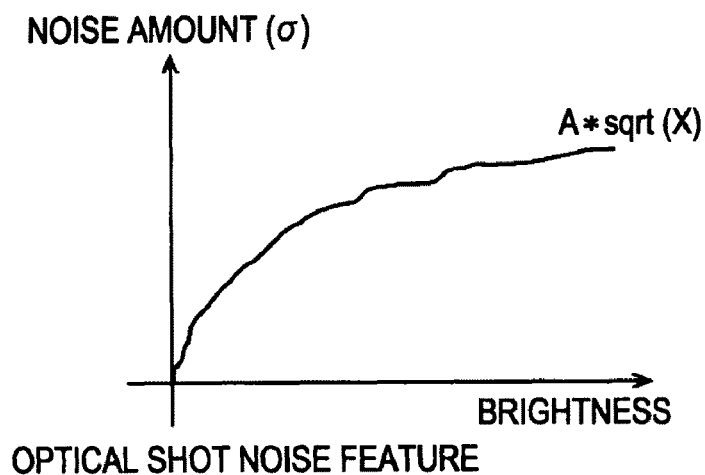
FIG. 3 is a diagram illustrating features of optical shot noise of an imaging device.

Now, heretofore, the threshold θth used for the intra-screen NR processing unit 14 has generally been a fixed value with consideration for the optical shot noise feature of the imaging device 11. For example, the optical shot noise feature of the imaging device 11 made up of a CCD or CMOS or the like has been that such as shown in FIG. 3. That is to say, where the pixel value (luminance value) is X, the noise amount (standard deviation σ) of the optical shot noise is expressed as $$A \times sqrt(X)$$

Where A is a constant determined by an analog gain, digital gain, filter feature, and so forth.

Figure 4:
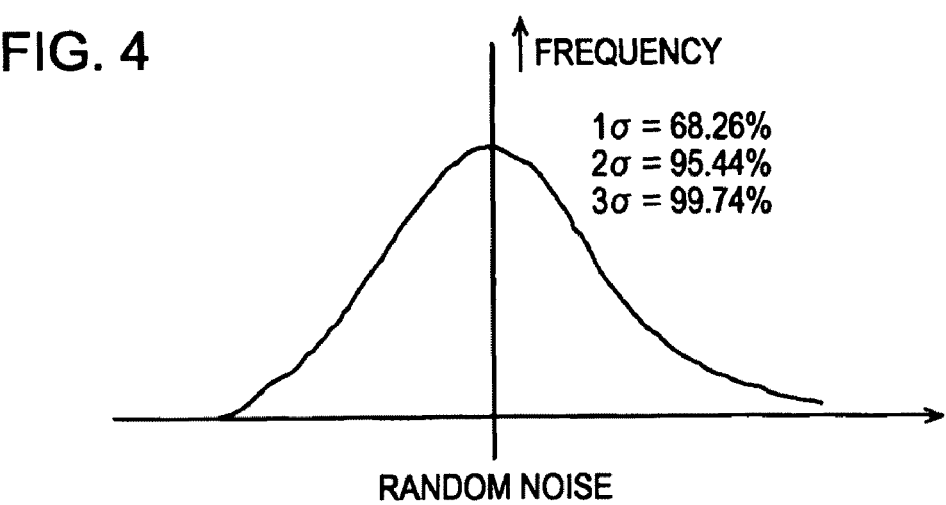
FIG. 4 is a diagram illustrating features of random noise.

The optical shot noise herein is random noise, and the random noise has also indicated a Gauss distribution such as shown in FIG. 4.

In the case of setting the threshold θth=1σ, 68.26% of noise can be removed, in the case of setting the threshold θth=2σ, 95.44% of noise can be removed, and in the case of setting the threshold θth=3σ, 99.74% of noise can be removed.

With consideration for the above, the optical shot noise features of the imaging device 11 are measured, and the standard deviation σ of the noise in the imaging device 11 is obtained in advance. The threshold θth is set as a value according to the noise amount to be reduced.

In this case, as describe above also, in the case that the threshold θth is increased and the noise reduction effect is increased, deterioration of the edges increased by loss of signal components has to be considered. Therefore, as described in the beginning, improving the noise reduction effect while setting an appropriate fixed threshold θth that can suppress loss of the signal components to a minimum has been difficult.

In view of this, according to the present embodiment, the threshold θth in the intra-window computing processing unit 142 is not a fixed value, and is configured so as to be changeable with one-frame increments by the CPU 1. Since the threshold θth is changeable in one-frame increments, the noise reduction strength at the intra-screen NR processing unit 14 becomes changeable in one-frame increments.

According to the present embodiment, as described later, considering that addition NR processing is performed with the first of the multiple image frames taken in according to the pressing of the shutter button and subjected to addition NR processing as a standard, the noise reduction strength of the intra-screen NR processing will be set/controlled as follows.

That is to say, according to the present embodiment, the first of multiple image frames subjected to addition NR processing has the noise reduction strength increased, and the threshold θth is set to 3σ, for example. The other, second image frame and thereafter, have the noise reduction strength weakened, and the threshold θth is set to 1σ, for example.

Thus, of the multiple image frames to be added, noise reduction by the intra-screen NR processing is strongly performed as to the first image frame, and as described above, 99.74% of the optical shot noise is removed. However, signal components smaller than the threshold θth=3σ are eliminated, whereby image detail information may be lost.

However, the noise reduction strength by the intra-screen NR processing after the second of the multiple image frames to be added and thereafter is weakened. That is to say, since the threshold θth=1σ, only 68.26% of the optical shot noise can be removed as described above, but signal components are not eliminated at less than 3σ or greater than 1σ.

With the latter stage addition NR processing unit 20, as a result of the second image frame and thereafter of which the signal components have not been eliminated being added to the first image frame, the detail information of the image eliminated with the first image frame can be recovered. Thus, a high noise reduction effect can be obtained while retaining the signal components.

Figure 5:
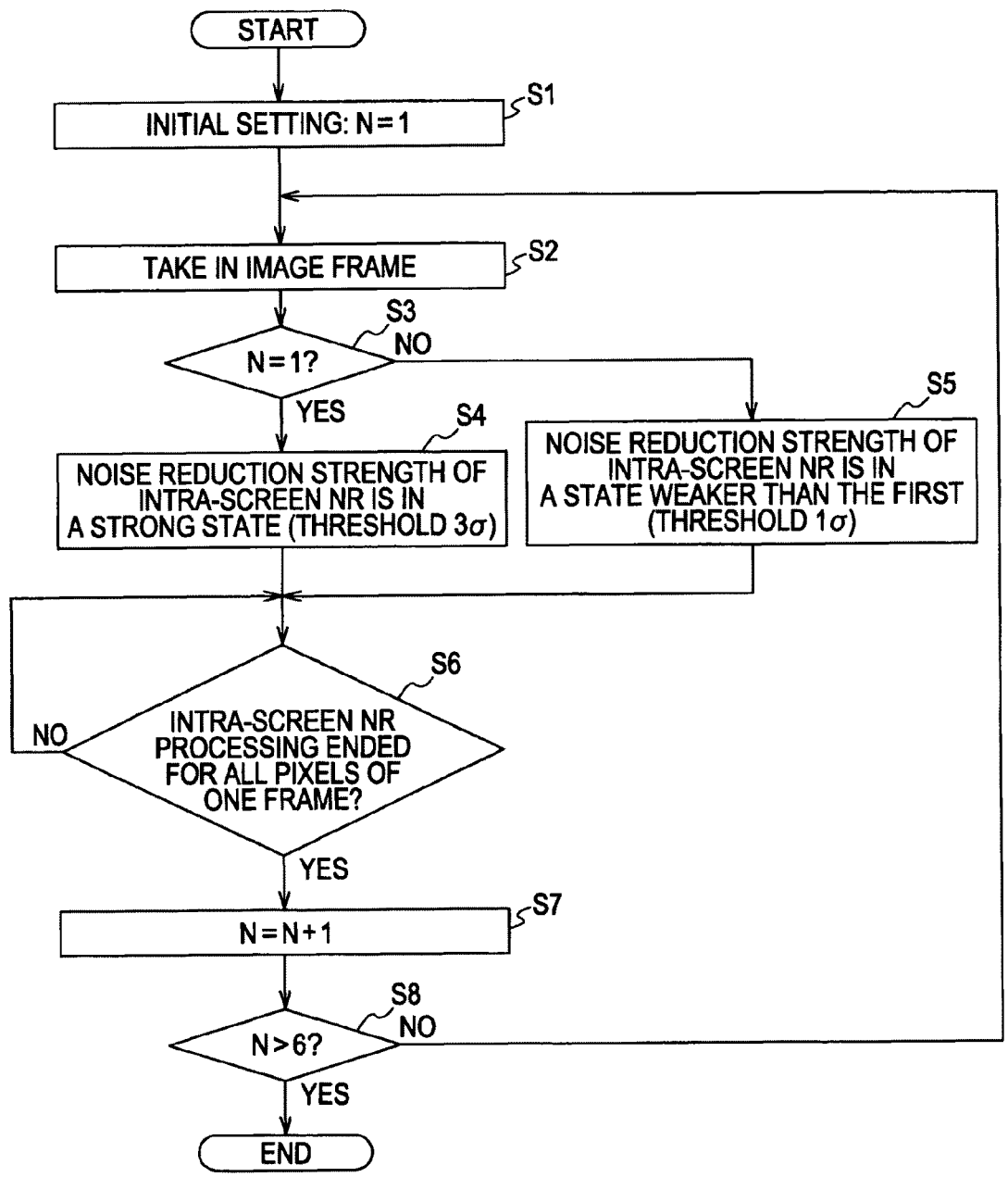
FIG. 5 is a diagram showing a flowchart to describe control processing of the noise reduction strength in the intra-screen NR processing unit of an embodiment of the image processing apparatus according to the present invention.

FIG. 5 is a flowchart to describe setting processing of the threshold θth of the CPU 1 according to the present embodiment. The flowchart in FIG. 5 starts from the user pressing the shutter button and the readout of the image frame from the imaging device 11 being started.

That is to say, first, the CPU 1 performs initial settings for the number of image frames N to be taken in from the shutter button being pressed. That is to say, N=1 (step S1). Next, the CPU 1 takes in (RAW data) from the image frame from the pre-processing unit 13 (step S2). Whether the image frames taken in is one frame, i.e. N=1, will be distinguished (step S3).

In the case determination is made in step S3 that N=1 holds, the CPU 1 sets the threshold θth supplied to the intra-window computing processing unit 142 of the intra-screen NR processing unit 14 to 3σ in this example, and causes a state of strong noise reduction strength (step S4).

Also, the case determination is made in step S3 that N=1 does not hold, the CPU 1 sets the threshold θth supplied to the intra-window computing processing unit 142 of the intra-screen NR processing unit 14 to 1σ in this example, and causes a state of comparatively weak noise reduction strength (step S5).

Following steps S4 or S5, CPU 1 waits for the intra-screen NR processing for all of the pixels in one frame to finish (step S6). At this time, the CPU 1 manages the positions and counts of the pixels of interest subject to processing within one frame, whereby with the managing data, determination can be made as to whether or not the intra-screen NR processing has ended for all of the pixels in one frame.

Upon determination being made that the intra-screen NR processing having ended for all of the pixels in one frame, the CPU 1 updates the number N of image frames to be processed by only one from the time the shutter button is pressed, whereby N=N+1 (step S7). Next, the CPU 1 determines whether or not the number N after updating has exceeded 6 (step S8), and in the case determination is made that 6 has not been exceeded, the flow is returned to step S2, and the next image frame is taken in. The processing in step S and thereafter are repeated.

Also, upon determination being made in step S7 that the number N after updating has exceeded 6, the CPU 1 ends the processing routine.

Second Example

The above-described first example is in the case of the intra-window computing processing unit 142 and filter processing unit 143 configured as hardware, but this processing can be performed with the CPU 1 as software processing. The second example is an example of such a case, the FIG. 6 shows an example of a flowchart of the processing operation of the CPU 1 in the case of the second example.

Figure 6:
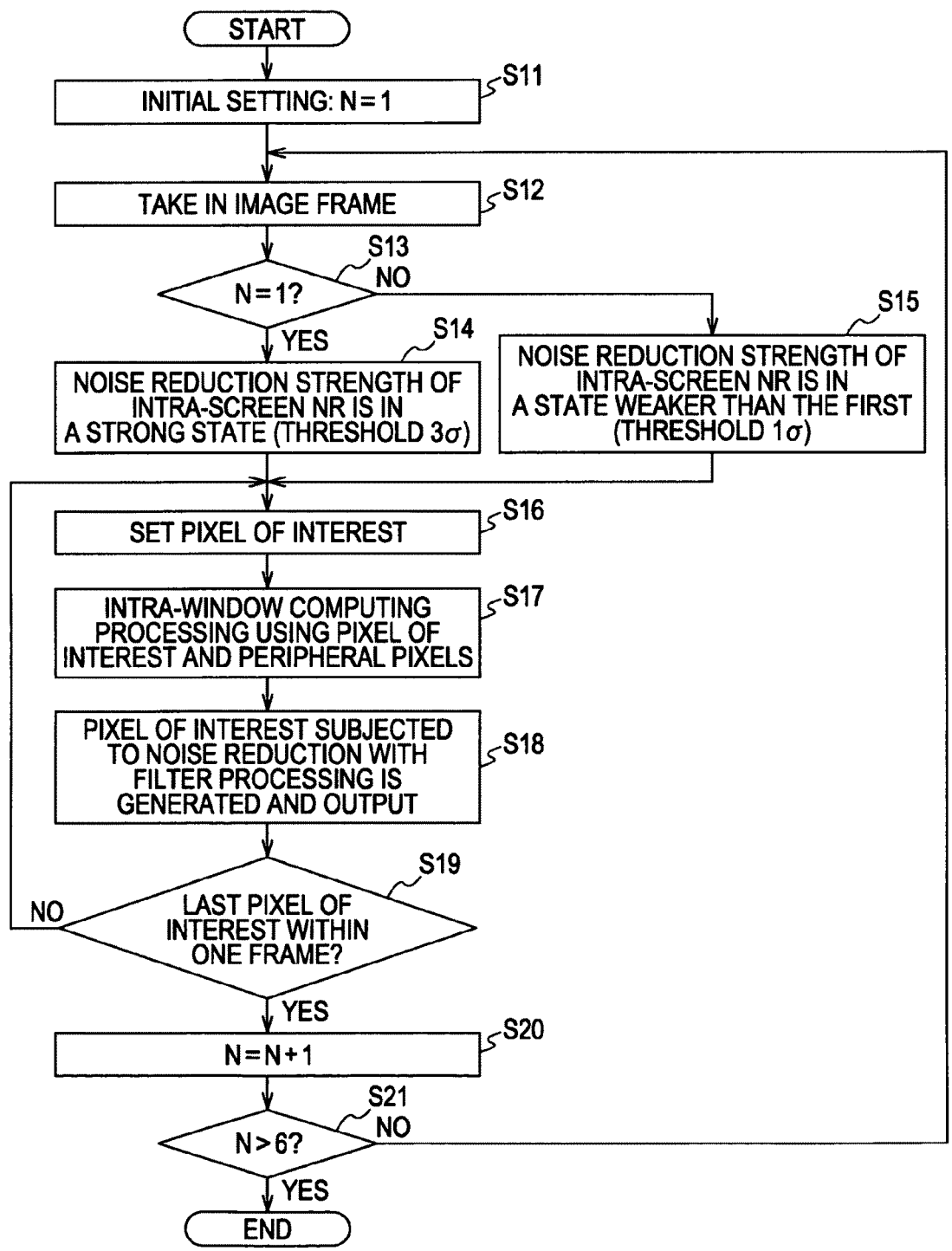
FIG. 6 is a diagram showing a flowchart to describe another configuration of the noise reduction strength in the intra-screen NR processing unit of an embodiment of the image processing apparatus according to the present invention.

Steps S11 through S15 in the flowchart in FIG. 6 are exactly the same as steps S1 through S5 of the flowchart in FIG. 5. In this second example, upon setting the intra-screen NR noise reduction strength in steps S14 or S15, the CPU 1 sets the pixel of interest (step S16). Next, the CPU 1 executes the processing in the intra-window computing processing using the set pixel and interest and peripheral pixels thereof (step S17).

That is to say, the difference between each peripheral pixel and the pixel of interest is found, and when the difference is at or less than the threshold θth set in steps S14 or S15, the pixel values of the peripheral pixels are modified to the pixel value of the pixel of interest and output. Also, when the difference from the pixel of interest is greater than the threshold θth, the pixel values of the periphery pixels are output without change. The pixel value of the pixel of interest is output without change.

Next, the CPU 1 performs weighted average computing processing at the filter processing unit 143 mentioned above for the pixel values of the periphery pixels and pixel of interest subjected to the intra-window computing processing in step S17, and generates and outputs pixel values of the pixel of interest subjected to noise reduction (step S18). The pixel of interest data subjected to noise reduction processing thus generated and output is sequentially stored in the frame memory of the image memory unit 4.

Next, the CPU 1 determines whether or not the pixel of interest having ended processing is the last pixel of interest within one frame (step S19), and if not the last pixel of interest, the flow is returned to step S16, the following pixel of interest is set, and the processing in step S16 and thereafter is repeated.

Also, in the case determination is made in step S19 that the pixel of interest having ended processing is the last pixel of interest within one frame, the CPU 1 updates the number N from the pressing of the shutter button of the image frame to be processed by 1, whereby N=N+1 (step S20). Next, the CPU 1 determines whether or not the number N after updating has exceeded 6 (step S21), and in the case determination is made that 6 has not been exceeded, the flow is returned to step S2, and the next image frame is taken in. The processing in step S2 and thereafter is then repeated.

Also, in the case determination is made in step S21 that the number N after updating has exceeded 6, the CPU 1 ends the processing routine.

<Another Example of Intra-Screen NR Processing Unit 14>

The above-described first and second examples have a configuration using an ε filter as the intra-screen NR processing unit 14, but as described above, a configuration with a bilateral filter may also be used. Also, a configuration using a multi-stage ε filter that uses multiple filters, which is described in Japanese Unexamined Patent Application Publication No. 2008-177801, may also be used. In this case also, by modifying the threshold θth as to the difference between the pixel of interest and the periphery pixels, for example, the ability to change-control the strength of the noise reduction of the intra-screen NR processing is similar to the above-described example.

Also, besides the case of configuring as a conditional average value filed as described above, the intra-screen NR processing unit 14 can be configured as a simple median filter or low-pass filter. In this case, the number of taps of the median filter or low-pass filter and the filter coefficients are modified for each frame, whereby the noise reduction strength at the intra-screen NR processing unit 14 can be change-controlled.

Note that the state to weaken the noise reduction strength at the intra-screen NR processing unit 14 includes a state of not performing intra-screen NR as to the image data.

Configuration and Processing Operation of Addition NR Processing Unit 20

The imaging apparatus of the present embodiment position-matches while layering the multiple still images that have been imaged by the imaging device (imager) 11 and stored in the image memory unit 4, and performs noise reduction in the temporal direction of the image.

The environment of holding the imaging apparatus by hand and shooting is an environment wherein shaking is likely to occur. At time of such hand-held shooting with the imaging apparatus, in the case of continuous shooting of still images, according to the present embodiment the first image is a target frame and the second images and thereafter are reference frames, for example. Now the reference frame is a frame subject to processing, i.e. a frame of interest, and on the other hand, the target frame is a base frame for which the motion of the reference frame is based. In this example, the reference frame is subject to motion compensation while being added to the target frame.

By performing deforming processing that accompanies parallel motion, rotation, and enlarging/reducing over the entire reference frame, in the case of the reference frame can be position-matched to the position of the target frame, the modifying processing that is added to the entire reference frame is global motion. Global motion normally shows the motion and motion amount of the background still image (hereafter called background). Shaking means that global motion has occurred as to the target frame by the amount the image of the reference frame is deformed as to the target frame, accompanying parallel motion, rotation, and enlarging/reducing.

According to the present embodiment, for simplification of description, the first taken still image becomes a standard (target frame). Global motion may be redefined where an optional n'th image is the target frame and an optional m'th (n≠m) image is the reference frame. Also, global motion may be defined as between two frame images that differ temporally within a moving image. Also, global motion processing may be applied relating only to a portion of one frame the image, without applying to all of the valid frames out of the one frame of the imaged image.

Upon global motion being obtained, a motion vector in accordance with the motion added to the entire screen between the target frame and reference frame for each coordinate position on the screen can be computed from the obtained global motion. The motion vector in accordance with the motion added to the entire screen is hereafter called a global motion vector. A global motion vector can be obtained for each of multiple target blocks set on the screen. Also, a global motion vector can be obtained for each pixel.

If a global motion vector can be accurately obtained based on global motion, shaking can be favorable corrected. Alternatively, frame images can be layered while correcting the global motion vector in the amount of the shaking.

According to the present Specification, processing to layer multiple images using motion vector detecting and motion compensation (position-matching images of two frames with the motion vectors), and reducing noise is called addition NR processing. Note that an image subjected to noise reduction by the addition NR is called an addition NR image.

According to the present embodiment, one screen is divided into multiple blocks (later-described target blocks), and the motion vectors for each block increments are detected by a block matching method. The motion vector detected for each block by the block matching method is called a local motion vector in the present Specification.

Also, according to the present embodiment, an indicator of reliability of the local motion vector will be detected as described later, using a correlation value with the block matching method. According to the present embodiment, global motion is computed from that having a high reliability from among the detected local motion vectors, and detect the global motion vector for each block from the computed global motion.

Also, according to the present embodiment, determination is made as to whether each block is a background image portion or moving subject portion, using the computed global motion vector and local motion vector.

Overview of Block Matching

Figure 7A:
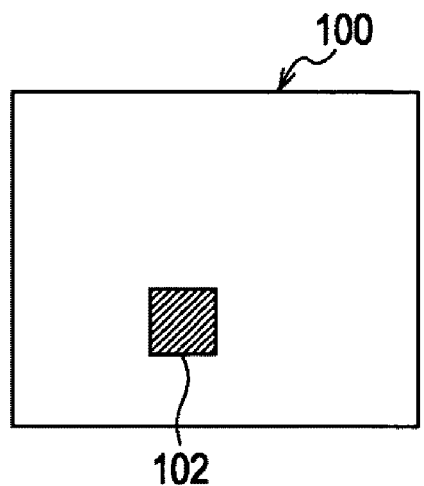
FIGS. 7A and 7B are diagrams used to describe block matching processing of an embodiment of the image processing apparatus according to the present invention.
Figure 7B:
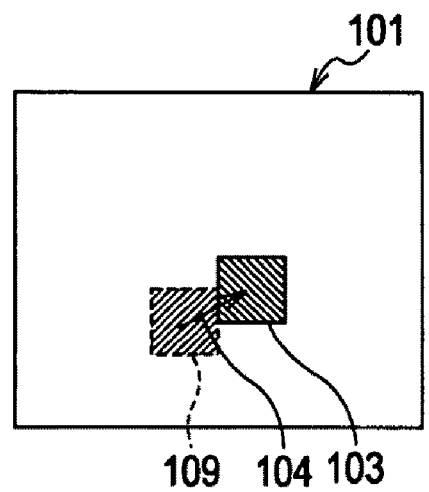
Figure 8:
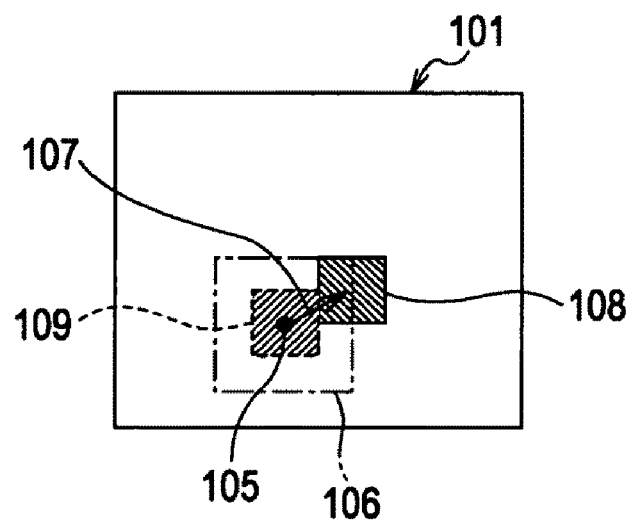
FIG. 8 is a diagram used to describe block matching processing of an embodiment of the image processing apparatus according to the present invention.

FIGS. 7A through 12 are diagrams to describe an overview of the block matching method. The block matching method described here assumes a block (target block) 102 in a rectangle-shaped region of a predetermined size each made up of multiple pixels in the horizontal direction and multiple lines worth in the vertical direction, in a target frame 100, as shown in FIG. 7A, for example. Also, a block (reference block) that is the same size as the target block is set in the reference frame 101.

With block matching, the reference block having high relativity as the target block 102 can be searched from within the reference frame 101. As a result of this search, the reference block 103 (see FIG. 7B) detected within the reference frame 101 as having the highest relativity is called the motion compensation block. Also, the position-shifting amount between the target block 102 and motion compensation block 103 (reference block having the highest relativity) is called a motion vector (see reference numeral 104 in FIG. 7B).

The motion vector 104 corresponding to the position-shift (includes position-shifting amount and position-shifting direction) between the target block 102 and motion compensation block 103 corresponds to the position shifting between the position of the projected image block 109 of the target block in the reference frame 101 and the position of the motion compensation block 103. Now, the position of the projected image block 109 and the position of the motion compensation block 103 use the center position of the block, for example.

The projected image block 109 of the target block 102 is assumed to be in the same position as the position of each target block 102 of the target frame 100 in the reference frame 101.

The overview of block matching processing will now be described. First, as shown with the dotted lines in FIG. 8, a projected image block 109 of the target block 102 is assumed to be in the same position as the position of the target block 102 of the target frame 100 in the reference frame 101. The center coordinate of the projected image block 109 of the target block 102 becomes a motion detecting origin point 105. The motion vector 104 is assumed to exist within a certain range from the motion detecting origin point 105, and a predetermined range having the motion detecting origin point 105 as the center thereof is set as a search range 106 (see dotted-dashed line in FIG. 8).

Next, a block 10 (reference block) that is the same size as the target block 102 is set on the reference screen. The position of the reference block 108 is moved in increments of one pixel or multiple pixels in the horizontal direction or vertical direction for example, within a set search range 106. Accordingly, in the search range 106, multiple reference blocks 108 are set.

Moving the reference block 108 within the search range 106 means in this example that the motion detecting origin point 105 is at the center position of the target block whereby the center position of the reference block 108 is moved within the search range 106. Accordingly, the pixels making up the reference block 108 extends out farther than the search range 106.

In the search range, a vector (called reference vector) 107 (see FIG. 8) that expresses the position-shifting amount and position-shifting direction between each reference block 108 and target block 102 is set as to each reference block 108 that has been set. The correlation of the image content of the reference block 108 in the position indicated by each reference vector 107 and the image content of the target block 102 is evaluated.

Figure 9:
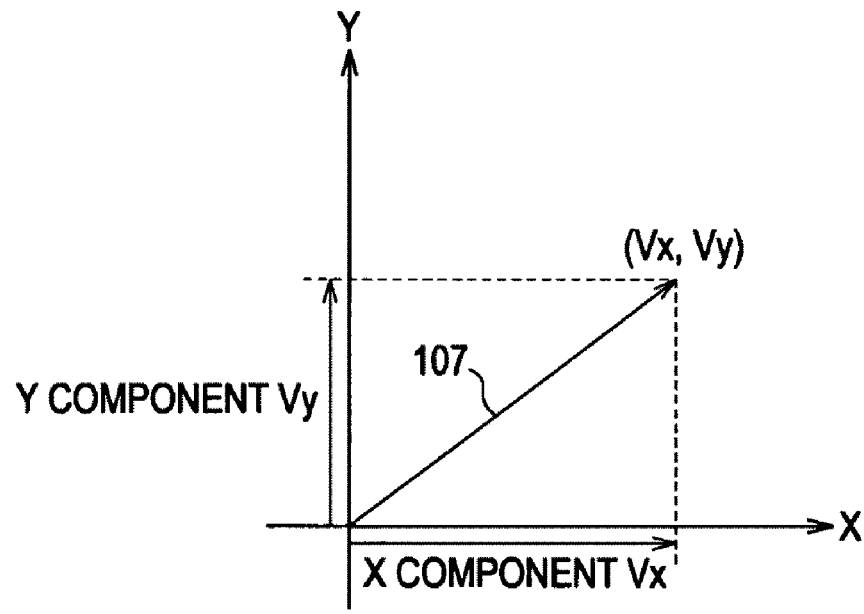
FIG. 9 is a diagram used to describe block matching processing of an embodiment of the image processing apparatus according to the present invention.

The reference vector 107 can be expressed as a vector (Vx, Vy), as shown in FIG. 9, when the position-shifting amount in the horizontal direction (X direction) of the reference block 108 is Vx and the position shifting amount in the vertical direction (Y direction) is Vy. When the position coordinates (e.g. the center position coordinates) of the reference block 108 and the position coordinates (e.g. the center position coordinates) of the target block 102 are the same, the reference vector 107 is expressed as a vector (0, 0).

For example, in the case that the reference block 108 is in a position shifted by one pixel in the X direction from the position of the target block 102, the reference vector 107 becomes the vector (1, 0). Also, as shown in FIG. 10, in the case that the reference block 108 is in a position shifted by 3 pixels in the X direction and 2 pixels in the Y direction from the position of the target block 102, the reference vector 107 becomes the vector (3, 2).

Figure 10:
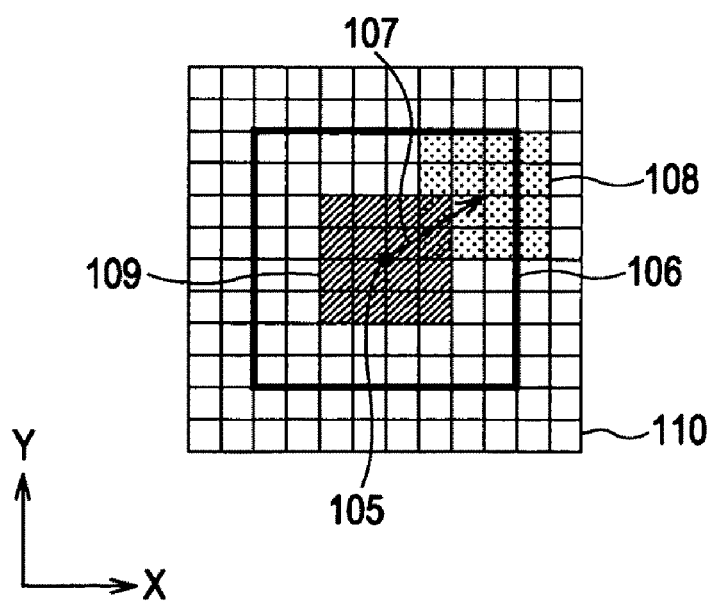
FIG. 10 is a diagram used to describe block matching processing of an embodiment of the image processing apparatus according to the present invention.

That is to say, the reference vector 107 means the position-shifting (a vector including the position-shifting amount and position-shifting direction) between each corresponding reference block 108 and target block 102, as shown in the example in FIG. 10. Note that in FIG. 10, the positions of the target block 102 and reference block 108 are at the center position of each block.

The reference block 108 moves in the search range 106, but in such a case, the center position of the reference block 108 moves within the search range 106. The reference block 108 is made up of multiple pixels in the vertical direction and horizontal direction. Accordingly, the maximum range that the reference block 108 subject to block matching processing and the target block 102 moves in becomes a matching processing range 110 that is wider than the search range 106, as shown in FIG. 10.

The position of the reference block 108 of which the correlation between the image content of the target block 102 is detected as the strongest, is detected as the position (position after moving) in the reference frame 101 of the target block 102 of the target frame 100. The detected reference block becomes the above-described motion compensation block 103. The position-shifting amount between the position of the detected motion compensation block 103 and the position of the target block 102 is detected as the motion vector 104 serving as the amount including the directional component (see FIG. 7B).

The correlation value expressing the strength of correlation between the target block 102 and the reference block 108 that moves in the search range 106 is basically computed using a pixel value corresponding to the target block 102 and the reference block 108. A method using square mean or various other methods are proposed as the computing method thereof.

Figure 11:
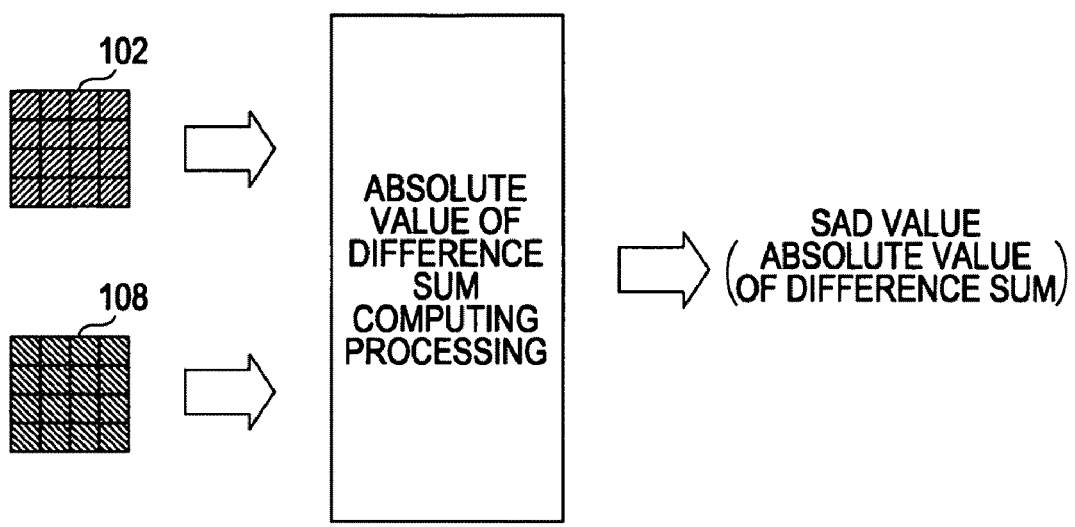
FIG. 11 is a diagram used to describe block matching processing of an embodiment of the image processing apparatus according to the present invention.

As the correlation value generally used in the event of computing a motion vector, the total sum for all pixels within a block, of the absolute value of the difference between the luminance values for each pixel within the target block 102 and the luminance value of each pixel corresponding within the reference block 106 (see FIG. 11). The total sum of the absolute values of the differences is called the sum of absolute difference value. Hereafter, the sum of absolute difference value will be written as SAD (Sum of Absolute Difference) value.

In the case that a SAD value is used as the correlation computing result, the smaller the SAD value, the stronger the correlation will be. Accordingly, of the reference blocks 108 that move in the search range 106, the reference block 108 in a position having the minimum SAD value becomes the maximum strength correlation reference block wherein the strongest reference block 108 having the minimum SAD value has the strongest correlation. The maximum strength correlation reference block is detected as the motion compensation block 103, and the position-shifting amount as to the position of the target block 102 of the detected motion compensation block 103 is detected as the motion vector.

Note that generally, that which has the greater correlation value is considered to have a stronger correlation. However, in the case that a SAD value is used as a correlation computing result, the smaller the SAD value is the greater the correlation value is, and it can be said that the correlation is strong.

As described above, with block matching, the position-shifting amount as to the position of the target block 102 for each of the multiple reference blocks 108 set in the search range 106 is expressed with a reference vector 107 serving as an amount including the directional component. The reference vector 107 of each reference block 108 becomes a value according to the position on the reference frame 102 of the reference block 108. As described above, with the block matching, the reference vector of the reference block 108 wherein the SAD value which is the correlation value is a minimum value is detected as the motion vector 104.

Thus, with block matching, the SAD value between each of the multiple reference blocks 108 set in the search range 106 and the target block 102 (hereafter called a SAD value of the reference block 108 for simplification of description) will first be obtained.

Figure 12:
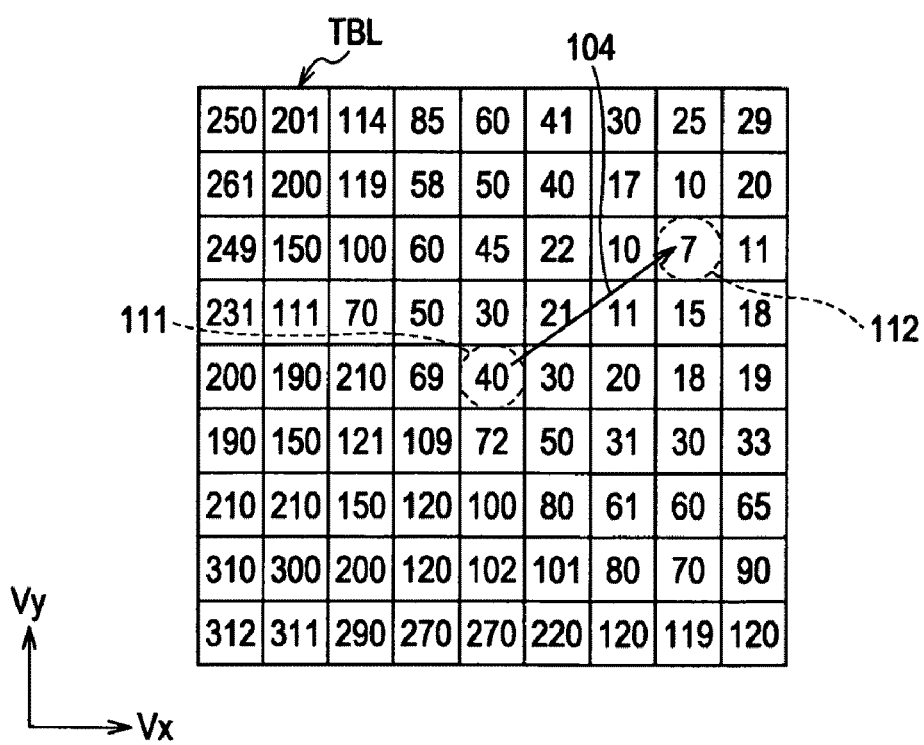
FIG. 12 is a diagram used to describe block matching processing of an embodiment of the image processing apparatus according to the present invention.

Next, as shown in FIG. 12, the obtained SAD value is stored in the memory, corresponding to each of the reference vectors 107 according to the position of each reference block 108. By detecting the reference block 108 having the smallest SAD value from among the SAD values of all of the reference blocks 108 stored in the memory, the motion vector 104 is detected. Note that for simplification of description, the reference vector 107 according to the position of the reference block 106 is called the reference vector 107 of the reference block 108.

The correlation values (in this example, the SAD value) for each of the reference blocks 108 that have been stored, corresponding to each of the reference vector 107 according to the position of the multiple reference blocks 108 set in the search range 106, are stored, and this is called a correlation value table. In this example, the SAD value which is the sum of absolute differences as the correlation value is used, whereby the correlation value table is called the sum of absolute differences table (hereafter called the SAD table).

The SAD table TBL in FIG. 12 shows this, and each correlation value (in this example, the SAD value) of the each reference block 108 is called a correlation value table element. In the example in FIG. 12, the SAD value indicated by the reference numeral 111 is the SAD value when the reference vector is vector (0, 0). In the example in FIG. 12, the minimum value of the SAD value is "7" when the reference vector is vector (3, 2), whereby the motion vector 104 to obtain becomes (3, 2).

Note that in the above description, the positions of the target block 102 and reference block 108 mean an optional identified position of these blocks, e.g. the center position. The reference vector 107 indicates the shifting amount (includes direction) between the position of the projected image block 109 of the target block 102 in the reference frame 102 and the position of the reference block 108.

The reference vector 107 corresponding to each reference block 108 shows the position-shift of each reference block 108 from the position of the projected image block 109 corresponding to the target block 102 on the reference frame 101. Accordingly, upon the position of the reference block 108 having been identified, the value of the reference vector corresponds to the position thereof and is also identified. Thus, upon the address of the correlation value table element of the reference block in the memory of the SAD table 110 having been identified, the corresponding reference vector is identified. Note that the SAD value may be calculated in parallel, simultaneously, for two or more target blocks.

Motion Vector Detecting in Block Increments and Reliability Evaluating

The block matching description above is a description of calculating the motion vector for one target block. The ratio that this target block holds over the entire target frame is normally small, so generally finding the motion (global motion) for the target frame based on the one target block is difficult.

Figure 13:
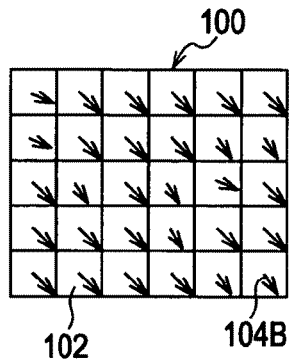
FIG. 13 is a diagram used to describe block matching processing of an embodiment of the image processing apparatus according to the present invention.

In the present embodiment, as shown in FIG. 13, the target frame 100 is divided into multiple target blocks 102 of comparatively small sizes, such as 64 pixels×64 lines, for example. The motion vectors (local motion vectors) 104B for each of the multiple target blocks are first obtained. At this time, according to the present embodiment, indicators showing the reliability of each of the obtained local motion vector are computed together.

Only local motion vectors having high reliability are extracted from among the multiple local motion vectors obtained for the target frame from the reliability indicators of the local motion vectors.

Next, the global motion is computed from only the extracted local motion vectors having high reliability. Using the computed global motion, the global motion vector of each target block increment is computed.

The computed global motion vector and the local motion vector for each target block are computed, and based on the comparison results thereof, evaluation determination is performed as to whether each target block is a background portion or a moving subject portion. According to the present embodiment, the computed global motion vector and the local motion vector for each target block are compared, and the degree of matching between the two is determined. As a determination result thereof, an indicator value showing the degree of matching between the local motion vector for each target block and the global motion vector is computed. This indicator value is called a hit rate according to the present Specification.

This type of evaluation determination is performed with consideration for the influence that the noise included in an image gives to the correlation value computed with the block matching.

When the global motion vector and local motion vector for a target block match, the target block is determined to be a background image portion. Accordingly, the indicator value of the degree of matching shows the degree at which the target block image matches the background image portion (background matching degree).

If the target block is a background image portion, this is a still image portion, whereby the motion compensation image can be added to the target block image at a ratio of 100% (ratio of 1:1), and the addition NR effect can be maximized.

If the background matching degree is low, the target block is assumed to be a moving subject portion, whereby the addition ratio of the motion compensation image as to the image can be decreased according to the background matching degree, thereby lessening states such as multiple exposures.

In the case that the global motion vector and local motion vector do not match, if not considering the image noise, the target block can be determined to all be a moving subject portion. In this case, the correlation value for the reference block corresponding to the local motion vector becomes maximum (SAD value is minimum), and is greater than the correlation value for the reference block corresponding to the global motion vector (SAD value is small).

However, generally noise is included in an image such as a movie image. Considering the image noise, there are cases wherein the target block is the background portion, even in the case that the global motion vector and local motion vector do not match. The difference between the correlation value for the reference block corresponding to the local motion vector and the correlation value for the reference block corresponding to the global motion vector may be smaller than the amount of image noise.

Thus, according to the present embodiment, the correlation value for the reference block corresponding to the global motion vector is corrected to the value reflecting the amount of noise in the image, and the correlation value after correcting thereof and the correlation value for the reference block corresponding to the local motion vector are compared. When the correlation value after correction is greater (SAD value is small), the target block is evaluated as a background image portion. That is to say, according to the present embodiment, based on the corrected correlation value, the background matching degree is evaluated. At this time, we may say that the global motion vector has matched the original local motion vector for the target block.

According to the present embodiment, when as a result of background matching degree evaluating the target block is determined to be a background image portion, the global motion vector is output as an output motion vector for the target block. Also, when as a result of background matching degree evaluating the target block is determined to not be a match to the background image portion, the local motion vector is output as an output motion vector for the target block. According to the present embodiment, the processing motion vector in a later stage is an NR processing motion vector according to the present embodiment.

Note that when the global motion vector and local motion vector completely match, it goes without saying that either of the global motion vector and local motion vector can be the output motion vector.

According to the present embodiment, the output motion vector in target block increments obtained as above are used to perform position matching of the reference frame to the target frame is performed in block increments, and motion compensation image (motion compensation frame) is generated. The target frame and the motion compensation frame are layered together to generate an addition NR image.

Figure 14:
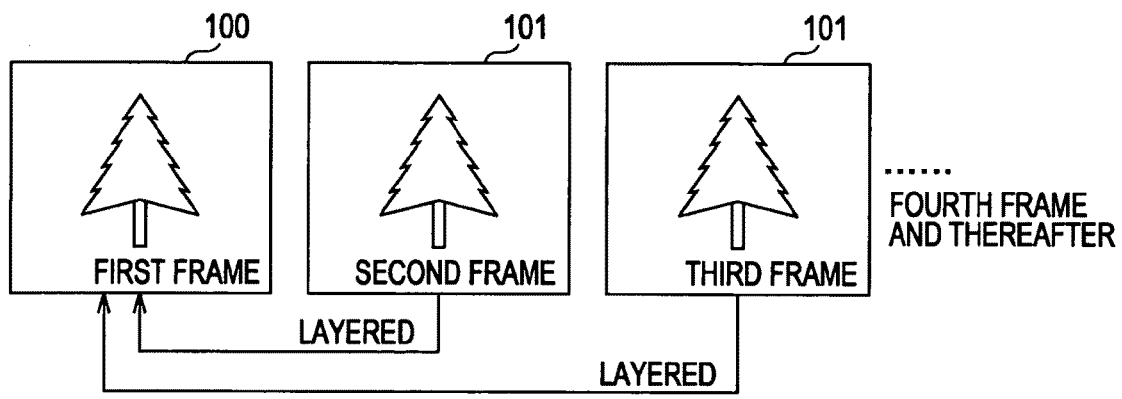
FIG. 14 is a diagram to describe an example of multiple page image adding NR processing of an embodiment of the image processing apparatus according to the present invention.

In the imaging apparatus according to the present embodiment, shooting of multiple still images at high speed is performed for the still image shooting, as shown in FIG. 14, and the first still image shooting image is a target frame 100. At the second image and thereafter, a predetermined number of still shooting images are layered as the reference frame 101, and that which has been layered together is recorded as the still image shooting image.

That is to say, upon user pressing the shutter button of the imaging apparatus, still images of the predetermined number are taken at high speed. The multiple still images (frames) shot later temporally as to the still image (frame) shot first are layered together, and recorded.

Figure 15:
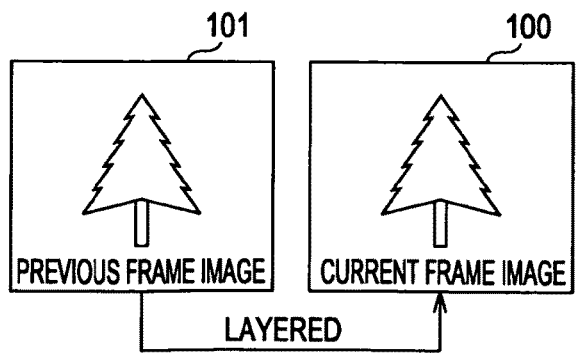
FIG. 15 is a diagram to describe another example of multiple page image adding NR processing.

Note that although not mentioned in the present embodiment, at the time of taking moving images, as shown in FIG. 15, the image of the current frame being output from the imaging device becomes the image of the target frame 100, and the past images of the previous frame becomes the reference frame 101. That is to say, when taking moving images, in order to perform noise reduction of the image in the current frame, the image in the previous frame is layered as to the current frame of the image of the previous frame to the current frame.

Reliability Evaluation Method for the Motion Vector

According to the present embodiment, modeling the actual situation, a reliability indicator that can evaluate the reliability of the motion vector effectively even with an image in a high-noise environment can be obtained.

According to the present embodiment, the difference or ratio between the first maximal value of the correlation value between the target block and reference block, and the second maximal value, as the indicator value of the reliability of the motion vector. According to the present embodiment, the correlation value between the target block and reference block is detected as a SAD value, whereby the first maximal value and second maximal value of the correlation value becomes a first minimal value and second minimal value.

Figure 16:
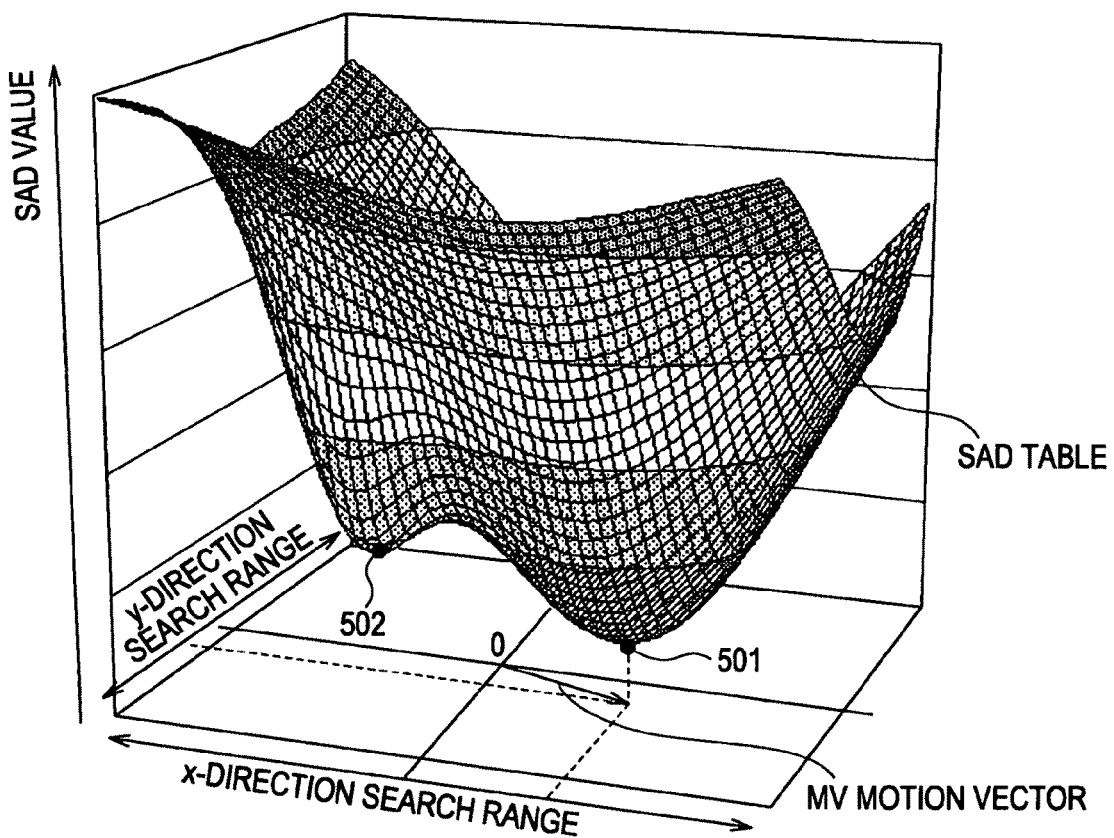
FIG. 16 is a diagram used to describe an embodiment of the image processing apparatus according to the present invention.

FIG. 16 is a diagram schematically showing each SAD value on the SAD table for one target block. With the FIG. 16, the search range is expressed in the two dimensions of the horizontal direction (x direction) and vertical direction (y direction) of the image, the SAD value is taken in the height direction (direction orthogonal to the x direction and y direction), and shows the SAD table in a 3-dimensional curve face.

In the case of normal block matching processing, in order to detect the motion vector only the minimum value of the SAD value in the SAD table is subject to detection. The minimum value of the SAD value is the first minimal value of the SAD value in the SAD table, and in FIG. 16 is in the position shown with a point 501. In FIG. 16, the motion vector MV is detected from the motion origin point (x=0, y=0) as a vector between the minimum value position of the SAD value shown with the point 501.

An ideal state with no noise would be a state wherein the SAD table expressed with a 3-dimensional curve face uniformly protrudes downwardly when the correlation values between the multiple reference blocks within the search range and the target block are obtained, and only one minimal value of the SAD value exits. However, in an actual shooting situation, because of influences such as changes in the amount of light or movements of moving objects, as well as various types of noises, the SAD table expressed with the 3-dimensional curve face hardly ever uniformly protrudes downwards, and generally the minimal values of multiple SAD values exist.

Thus, according to the present embodiment, the motion vector MV is detected based on the position of the reference block taking on the first minimal value that is equal to the minimum value of the SAD value, but the minimal value among the SAD values except for this first minimal value of the SAD value, i.e. the second minimal value of the SAD value, is detected to generated a reliability indicator. In FIG. 16, a position shown with the point 501 indicates the first minimal value, and a position shown with a point 502 shows the second minimal value.

If there is little influence of noise or the like, the difference between the first minimal value of the SAD value and the second minimal value of the SAD value is great, and the first minimal value of the SAD value, i.e. the reliability of motion vector MV detected from the minimum value of the SAD value is increased. On the other hand, in an environment having a large amount of noise or the like, the difference between the first minimal value of the SAD value and the second minimal value of the SAD value is great, and situation is such that which correctly corresponds to the motion victor MV is not distinguished, whereby the reliability is low.

Figure 17:
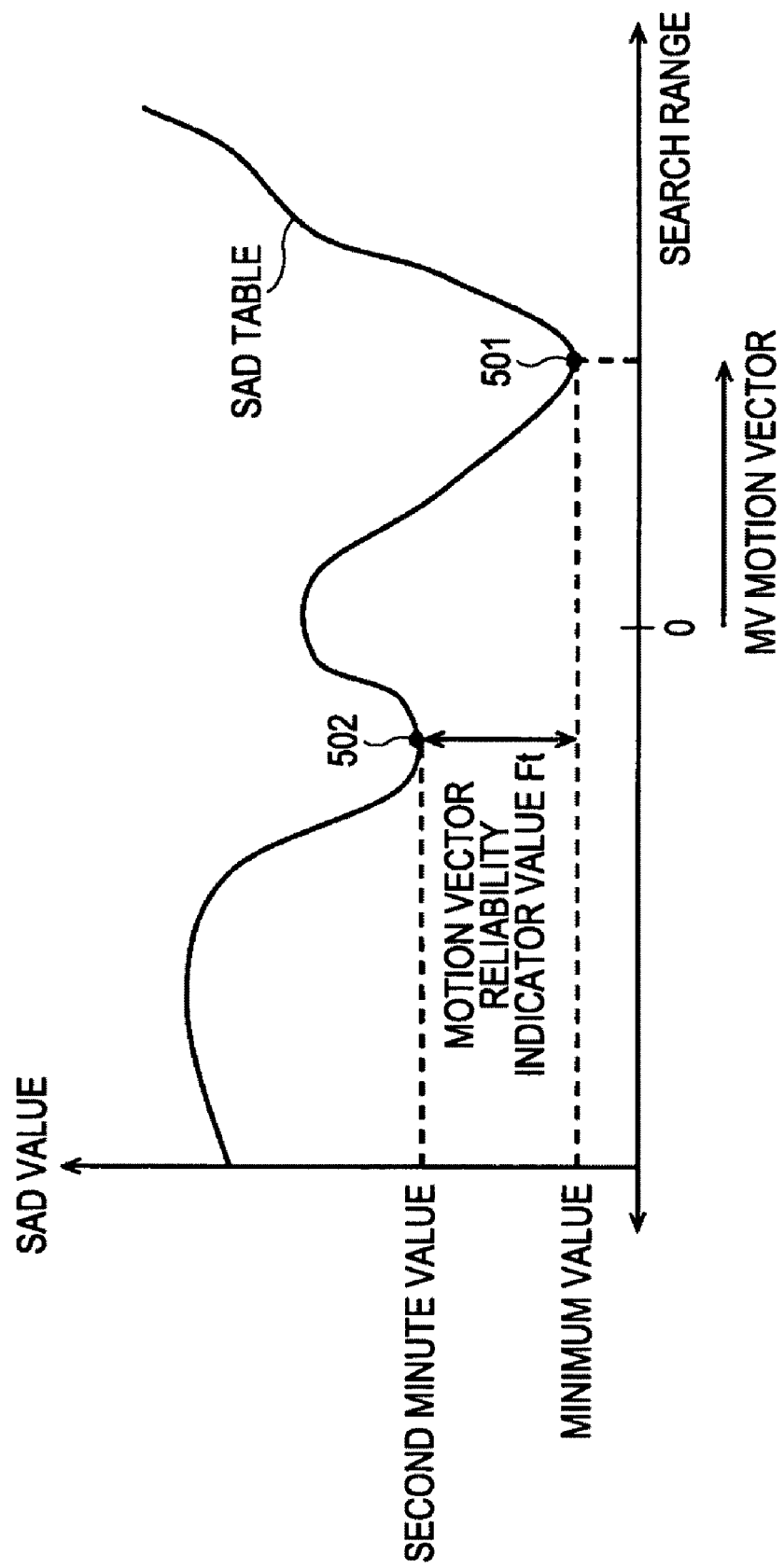
FIG. 17 is a diagram used to describe an embodiment of the image processing apparatus according to the present invention.

Thus, according to the present embodiment, the difference between the first minimal value of the SAD value and the second minimal value of the SAD value becomes the indicator of reliability of the detected motion vector. The SAD table re-expressing the search range in FIG. 16 with a 1-dimensional axis is shown in FIG. 17. According to the present embodiment, in FIG. 17 the value of the difference between the second minimal value and first minimal value (minimum value of the SAD value) becomes an indicator Ft of the motion vector MV.

Note that in the case that only the first minimal value of the SAD value is obtained and the second minimal value is not obtained, according to the present embodiment the theoretical maximum value of the SAD value or the maximum value of the SAD value within the SAD table becomes the reliability indicator value of the motion vector MV. Accordingly, a motion vector of such a block has high reliability, but such a block rarely exists, whereby only the first minimal value of the SAD value can be obtained, and a motion vector of a block whereby the second minimal value is not obtained is excluded from the evaluation of reliability.

Note that instead of the difference between the first minimal value of the SAD value (minimum value of the SAD value) and the second minimal value of the SAD value, a ratio of the first minimal value of the SAD value (minimum value of the SAD value) and the second minimal value of the SAD value may be used as the indicator value Ft of reliability of the motion vector MV. However, in the description below, the indicator value Ft of reliability of the motion vector uses the difference between the first minimal value of the SAD value (minimum value of the SAD value) and the second minimal value of the SAD value.

According to the reliability indicator of the motion vector of the present embodiment, image components such as image edges and features such as used heretofore are not used, but only correlation values between the target frame and reference frame are used, whereby robustness is high as to the noise. That is to say, a reliability indicator of a motion vector having high accuracy is obtained without being influenced by the image noise.

Also, according to the present embodiment, using the difference or ratio between the first minimal value of the SAD value (minimum value of the SAD value) and the second minimal value of the SAD value is also a reason that the reliability indicator of the motion vector of the present embodiment is highly robust as to the noise.

That is to say, generally as the noise level becomes higher, even if the correct motion vector, the SAD value thereof increases. Therefore, in the case of setting the threshold as to the reliability indicator value Ft of the motion vector with the purpose of extracting a motion vector having high reliability, and performing comparison processing with the threshold, the threshold itself also has to change in accordance with the noise level.

Conversely, in the case of the reliability indicator value Ft of the motion vector according to the present embodiment, when the noise level increases, both values of the first maximal value (first minimal value of the SAD value) of the correlation value and the second maximal value (second minimal value of the SAD value) of the correlation value increase according to the noise level. Therefore, regarding the difference between the first maximal value (first minimal value of the SAD value) of the correlation value and the second maximal value of the correlation value, the influence of noise is balanced out.

That is to say, fixed value threshold processing can be performed which does not depend on noise level. The same can be said in the case of using the ratio of the first maximal value (first minimal value of the SAD value) of the correlation value and the second maximal value (second minimal value of the SAD value) of the correlation value as the reliability indicator value Ft.

Now, in the case that the image contrast in a block subject to block matching is low, the difference between the second minimal value of the SAD value and minimum value of the SAD value has a tendency to shrink. Therefore, when there is a high region of contrast and a low region of contrast within the same frame, if the evaluation value Ix of the vector reliability is evaluation with the same threshold, the region having high contrast is likely to be extracted with priority.

This is the correct result from the perspective of reliability of the motion vector, but with the purpose of saving a low contrast region to a certain extent, according to the present embodiment an item to reduce the influence of contrast is added to the computation expression to find the reliability indicator of the motion vector. That is to say, the difference between the value of maximum luminance and the value of minimum luminance of the image of the target frame is obtained, and the difference between the luminances is reflected in the indicator value of the reliability of the motion vector. Note that in order to avoid poor influences from the noise, a low-pass filter is applied to the image data of the target frame, following which extraction of the maximum luminance and minimum luminance is performed.

The computation expression of the reliability indicator value Ft of the motion vector according to the present embodiment with the above understanding is $$Ft = (Btm2\text{SAD} - \text{MinSAD}) - (\text{MaxTAR} - \text{MinTAR}) \times Co \quad (1)$$

where

Ft is the reliability indicator value of the motion vector;

Btm2SAD is the second minimal value of the SAD value;

MinSAD is the minimum value of the SAD value (first minimal value);

MaxTAR is the maximum luminance value of the target block;

MinTar is the minimum luminance value of the target block; and

Co is the weighted coefficient ($\leq 1$).

Note that in the case also of using the ratio of the first maximal value of the correlation value and the second maximal value of the correlation value as the reliability indicator value of the motion vector, completely similar to the above described (Expression 1), an item to reduce the influence of contrast can be added to the reliability indicator value computing expression. Now, in computing the reliability indicator value Ft of the motion vector, adding an item to reduce contrast influence is not an imperative, and this item may be omitted.

Global Motion and Computing Global Motion Vector GMV

Heretofore, there has not been a reliability indicator value for the motion vector as described above, so all of the multiple local motion vectors LMV that have been obtained for the target frame have had the global motion computed with the same weighting.

Conversely, according to the present embodiment, a reliability indicator value Ft can be obtained for each of the multiple local motion vectors LMV for the target frame, as described above.

Thus, the reliability indicator value Ft of the obtained multiple local motion vectors LMV can be normalized, and a weighting coefficient such as 0 or greater, 1 or less, can be set as to each of the local motion vectors LMV. The various local motion vectors LMV can then have global motion computed using the weighting according to each weighting coefficient instead of the same weighting. That is to say, convergence computations to compute global motion using all of the obtained multiple local motion vectors LMV will be started, but in this event, each of the local motion vectors LMV use the weighting according to the weighting coefficient according to the reliability indicator value Ft.

However, in order to simplify the computation processing to compute the global motion and reduce computing load, the weighting coefficients for the local motion vectors LMV are binarized to 0 and 1 in the present embodiment.

Therefore, according to the present embodiment, a threshold th is set as to the reliability indicator value Ft for the motion vector, as follows.

When Ft>th, then W=1

When Ft≦th, then W=0     (Expression 2)

With this computation expression, the weighting coefficient W for each local motion vector LMV is computed using the reliability indicator value Ft of each motion vector.

That is to say, according to the present embodiment, the motion vector reliability indicator value Ft is used to determine the reliability for each of the multiple local motion vectors LMV, and from the multiple local motion vectors LMV, only local motion vectors LMV having high reliability are extracted. The global motion is computed using only the extracted local motion vectors LMV having high reliability.

According to the present embodiment, the number of target blocks in a target frame is comparatively high, whereby, as in this example, even with a method to extract only local motion vectors LMV having high reliability, global motion can be computed with favorable accuracy.

Note that a specific processing example to compute global motion from the multiple local motion vectors LMV will be described later.

<Hardware Configuration Example of Addition NR Processing Unit 20>

According to the present embodiment, the addition NR processing unit 20 is made up of a motion vector computing unit 21, a motion compensation image generating unit 22, addition unit 23, and addition rate calculating unit 24, as shown in FIG. 1.

Upon multiple frames worth of images having been written into the image memory unit 4, the motion vector computing unit 21 reads in the image data of the target frame and the image data of the reference frame from the image memory unit 4.

The motion vector computing unit 21 performs detecting of the local motion vector LMV with a block matching method, while performing processing to compute reliability of the location motion vectors LMV, compute global motion, and compute a global motion vector GMV. Further, the motion vector computing unit 21 performs background matching degree evaluation for the target block, and generates a hit rate β.

According to the present embodiment, the image data TGv of the target frame, the image data REFv of the reference frame, and the hit rate β are output from the motion vector computing unit 21. Also, information of an NR processing motion vector MVnr made up of a global motion vector GMV or local motion vector LMV are output from the motion vector computing unit 21.

The NR processing motion vector MVnr information from the motion vector computing unit 21 and the image data REFv of the reference frame are supplied to the motion compensation image generating unit 22. At the motion compensation image generating unit 22, processing that corresponds to the global motion, i.e. deforming processing that accompanies parallel motion, rotation, and expanding/reducing is performed with the NR processing motion vector MVnr, and a motion compensation image is generated.

The image data TGv of the target frame from the motion vector computing unit 21 is supplied of the adding unit 23, and the image date MCv of the motion compensation image from the motion compensation image generating unit 22 is supplied to the adding unit 23.

Also, the image data TGv and hit rate β of the target frame from the motion vector computing unit 21 are supplied to the addition rate calculating unit 24. The addition rate calculating unit 24 calculates the addition rate α for each target block of the target frame according to the hit rate β which is a background matching degree. The addition rate calculating unit 24 then supplies the computed addition rate α for each target block to the adding unit 23.

At the adding unit 23, image layering processing is performed by the pixels at the positions corresponding to both image data TGv and MCv being added together, and an image data MIXv of the adding image thereof (this is an NR image) is output. The image layering herein is performed in increments of target blocks, and the image data of the block corresponding to the image data MCv of the motion compensation image is added to the image data of the target block with the addition rate α.

The image data MIXv of the adding image from the adding unit 23 is overwritten on the image data of the previous target frame in the first frame memory 41 of the image memory unit 4, as image data of the target frame.

That is to say, the image data of the target frame of the first frame memory 41 first becomes the image data of the first frame immediately following the shutter button having been pressed. Upon the image data MCv of the motion compensation image of the second reference frame and the target frame having been added together, the image data of the target frame of the first frame memory 41 is rewritten to the image data MIXv of the adding image of the addition results.

The image data MIXv of the adding image becomes the image data of the target frame as to the image data of the third reference frame. Similar to the above description, the NR processing motion vector MVnr is computed with a motion vector computing unit 21, and layering processing of an image is performed with the adding unit 23.

The image data MIXv of the adding image from the adding results is overwritten on the image data of the previous target frame in the first frame memory 41 of the image memory unit 4, as image data of the target frame. Hereafter, similar processing operations are performed as to the fourth reference frame and thereafter.

Accordingly, upon the image layering processing having been performed for up to the N'th reference frame, an NR image that all the N frames to be layered have been layered is written into the first frame memory 41 of the image memory unit 4.

The above-described motion vector computing unit 21 and motion compensation image generating unit 22 can be made up of hardware. Also, the motion vector computing unit 21 and motion compensation image generating unit 22 can be configured using a DSP (Digital Signal Processor). Further, the motion vector computing unit 15 and motion compensation image generating unit 16 can be software processing by the CPU 1.

Similarly, the adding unit 23 can be made up of hardware, and also, can be made up of a DSP. Further, the adding unit 23 also can be software processing by the CPU 1. Also, the still image codec unit 16 is similar.

Configuration Example of Motion Vector Computing Unit 21

Figure 18:
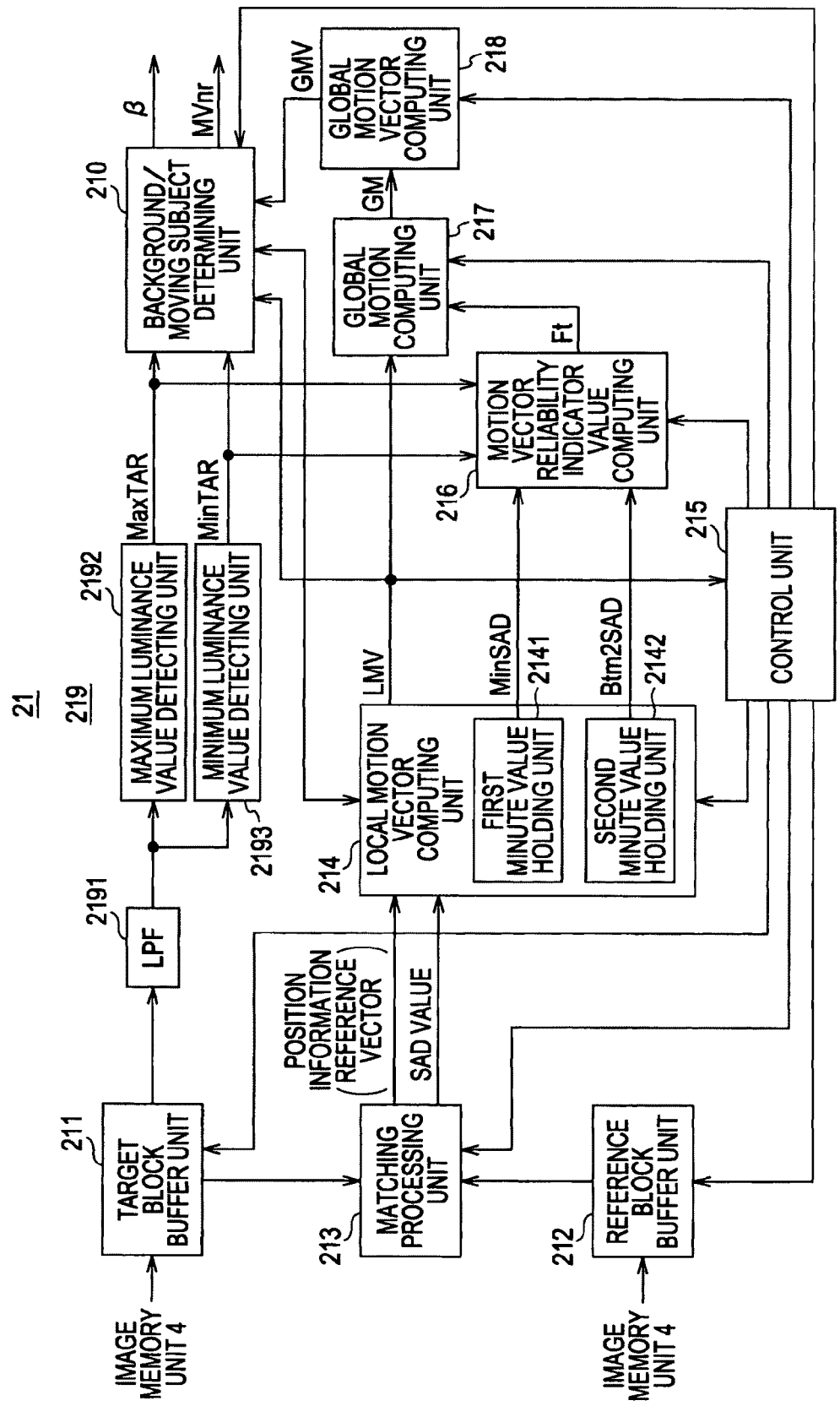
FIG. 18 is a block diagram to describe a configuration example of a motion vector computing unit of an embodiment of the image processing apparatus according to the present invention.

A hardware configuration example of the motion vector computing unit 21 is shown in FIG. 18. In this example, the motion vector computing unit 21 has a target block buffer unit 211 that holds the pixel data of the target block 102 and a reference block buffer unit 212 that holds the pixel data of the reference block 108.

Also, the motion vector computing unit 21 has a matching processing unit 213 that calculates a SAD value for the pixels corresponding to the target block 102 and reference block 108. Also, the motion vector computing unit 21 has a local motion vector computing unit 214 that computes the local motion vector from the SAD value information output from the matching processing unit 213. The motion vector computing unit 21 further has a control unit 215, motion vector reliability indicator value computing unit 216, global motion computing unit 217, global motion vector computing unit 218, contrast computing unit 219, and background/moving subject determining unit 210.

The control computing unit 219 is made up of a low pass filter 2191, maximum luminance value detecting unit 2192, and minimum luminance value detecting unit 2193.

In this example, although omitted from the diagram, image data of a reduced face and image data of an intermediate face for the target frame and reference frame generated from the image data of the original image target frame and reference frame is stored in the image memory unit 4.

The control unit 215 controls a processing sequence in the motion vector computing unit 21, and supplies the control signal to each unit as shown in the diagram.

The target block buffer unit 211 receives control from the control unit 215, reads the image data of the instructed target block from the image data of the target frame of the image memory unit 4, and supplies this to the matching processing unit 213.

The reference block buffer unit 212 receives control of the control unit 215 and reads in the image data of the instructed matching processing range from the image data of the reference frame of the image memory unit 4. The reference block buffer unit 212 then sequentially supplies the image data of the reference block from among the image data of the matching processing range to the matching processing unit 213.

The matching processing unit receives the image data of the target block from the target block buffer unit 211 and the image data of the reference block from the reference block buffer unit 212. The matching processing unit 213 performs block matching processing according to control of the control unit 215. The matching processing unit 213 supplies reference vector (position information of the reference block) and the SAD value of the block matching processing results to the local motion vector computing unit 214.

The local motion vector computing unit 214 has a first minimal value holding unit 2141 of the SAD value and second minimal value holding unit 2142 of the SAD value, and performs processing to detect the first minimal value of the SAD value and the second minimal value of the SAD value from the SAD value from the matching processing unit 213.

The local motion vector computing unit 214 updates the first minimal value of the SAD value of the first minimal value holding unit 2141 of the SAD value and the position information (reference vector) thereof, and the second minimal value of the SAD value of the second minimal value holding unit 2142 of the SAD value and the position information (reference vector) thereof. The local motion vector computing unit 214 performs the updating processing until the block matching processing has ended for the all of the reference blocks in the matching processing range.

When the block matching processing has ended, the first minimal value of the SAD value for the target block at the time and the position information (reference vector) thereof is stored and held in the first minimal value holding unit 2141 of the SAD value. Also, the second minimal value of the SAD value and the position information (reference vector) thereof is stored and held in the second minimal value holding unit 2142 of the SAD value.

When the block matching processing has ended for all of the reference blocks in the matching processing range, the local motion vector computing unit 214 detects the information (position information) of the reference vector held in the first minimal value holding unit 2141 of the SAD value as the motion vector. The processing operation of this local motion vector computing unit 214 will be described later.

The local motion vector LMV obtained with the local motion vector computing unit 214 is supplied to the global motion vector computing unit 217. The received local motion vector LMV is temporarily held at the global motion calculating unit 217.

When the computing processing for the local motion vector LMV of the local motion vector computing unit 214 has ended, the control unit 215 enables the motion vector reliability indicator value computing unit 216 and starts operations. The minimum value MinSAD of the SAD value of the first minimal value holding unit 2141 and the second minimum value Btm2SAD of the SAD value of the second minimum value holding unit 2142 are supplied to the motion vector reliability indicator value computing unit 216.

Also, at this time the image data of the target block from the target block buffer unit 211 is supplied to the maximum luminance value detecting unit 2192 and minimum luminance value detecting unit 2193 via the low pass filter 2191. The maximum luminance value MaxTAR and minimum luminance value MinTAR detected with each of the maximum luminance value detecting unit 2192 and minimum luminance value detecting unit 2193 are supplied to the motion vector reliability indicator value computing unit 216.

At the motion vector reliability indicator value computing unit 216, the information supplied thereto is used to compute the motion vector reliability indicator value Ft according to the above-described Expression 1. The motion vector reliability indicator value computing unit 216 supplies the computed motion vector reliability indicator value Ft to the global motion computing unit 217. At the global motion computing unit 217, the input motion vector reliability indicator value Ft is correlated to the local motion vector LMV supplied at this time and is temporarily held.

When the processing above has ended for all of the target blocks of the target frame, the control unit 215 supplies the control instruction signal so as to start the computing processing of the global motion to the global motion computing unit 217.

According to the present embodiment, the global motion computing unit 217 receives the control instruction signal, and first uses the motion vector reliability indicator value Ft that corresponds to the multiple held local motion vectors LMV and is held, to determine reliability. According to the present embodiment, the weighting coefficient W for each local motion vector LMV is computed with the above-described (Expression 2). The global motion computing unit 217 extracts only local motion vectors LMV having high reliability wherein the weighting coefficient W=1.

The global motion computing unit 217 executes computing processing to computing a global motion GM using only the extracted local motion vectors LMV having high reliability. In this example, the global motion computing unit 217 uses affine transform to estimate and compute global motion. The global motion computing unit 217 then supplies the computed global motion GM to the global motion vector computing unit 218.

The global motion vector computing unit 218 applies the global motion GM to a coordinate position (e.g. the center position) on the target block, whereby the global motion vector GMV of the target block is computed.

The global motion vector computing unit 218 supplies the computed global motion vector GMV to the background/moving subject determining unit 210. The local motion vector LMV from the local motion vector computing unit 214 is also supplied to the background/moving subject determining unit 210.

At the background/moving subject determining unit 210, as described above, the local motion vector LMV for each target block and the global motion vector GMV are compared, and the degree of matching of both of the target block, i.e. the degree of background matching, is determined. In this case, at the background/moving subject determining unit 210, the correlation values (SAD values) for the reference block corresponding to each of the local motion vectors LMV and global motion vector GMV are compared, and the background and moving subjects are determined.

Now, the correlation value (SAD value) obtained in order to compute the global motion with the local motion vector computing unit 214 can also be used for comparison with the background/moving subject determining unit 210.

However, in this case, with the local motion vector computing unit 214, the local motion vector and SAD values have to be held only the amount of processing time with the global motion computing unit 217 and global motion vector computing unit 218. In this case, particularly, determination has not been made as to which reference vector the global motion vector GMV corresponds to, whereby all of the SAD values to be held in SAD value table for each of the target blocks have to be held. Therefore, capacity of the memory to hold the local motion vectors LMV and SAD values becomes very large.

Considering this, according to the present embodiment, the local motion vectors LMV and SAD values for comparison with the background/moving subject determining unit 210 are recalculated at the local motion vector computing unit 214. Thus, memory to hold the local motion vectors LMV and SAD values does not have to be provided to the local motion vector computing unit 214, and the problem of memory capacity can be avoided.

Accordingly, the background/moving subject determining unit 210 obtains the hit rate β that shows the degree of background matching for the target block, using the recalculated local motion vector LMV and SAD value. The SAD value for a reference vector (reference block position) that matches the global motion vector GMV is also obtained at the same time as recalculating. The background/moving subject determining unit 210 then uses the recalculated local motion vector LMV and SAD value to determine whether the target block is a background portion of moving subject portion.

The background/moving subject determining unit 210 corrects the SAD value for the reference block corresponding to the global motion vector GMV to be the value reflecting the amount of image noise so as to compare with the SAD value of the reference block corresponding to the local motion vector LMV, as described above.

The image noise is generally in accordance with the luminance value of the image. Thus, according to the present embodiment, the maximum luminance value MaxTAR from the maximum value luminance value detecting unit 2192 of the contrast computing unit 219 and the minimum luminance value MinTAR from the minimum luminance value system unit 2193 are supplied to the background/moving subject determining unit 210.

The background/moving subject determining unit 210 detects the luminance value of the image as the difference between the maximum luminance value MaxTAR and minimum luminance value MinTAR, and according to the detected luminance value, determines the correction value of the SAD value for the reference block corresponding to the global motion vector GMV.

The background/moving subject determining unit 210 compares the correlation value of after the correction and the correlation value for the reference block corresponding to the local motion vector, and determines whether or not the correction value of the SAD value for the reference block corresponding to the global motion vector GMV is smaller than the correlation value for the reference block corresponding to the local motion vector (the correlation value is great). When small, the target block is evaluated and determined to be a background portion.

In the case of a hit rate β that shows that the target block is a background portion, the background/moving subject determining unit 210 outputs the global motion vector GMV as the NR processing motion vector MNnr. Otherwise, the background/moving subject determining unit 210 outputs the local motion vector LMV to the target block as the NR processing motion vector MVnr.

As described above, the NR processing motion vector MVnr from the background/moving subject determining unit 210 is supplied to the motion compensation image generating unit 16.

At the motion compensation image generating unit 16, deforming processing that corresponds to the NR processing motion vector MVnr is performed as to the image data REFv of the reference frame send through the motion vector computing unit 21, and the data MCv of the motion compensation image is generated. The generated MCv of the motion compensation image is then supplied to the adding unit 17.

Also, the background/moving subject determining unit 210 supplies the obtained hit rate β to the adding rate calculating unit 21. The adding rate calculating unit 21 computes the adding rate α of the motion compensation image as to the target image, based on the hit rate β.

In this case, the adding rate α can calculate in block increments or in pixel increments. Even in the case of calculating in pixel increments, the hit rate β is in block increments, so it goes without saying that it is the block increments which is involved in the hit rate β calculating the adding rate.

In the case of calculating the adding rate α in block increments, the adding rate α which corresponds only to the hit rate β can also be calculated. Of course, other adding rate calculation elements other than the hit rate β can be explored to calculate the adding rate α. According to the present embodiment, not only the hit rate β but also the adding rate α is calculated, exploring factors such as the difference between the pixel increments of the target image and the motion compensation image, the noise of the target image, and so forth.

The adding rate α obtained with the adding rate calculating unit 21 is supplied to the adding unit 23. The adding unit 23 adds the image data MCv of the motion compensation image to the image data TGv of the target image sent hereto, with the adding rate α.

According to the present embodiment, and the adding unit 23, the target image and motion compensation image are layered together with the adding rate according to the background matching degree (hit rate β) of the target block. That is to say, at the still image portion, the adding rate of the motion compensation image as to the target image becomes high, and at the moving subject portion the adding rate of the motion compensation image as to the target image becomes low.

According to the present embodiment, the images of the background portions and the moving subject portions can be layered together at adding rates appropriate to each. Accordingly, the NR image obtained from image layering becomes a favorable image.

Moreover, the global motion and global motion vector GMV according to the present embodiment are generated from a local motion vector LMV having high reliability, whereby the motion vector has high accuracy and an adding NR image that is favorable to that point also can be obtained.

Overall Processing Flow for Generating NR Image

Figure 19:
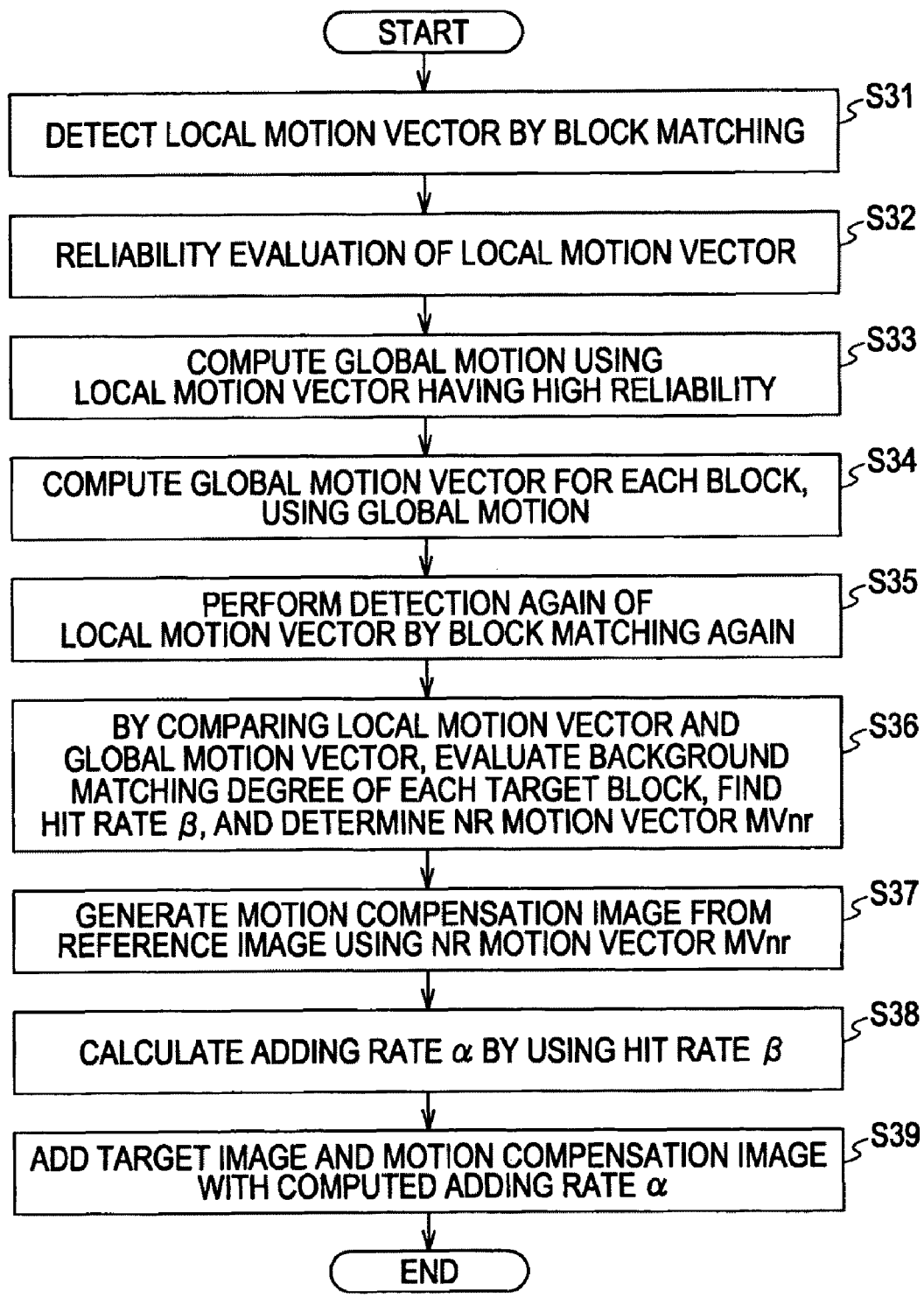
FIG. 19 is a diagram showing a flowchart to describe primary processing operations of an embodiment of the image processing apparatus according to the present invention.

FIG. 19 is a flowchart showing the processing flow to generate an NR image for the imaged image taken in to the image memory 4. First, detection of the local motion vector LMV by block matching is performed with the local motion vector computing unit 214 at the motion vector computing unit (step S31). Next, the motion vector reliability indicator value computing unit 216 computes the reliability indicator value Ft for the detected local motion vector LMV using the first minimal value MinSAD and second minimal value Btm2SAD of the SAD value calculated with the local motion vector computing unit 214 (step S32).

Next, the global motion calculating unit 217 extracts a local motion vector LMV having high reliability, based on the computed reliability indicator value Ft. The global motion computing unit 217 then uses only the detected local motion vector LMV having high reliability to compute the global motion GM (step S33).

Next, the global motion vector GMV for each target block is computed using the global motion GM computed in step S33 (step S34).

Also, re-block-matching processing is performed at the local motion vector computing unit 214 and the local motion vector LMV is redetected (step S35). The SAD value (MinSAD) of the reference block position (reference vector) wherein the local motion vector LMV has been detected is held, and the SAD value for the reference block corresponding to the global motion vector GMV computed in step S34 is also held. Note that at this time, the reliability indicator value Ft of the local motion vector LMV does not have to be computed.

Next, the background/moving subject determining unit 210 compares the local motion vector LMV computed in step S35 and the global motion vector GMV obtained in step S34, evaluates the background matching degree for each target block, and obtains the hit rate β. Further, the NR processing motion vector MVnr for each target block is defined, and output to the motion compensation image generating unit 22 (step S36).

In the comparison in step S26 of the local motion vector LMV and global motion vector GMV, the SAD values for the reference block corresponding to each of the local motion vector LMV and global motion vector GMV are compared. Further, a correction corresponding to the image noise is added to the SAD value for the reference block corresponding to the global motion vector GMV, as described above.

Next, the NR processing motion vector MVnr defined in step S36 is used at the motion compensation image generating unit 22 to generate motion compensation image for each reference block and outputs this to the adding unit 23 (step S37).

Next, the adding rate calculating unit 21 uses the hit rate β obtained in step S36, and as described above, and in this example computes the adding rate α for each pixel and supplies this to the adding unit 23 (step S38).

Next, the motion compensation image generated in step S37 is layered over the target image for each pixel with the adding rate α computed in step S28 the NR image is generated (step S39). This ends the NR image processing.

Note that FIG. 19 shows the processing operations for one of a certain target frame. In the case of layering three or more multiple images, the generated adding NR image is the target frame, while the image to be newly layered is the reference frame, and the processing in FIG. 19 is repeated.

Next, detailed processing operations for each of the primary units of the motion vector computing unit 21 will be further described.

Processing Operations of Global Motion Computing Unit 217 and Global Motion Vector Computing Unit 218

As a method to yield the most favorable global motion from many unidentified vectors, the present embodiment uses a method to use affine transform, as described above. This method is a method to measure convergence of global motion parameters using a least square method, which gradually removing local motion vectors of blocks that are difficult to apply global motion such as a moving subject or the like, from among blocks having high reliability.

FIG. 20 shows a general equation of affine transform as (Expression 3). In this (Expression 3), v donates a horizontal component of the motion vector of the target block, w denotes a vertical component of the motion vector of the target block, and a, b, c, d, e, and f denote affine parameters. Now, with affine transform, the affine parameters a, b, c, d, e, and f are fixed values. x and y denote the horizontal components and vertical components of the center coordinates of the target block.

The affine parameters obtained through the global motion convergence computing process and the motion vector according to the global motion (this vector is called an ideal motion vector) are obtained from the center coordinates of each target block. The sum total ε of the errors between this ideal vector and a measured (detected by block matching) motion vector is expressed as shown in (Expression 4) in FIG. 21.

The proposition to obtain global motion is an estimate of the affine parameters a through f that minimize the sum total ε of the errors, and this can be solved for example by the least square method. The guiding process of the affine parameters a through f and the results thereof are shown in (Expression 5), (Expression 6), and (Expression 7) of FIGS. 22, 23, and 24.

Thus, the parameters of the affine transform are comparatively readily computed, but the advantage thereof is great. Affine transform can correspond to parallel motion, rotation, and expansion/reduction of images, as well as a certain amount of deforming, whereby most hand trembling, i.e. minor corrections of camera work, can be covered.

Note that documents describing related art for affine transform include Japanese Unexamined Patent Application Publication No. 2005-321902.

Figure 25:
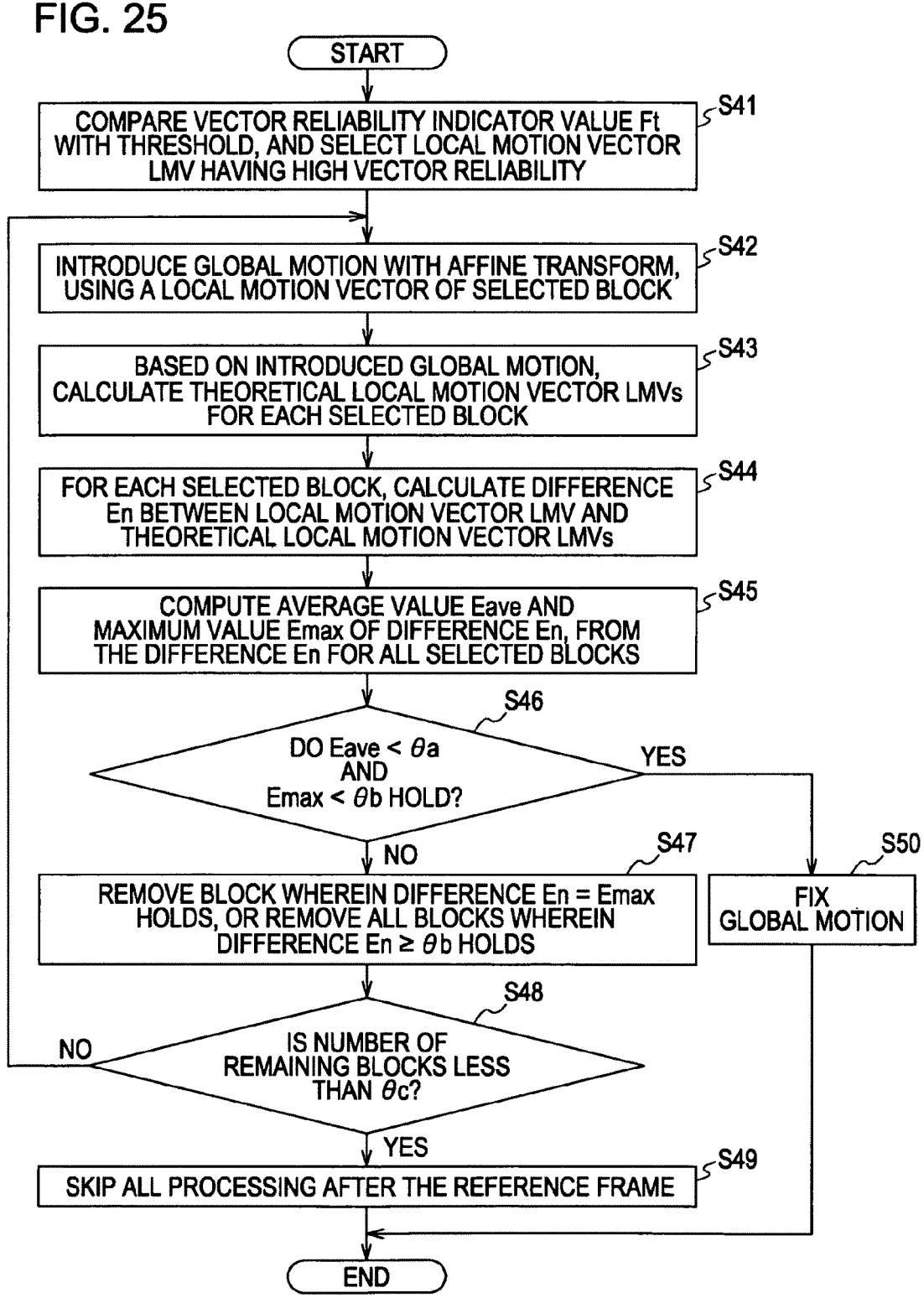
FIG. 25 is a diagram to describe an Expression used to describe processing operations of a global motion computing unit of an embodiment of the image processing apparatus according to the present invention.

An example of computing processing of the global motion GM at the global motion computing unit 217 of this example will be described according to the flowchart in FIG. 25.

First, the global motion computing unit 217 compares the motion vector reliability indicator value Ft for each of the multiple local motion vectors LMV that are held and a predetermined threshold. From the comparison results thereof, only target blocks (hereafter written as "blocks" for simplification of description) of local motion vectors LMV wherein the motion vector reliability indicator value Ft has higher reliability than the predetermined threshold are selected (step S41). This processing is applicable to cases using the binary system of 1 and 0 as weighting coefficients W, as described using (Expression 2).

Next, the global motion computing unit 217 uses only the local motion vectors LMV of the multiple selected blocks, and using affine transform, yields (estimates) the global motion GM (step S42). That is to say, the affine parameters a through f are computed for the global motion GM.

Next, based on the yielded global motion GM, theoretical local motion vectors LMVs for each of the selected blocks used for the computation are calculated (step S43).

Next, for each of the selected multiple blocks, the difference En between the local motion vector LMV obtained with the block matching processing and the theoretical local motion vector LMVs obtained in step S43 are calculated (step S44).

If emphasizing the accuracy of the computation, the difference calculation between the motion vector obtained with the block matching and the theoretical motion vector can be calculated as correct distance calculation with a 3-square theorem. However, if emphasizing lightweight more than accuracy of the computation, the distance for both horizontal and vertical can be obtained, and the sum thereof can be used as an approximate distance.

Next, using the difference En obtained for each of the multiple selected blocks, the average value Eave of all of the differences and the Maximum value Emax are computed (step S45). Determination is made as to whether the average value Eave is smaller than the threshold θa predetermined thereto, and whether the maximum value Emax is smaller than the threshold θb predetermined thereto (step S46).

In the case that, as a result of the determining in step S46, determination is made that the conditions have not been satisfied, the block that is difference En=Emax, from among the difference En of the blocks obtained in step S44, is removed from the multiple blocks yielding the global motion. Alternatively, the block that is difference En>θb is detected, and all of the detected blocks are removed from the multiple blocks yielding the global motion GM (step S47).

Next, as a result of the block removal in step S47, determination is made as to whether or not the number of remaining blocks is less than a threshold θc of a predetermined number (step S48). In the event determination is made in step S48 that the number of remaining blocks is not less than the threshold θc, the flow is returned to step S42, and the processing of step S42 and thereafter is repeated with the remaining blocks serving as the selected blocks.

In the event that the number of remaining blocks is less than the threshold θc, an appropriate global motion GM is not obtained, whereby the image of the reference frame in question is unusable for the layering of the images of this embodiment. Thus, in the event determination is made in step S48 that the number of remaining blocks is less than the threshold θc, the processing thereafter for the reference frame is skipped so as to not be performed at all (step S49).

In step S46, in the event that the average value Eave of the difference En is smaller than the threshold θa and the maximum value Emax of the difference En is smaller than the threshold θb, we can say that the computation has converged, and the global motion GM is established as it is at that point in time (step S50). The processing routine is then ended.

Note that in step S47, whether to remove only the blocks wherein the difference En is the maximum error Emax or whether to remove all of the blocks wherein the difference En is a threshold θb or greater can be determined by the speed of convergence and balance of accuracy in the event of obtaining the global motion vector GMV. If prioritizing accuracy, the former method is used, and the error blocks can be removed one at a time, and if prioritizing speed of convergence, the latter may be selected.

The global motion vector computing unit 218 computes the global motion vector GMV for each target block, based on the global motion GM computed as described above. That is to say, expanded affine transform parameters a through l for the computed global motion GM are used to obtain the motion vector (applicable to the theoretical local motion vector LMVs) for each target block with the (Expression 3) in FIG. 20. In (Expression 3) in FIG. 20, the center position coordinates of each target block are used for x and y. The obtained motion vector becomes the global motion vector GMV for each target block.

The global motion vectors GMV for each target block obtained as described above are supplied to the motion compensation image generating unit 22. At the motion compensation image generating unit 22, the global motion vector GMV for each target block is used to generate the motion compensation image for each target block, and the generated motion compensation image for each block are supplied to the adding unit 23.

Configuration Example and Processing Operation of Background/Moving Subject Determining Unit 210

The SAD value for the reference block corresponding to the global motion vector GMV computed at the global motion vector computing unit 218 is obtained at the background/moving subject determining unit 210 in the event of block matching again with the local motion vector computing unit 214. The obtained SAD value is corrected with a correction value according to the image noise as described above. Two methods will be provided according to the present embodiment as correction methods for the correction value thereof.

First Example

SAD Value Correction by Adding Offset

Figure 26:
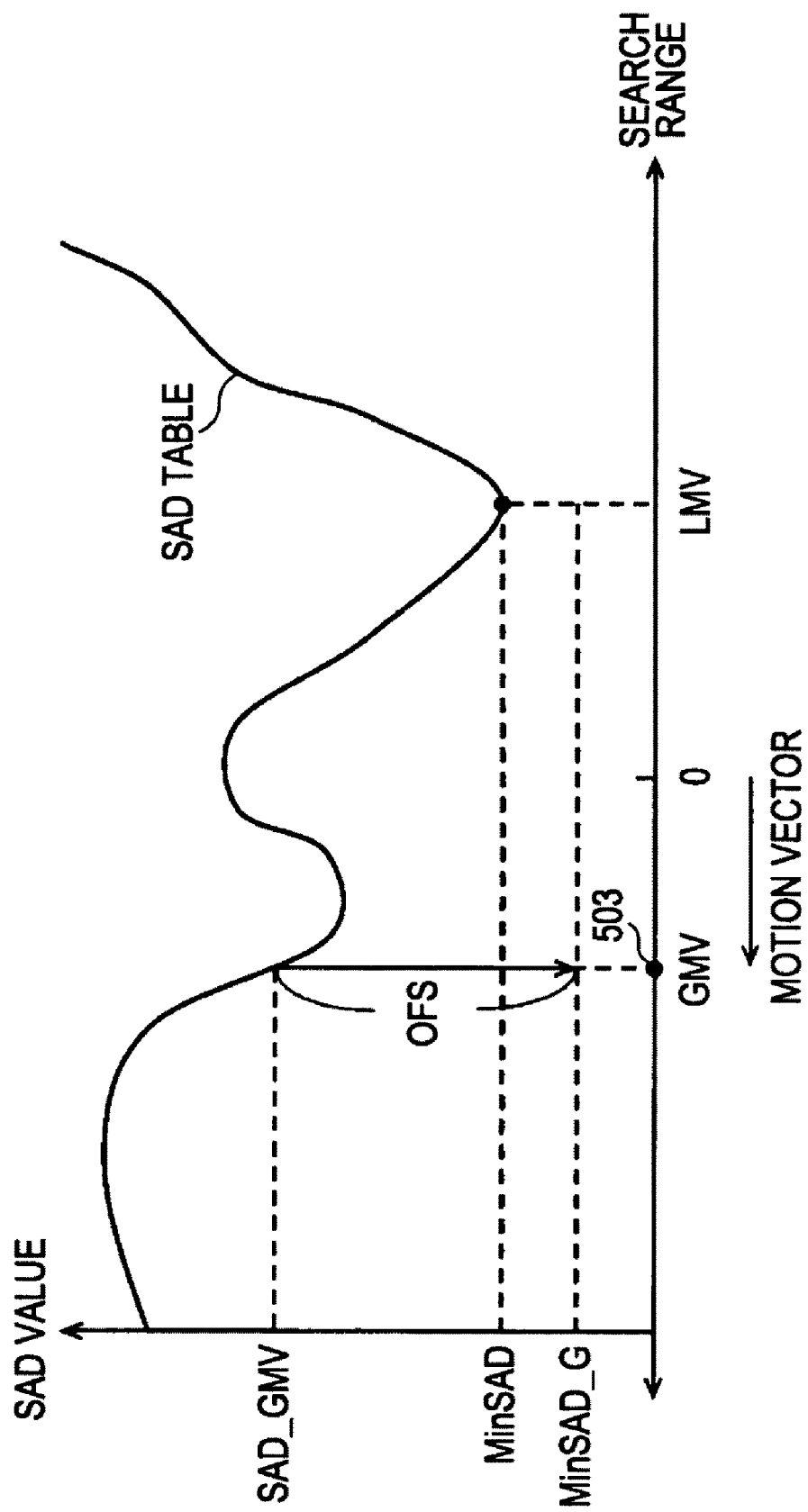
FIG. 26 is a diagram used to describe processing to evaluate background matching degrees of target blocks, using a global motion vector according to the present invention.

FIG. 26 is a diagram to describe the thinking in the first example. FIG. 26 is a diagram showing the SAD table content (SAD value) for one target block when the horizontal axis is taken as the search range and the vertical axis is taken as the SAD value. The various values of the vertical axis is a reference block position (reference vector), and the solid line shows the content of the SAD table. This is completely the same as that shown in FIG. 17.

In FIG. 26, the position 501 of the reference block (i.e. reference vector) serving as the minimum SAD value is detected by the block matching as a local motion vector LMV, similar to FIG. 17. On the other hand, the position of the reference block serving as the global motion vector GMV is position 503 in FIG. 26.

At this time, if the SAD value of the local motion vector LMV and the SAD value of the global motion vector GMV are in a range of differences according to the amount of noise in the image, the global motion vector GMV may be the reference vector taking the minimum SAD value.

That is to say, the SAD value of the global motion vector GMV (the position of the reference block) had been intended to be the minimum, but because of the noise the position of a different reference block (this is the local motion vector LMV) can result in being detected.

Thus, with this example, an offset value OFS according to the amount of noise in the image is added to the SAD value of the global motion vector GMV and is corrected. In the case of this example, the offset value OFS is subtracted from the SAD value at the global motion vector GMV (let us say (SAD_GMV) and is corrected. That is to say, if the SAD value after correction is MinSAD_G, then $$\text{MinSAD\_}G = \text{SAD\_GMV} - \text{OFS} \quad \text{(Expression 8)}$$

Now, if too great of an offset value OFS is set, even the moving subject motion vector can be determined as a minimum SAD value. Thus, according to the present embodiment, the offset value OFS is set to a value smaller than threshold th (see Expression 7) for the reliability indicator value Ft of the local motion vector.

At the background/moving subject determining unit 210, the post-correction SAD value MinSAD_G and the SAD value (MinSAD) with the local motion vector LMV are compared. As a result of the comparison thereof, if MinSAD_G<MinSAD holds, then the minimum value of the SAD value for the target block is evaluated as the corrected value of the SAD value for the reference block corresponding to the global motion vector GMV. FIG. 26 shows the case wherein MinSAD_G<MinSAD holds.

That is to say, as shown in FIG. 26, in the case that MinSAD_G<MinSAD holds, then the true local motion vector for the target block is determined as matching the global motion vector GMV. In this case, the background matching degree as to the target block is evaluated as high, and the hit rate β for the target block becomes a large value. The NR processing motion vector for the target block is a global motion vector GMV.

Now, according to the present embodiment, the hit rate β is a value in the range of $0 \leq \beta \leq 1$. In the case that the local motion vector LMV and the global motion vector GMV completely match, the hit rate β can be set as β=1. However, with this example, an evaluation of whether the local motion vector LMV and the global motion vector GMV completely match is not performed, and an evaluation is made with the comparison of the post-correction SAD value MinSAD_G and the SAD value (MinSAD) of the local motion vector LMV. Accordingly, cases wherein the local motion vector LMV and the global motion vector GMV completely match are included in the evaluation results, but cases of not matching are also included.

As described later, according to the present embodiment, if MinSAD_G<MinSAD holds, the hit rate β is set at β=0.75, for example. β=1 is not set here because the comparison results include cases wherein the local motion vector LMV and the global motion vector GMV do not match, as described above.

Figure 27:
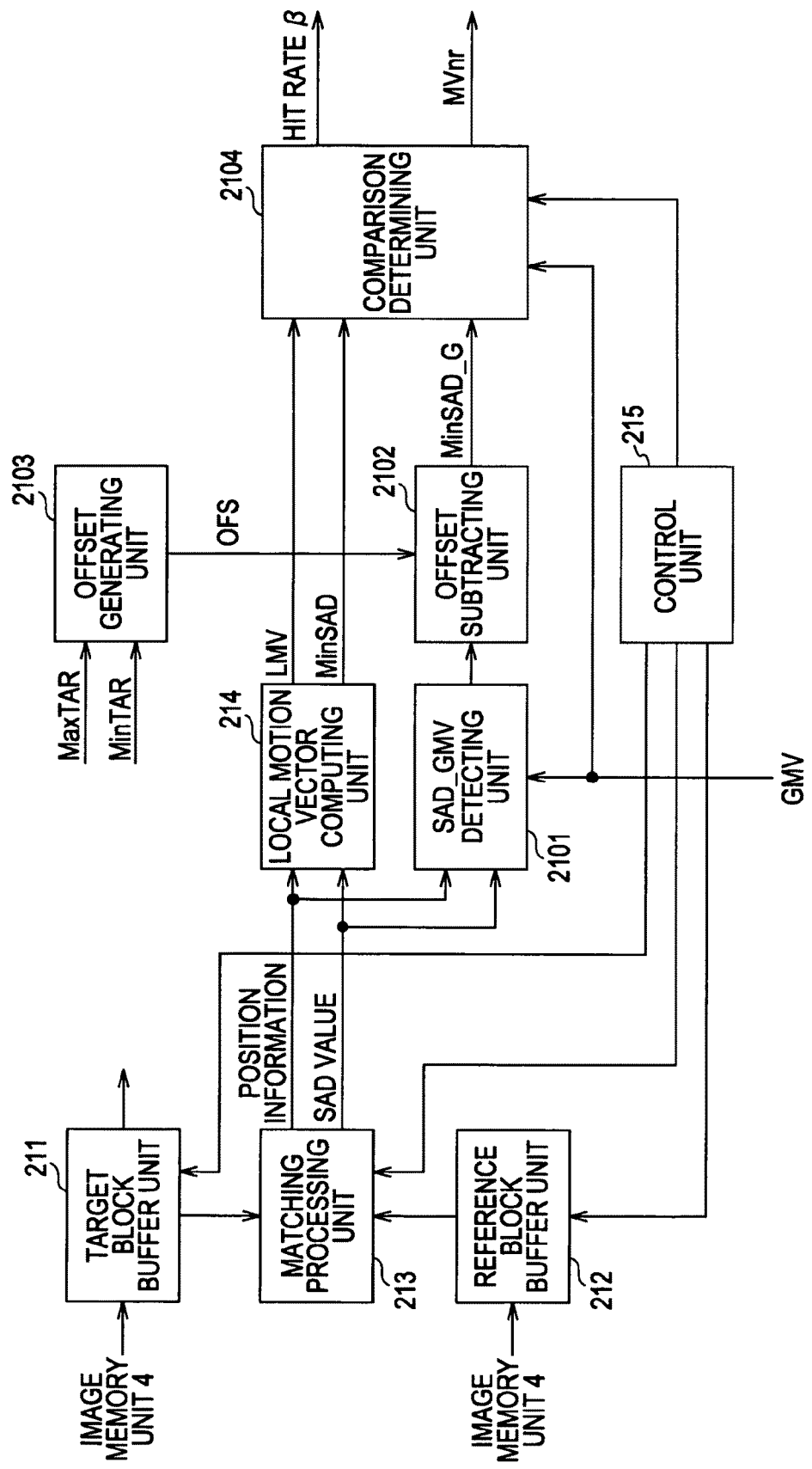
FIG. 27 is a block diagram to describe a configuration example of a background/moving subject determining unit of an embodiment of the image processing apparatus according to the present invention.

FIG. 27 shows a configuration example (functional block diagram) of the background/moving subject determining unit 210 in the case of the first example and the periphery thereof. In the example in FIG. 27, the background/moving subject determining unit 210 is made up of a SAD_GMV detecting unit 2101, an offset subtracting unit 2102, and offset generating unit 2103, and a comparison determining unit 2104.

In the case of this example, the SAD value computed at the time of re-block-matching from the matching processing unit 213 and the position information of each reference block (reference vector information) is supplied to the local motion vector computing unit 124. The local motion vector computing unit 214 detects the minimum SAD value MinSAD at the time of re-block-matching, and computes the local motion vector LMV (position information of reference block (reference vector information)). As a result of the re-block-matching processing, the local motion vector computing unit 214 supplies the obtained local motion vector LMV and the minimum SAD value MinSAD to the comparison determining unit 2104.

The SAD value computed at the time of re-block-matching from the matching processing unit 213 and the position information of each reference block (reference vector information) are supplied to the SAD_GMV detecting unit 2101. The SAD_GMV detecting unit 2101 detects the SAD value SAD_GMV for the reference block of the reference vector matching the global motion vector GMV, and supplies the detected SAD value SAD_GMV to the offset subtracting unit 2102.

At the offset subtracting unit 2102, the offset value OFS from the offset generating unit 2103 is subtracted from the SAD value SAD_GMV from the SAD_GMV detecting unit 2101, and generates the post-correction SAD value MinSAD_G. the offset subtracting unit 2102 then supplies the generated post-correction SAD value MinSAD_G to the comparison determining unit 2104.

The offset generating unit 2103 generates the offset value OFS according to the image noise, and supplies this to the offset subtracting unit 2102. Considering that the image noise is according to the luminance value of the image, in this example information of a corresponding table between the offset value OFS of various types of luminance values is stored in the offset generating unit 2103.

The offset generating unit 2103 computes the luminance value of the target block as the difference between the maximum luminance value MaxTAR from the maximum luminance value detecting unit 2192 and the minimum luminance value MinTAR from the minimum luminance value detecting unit 2193. The offset generating unit 2103 searches the corresponding table with the computed luminance value of the target block as an argument, and obtains the offset value OFS corresponding to the luminance value of the argument.

The comparison determining unit 2104 compares the minimum SAD value MinSAD that corresponds to the local motion vector LMV and the post-correction SAD value MinSAD_G from the offset subtracting unit 2102, and generates and outputs the hit rate β according to the comparison results thereof.

Also, the local motion vector LMV recomputed from the local motion vector LMV computing unit 214 and the global motion vector GMV from the global motion vector computing unit 218 are supplied to the comparison determining unit 2104.

In the case that MinSAD_G<MinSAD holds, the background matching degree is high, whereby the comparison determining unit 2104 outputs the global motion vector GMV to the motion compensation image generating unit 22 as an NR processing vector MVnr. Also, in the case that MinSAD_G<MinSAD does not hold, the background matching degree is low, whereby the comparison determining unit 2104 is output to the motion compensation image generating unit 22 as an NR processing vector MVnr.

Note that the SAD value detecting unit 2101 of the global motion vector GMV and the offset subtracting unit 2102 may be configured so as to be included in the local motion vector computing unit 214. In this case, the local motion vector computing unit 214 performs re-block-matching while detecting the SAD value SAD_GMV for the reference block corresponding to the global motion vector GMV, and performs subtracting computations of the offset OFS.

Background/Moving Subject Determining Processing Flow

Figure 28:
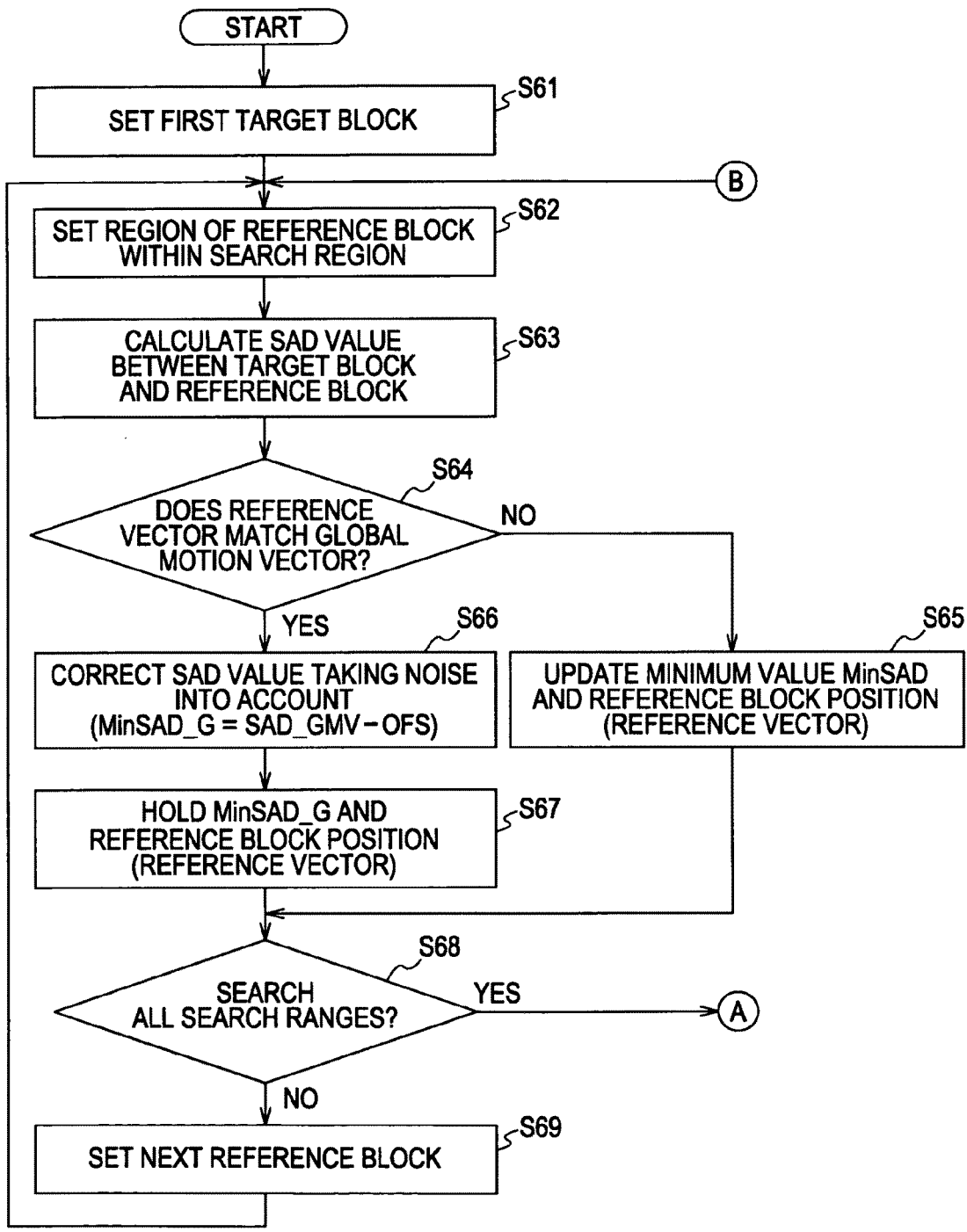
FIG. 28 is a diagram illustrating a portion of a flowchart to describe the background/moving subject determining unit of an embodiment of the image processing apparatus according to the present invention.
Figure 29:
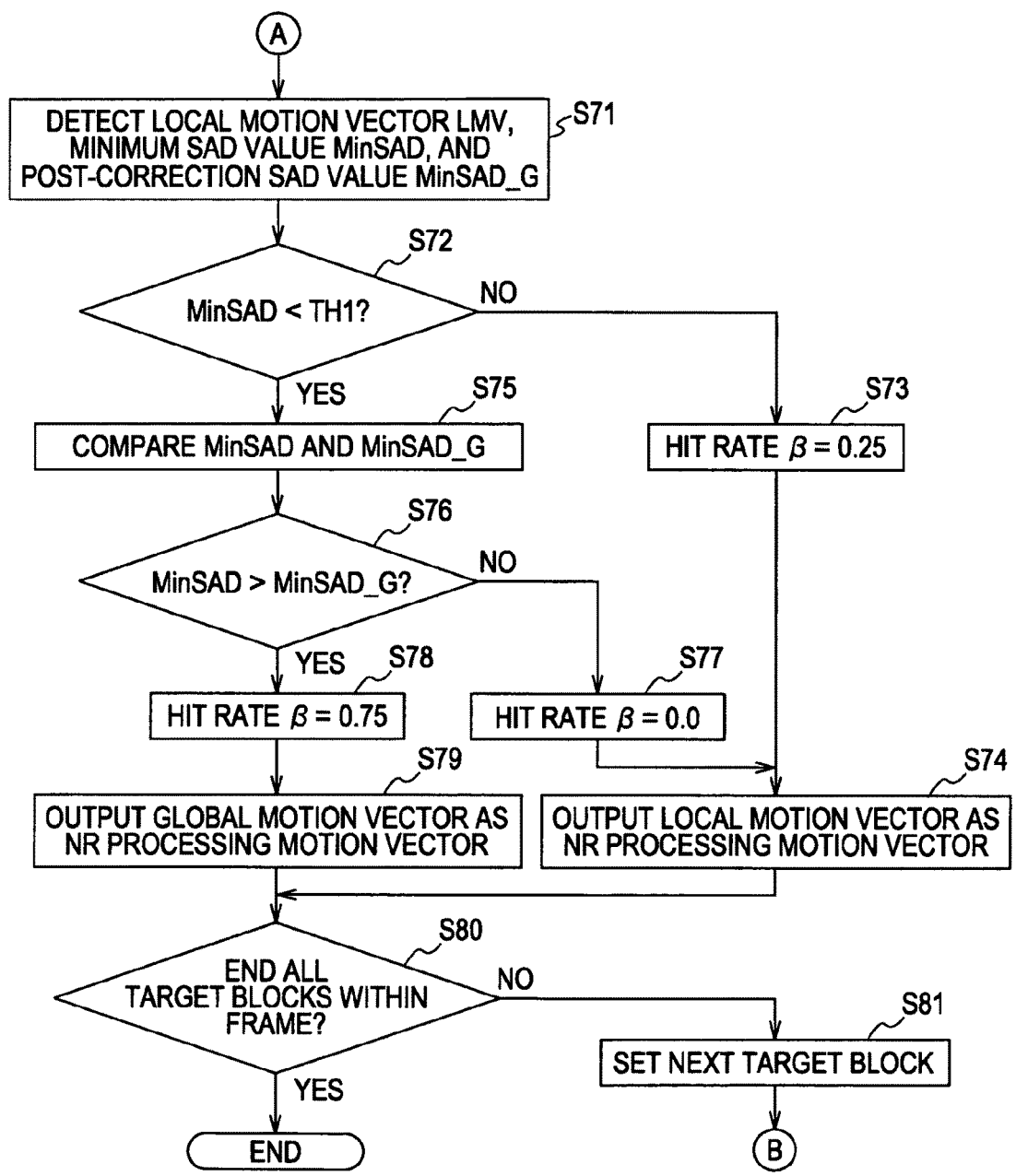
FIG. 29 is a diagram illustrating a portion of a flowchart to describe the background/moving subject determining unit of an embodiment of the image processing apparatus according to the present invention.

The flow of the re-block-matching processing with the local motion vector computing unit 214 and the background matching evaluation processing with the background/moving subject determining unit 210 will be further described with reference to the flowcharts in FIGS. 28 and 29. The processing in FIGS. 28 and 29 is executed by the various units based on control by the control unit 155. Note that the example in FIGS. 28 and 29 is of a case that the SAD_GMV detecting unit 2101 and offset subtracting unit 2102 are configured so as to be included in the local motion vector computing unit 214.

First, under the control of the control unit 215, the re-block-matching is started, and the first target block is set in the target block buffer unit 211 (step S61). Next, under the control of the control unit 215, the reference block for block matching processing is set from among the image data of the reference frames in the matching processing range subjected to buffering by the reference block buffer 212 (step S62).

The matching processing unit 213 performs block matching processing for the set target blocks and the set reference blocks, and calculates the SAD values. The matching processing unit 213 supplies the obtained SAD value to the local motion vector computing unit 214, along with the position information (reference vector) of the reference block (step S63).

The local motion vector computing unit 214 determines whether or not the reference vector matches the global motion vector GMV (step S64). This is applicable to the processing operations of the SAD_GMV detecting unit 2101.

In the case determination is made in step S64 that the reference vector is not matching the global motion vector GMV, the local motion vector computing unit 214 performs updating processing with the minimum SAD value MinSAD and the reference block position thereof (reference vector) (step S65). That is to say, the minimum SAD value MinSAD that is held up to that time and the newly computed SAD value are compared, and the smaller SAD value is held as the minimum SAD value MinSAD while the reference block position (reference vector) is updated to that which exhibits the minimum SAD value.

Next, the control unit 215 determines whether or not the block matching between the target blocks for all of the reference blocks within the search range has ended (step S68).

In the case determination is made in step S68 that the processing for all of the reference blocks has not ended, the control unit sets the next reference block (step S69). The flow is returned to step S62, and the processing in step S62 and thereafter is repeated.

Also, in the case determination is made in step S64 that the reference vector matches the global motion vector GMV, the offset value OFS is subtracted from the SAD value SAD_GMV thereof (step S66). The subtraction result thereof as the post-correction SAD value MinSAD_G and the reference block position (reference vector=global motion vector GMV) thereof are held (step S67).

The flow is advanced to step S68, and determination is made as to whether or not the processing for all of the reference blocks within the search range has ended.

In the case determination is made in step S68 that the processing for all of the reference blocks within the search range has ended, the local motion vector computing unit 214 detects the local motion vector LMV and the minimum SAD value MinSAD, and supplies this to the comparison determining unit 2104. Also, the local motion vector computing unit 214 also supplies the post-correction SAD value MinSAD_G to the comparison determining unit 2104 (step S71 in FIG. 29).

The comparison determining unit 2104 of the background/moving subject determining unit 210 determines whether or not the minimum SAD value MinSAD is smaller than a predetermined threshold TH1 (step S72). The processing in this step S72 is provided to handle problems such as the following.

That is to say, in the case that a block applicable to the moving subject portion on the target image disappears from the reference image due to movement or takes a large deformity, a situation occurs wherein the target block is not matchable as to any of the reference blocks within the search range.

In such a case, the SAD value of the SAD table is a large value, becomes a similar value, and other values becomes closer to the minimum SAD value MinSAD. In such a state, the pos-correction SAD value MinSAD_G having subtracted the offset value OFS from the SAD value with the reference vector matching the global motion vector GMV is consistently smaller than the minimum SAD value MinSAD, and can be detected as a background portion in error.

Thus, in order to avoid this problem, according to the present embodiment, the SAD value with the reference vector matching the global motion vector GMV is corrected, and in the case that the minimum SAD value MinSAD is greater than the threshold TH1, the processing to determine the background matching degree is not performed.

Accordingly, in the case determination is made in step S72 that the minimum SAD value MinSAD is greater than the threshold TH1, the comparison determining unit 2104 does not perform the background matching degree determination which uses the global motion vector GMV, and sets the hit rate to β=0.25 (step S73). Not setting to β=0 is from consideration that even among the target blocks that have SAD values greater than the threshold TH1, there may be blocks that match the background.

The comparison determining unit 2104 outputs the recalculated local motion vector LMV to the motion compensation image generating unit 22 as an NR processing motion vector of the target block (step S74).

Next, the control unit 215 determines whether or not the processing for all of the target blocks within the target frame has ended (step S80), if not ended, the next target block is set (step S81). The flow is then returned to step S62, and the processing in step S62 and thereafter is repeated under the control of the control unit 215.

Also, in the case determination is made in step S72 that the minimum SAD value MinSAD is smaller than the threshold TH1, the comparison determining unit 2104 compares the minimum SAD value MinSAD and the post-correction SAD value MinSAD_G (step S75). The comparison determining unit 2104 determines whether or not MinSAD>MinSAD_G holds (step S76), and in the case determination is made otherwise, the target block is considered to not match the background, and the hit rate β becomes β=0 (step S77).

Following step S77, the flow is advanced to step S74, and the comparison determining unit 2104 outputs the recalculated local motion vector LMV to the motion compensation image generating unit 22 as the NR processing motion vector of the target block. The flow is then advanced to step S80, and the processing in step S80 and thereafter is repeated.

Also, in the case determination is made in step S76 that MinSAD>MinSAD_G holds, the hit rate β is set to β=0.75, as the degree of the target block matching the background is high (step S78). The comparison determining unit 2104 outputs the global motion vector GMV as the NR processing motion vector of the target block to the motion compensation image generating unit 22 (step S79).

Following step S79, the flow is advanced to step S80, and the control unit 215 determines whether processing for all of the target blocks within the target frame has ended. In step S80, in the case determination is made that processing for all of the target blocks within the target frame has not ended, the control unit 215 sets the next target block (step S81) and subsequently returns to step S62.

Also, in step S80, in the case determination is made that processing for all of the target blocks within the target frame has not ended, the control unit 215 ends the background/moving subject determining processing operations.

Note that according to the above-described embodiment, the offset value OFS is subtracted from the SAD value SAD_GMV of the global motion vector GMV, the corrected SAD value MinSAD_G is obtained, and is compared to the minimum SAD value MinSAD. However, comparing the value of adding the offset value OFS to the minimum SAD value MinSAD of the local motion vector LMV (MinSAD+OFS) and the SAD value SAD_GMV of the global motion vector GMB results in the same value.

Second Example

Correction of SAD Value by Gain Multiplication

In the above-described first example, the SAD value SAD_GMV is corrected for the reference block of the reference vector position matching the global motion vector GMV by the addition of the offset value OFS.

Similarly, the SAD value SAD_GMV can also be corrected by multiplying gain g that takes into account the amount of image noise, instead of adding the offset. In the case of this example, the SAD value SAD_GMV is multiplied by the amount of gain in the direction of getting smaller, whereby gain g becomes g<1. Note that when the correlation value becomes greater in accordance with the strength of correlation, it goes without saying that g>1.

The post-correction SAD value MinSAD_G of the SAD value SAD_GMV with the global motion vector GMV becomes the expression $$\text{MinSAD\_}G = \text{SAD\_GMV} \times g \qquad \text{(Expression 9)}$$

Configuration Example of Adding Rate Calculating Unit 24

According to the present embodiment, the adding rate calculating unit 24 obtains an adding rate α (0≦α≦1) in pixel increments. As described above, basically, the adding rate α in accordance with the difference in pixel increments between the target image and the motion compensation image and the hit rate β. Therefore, the hit rate β and the target image data TGv and data motion compensation image data MCv are supplied to the adding rate calculating unit 24.

If the difference in pixel increments between the target image and motion compensation image is great, this is likely to be a moving portion, whereby the adding rate α should be low, but if there is no difference or a small difference in pixel increments, the adding rate α may be higher. However, in the case that it is unknown whether the target bock is a background still image portion or a moving subject portion, as described earlier, the adding rate α has to be suppressed to be comparatively low so that double exposures in the moving portions do not stand out.

However, according to the present embodiment, the matching degree as background still image portions is obtained by the hit rate β, whereby the greater the hit rate β and the higher the background matching degree, the higher the adding rate α should be.

Also, according to the present embodiment, the image noise is further in accordance with the brightness of the image, whereby at the adding rate calculating unit 24 the noise according to the brightness of the image is taken into consideration relating to the difference in pixel increments between the target image and motion compensation image. That is to say, if the difference in pixel increments between the target image and motion compensation image is within the range of noise, the actual difference between the two is determined to be small. Also, when the difference in pixel increments is greater than the range of noise, the difference between the two is determined to be actually great.

To take this noise into consideration, the maximum luminance value MaxTAR and minimum luminance value MinTAR are supplied from the motion vector computing unit 21 to the adding rate calculating unit 24. At the adding rate calculating unit 24, the brightness for each target block, i.e. the brightness Lx is computed from the maximum luminance value MaxTAR and minimum luminance value MinTAR.

Also, in order to enable controlling the degree of adding externally from the adding rate calculating unit 24, the adding adjustment gain GA is supplied to the adding rate calculating unit 24 of the present embodiment. The value of the adding adjustment gain GA can be made up as a selection by the user from among the gain values prepared beforehand. Alternatively, the value of the adding adjustment gain GA may be configured in accordance with the ISO sensitivity of the imaged image. In the case of the latter, the brightness of the image is determined according to exposure value and shutter speed and so forth at the time of imaging, and the value of the adding adjustment gain GA can be defined. That is to say, in the case of a bright image, the noise stands out, whereby the gain is reduced so that the adding rate becomes small, and conversely, in the case of a dark image the gain is set to be great so that the adding rate is great.

Figure 30:
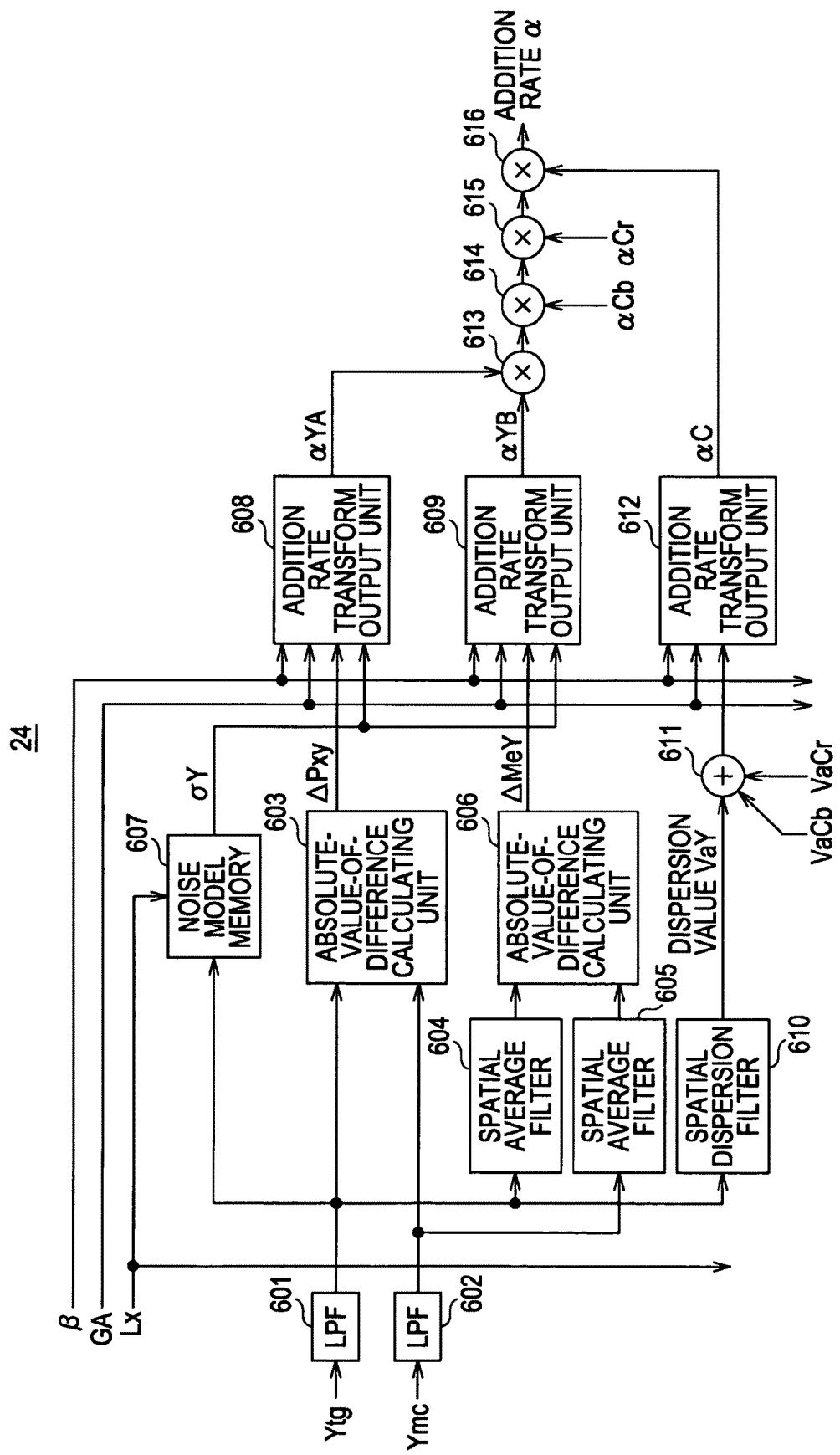
FIG. 30 is a block diagram to describe a portion of the configuration example of the addition rate calculating unit of an embodiment of the image processing apparatus according to the present invention.
Figure 31:
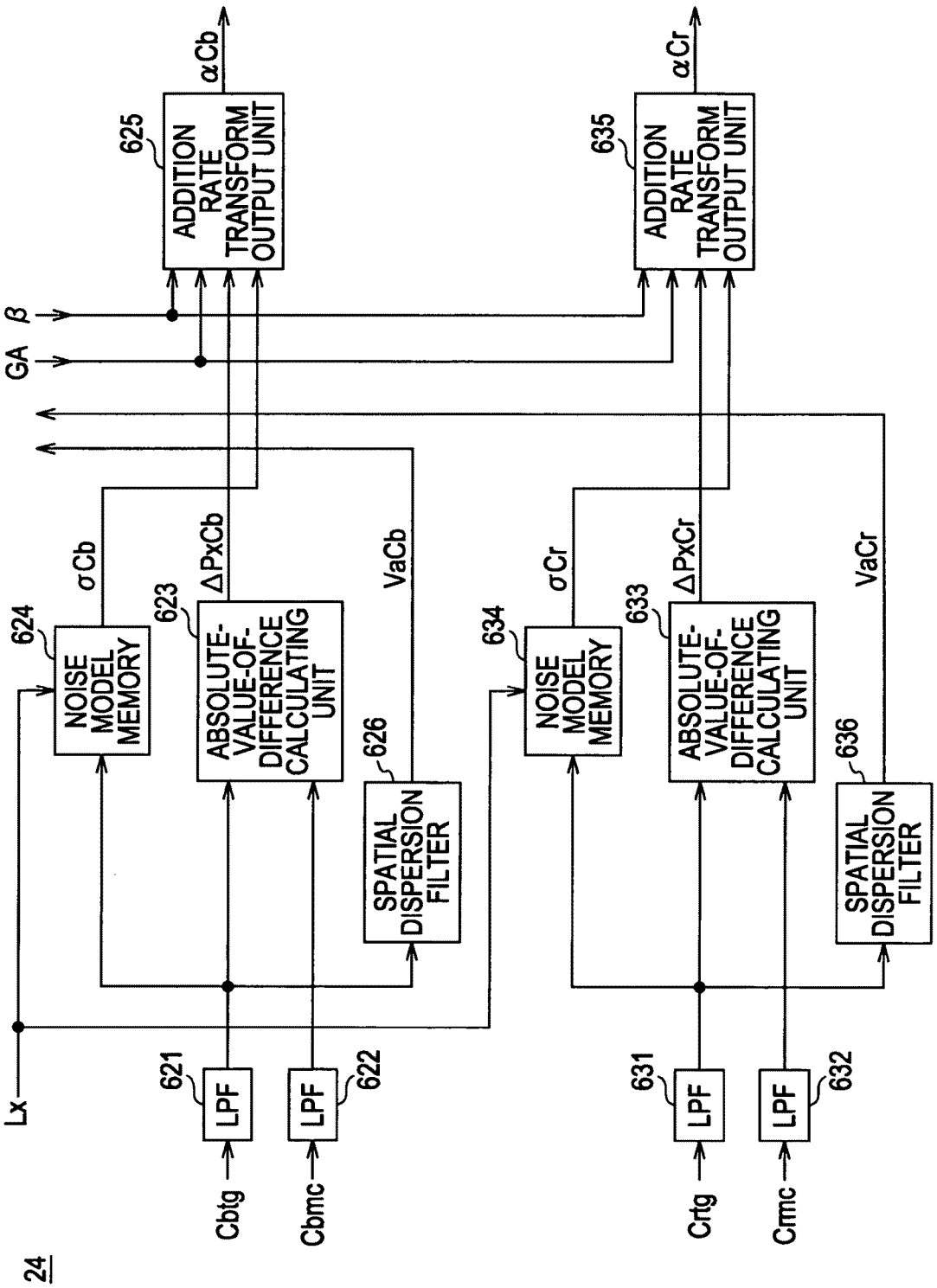
FIG. 31 is a block diagram to describe a portion of the configuration example of the addition rate calculating unit of an embodiment of the image processing apparatus according to the present invention.

A hardware configuration example of the adding rate calculating unit 24 according to the present embodiment is shown in FIGS. 30 and 31. In the example in FIGS. 30 and 31, the target image data TGv and the motion compensation image data MCv is subjected to processing separately for each of the luminance components and color difference components.

FIG. 30 shows the processing portion for the luminance components at the adding rate calculating unit 24. The adding rate calculating processing for the luminance components will first be described with reference to FIG. 30.

That is to say, luminance data Ytg out of the target image data TGv is supplied to a absolute-value-of-difference calculating unit 603. Also, the luminance data Ymc out of the motion compensation image data MCv is supplied to the absolute-value-of-difference calculating unit 603 via a low-pass filter 602.

The absolute-value-of-difference calculating unit 603 calculates the pixel absolute value of difference $\Delta P \times Y$ between the luminance data Ytg and luminance data Ymc for each pixel, and supplies the computed pixel absolute value of difference $\Delta P \times Y$ to an addition rate transform output unit 608.

The luminance data Ytg via the low-pass filter 601 is also supplied to a spatial average filter 604. The luminance data Ymc via the low-pass filter 602 is also supplied to a spatial average filter 605.

The spatial average filters 604 and 605 each obtain average values Mtg and Mmc of the eight pixels in the periphery of a pixel (called pixel of interest), and nine pixels with a free pixel, to obtain the pixel difference with the absolute-value-of-difference calculating unit 603. The spatial average filters 604 and 605 supply the obtained average values Mtg and Mmc to the absolute-value-of-difference calculating unit 606.

An average absolute value of difference $\Delta MeY$ between the average value Mtg and average value Mmc is calculated at the absolute-value-of-difference calculating unit 606, and the computed average difference value $\Delta MeY$ is supplied to the addition rate transform output unit 609.

Figure 32:
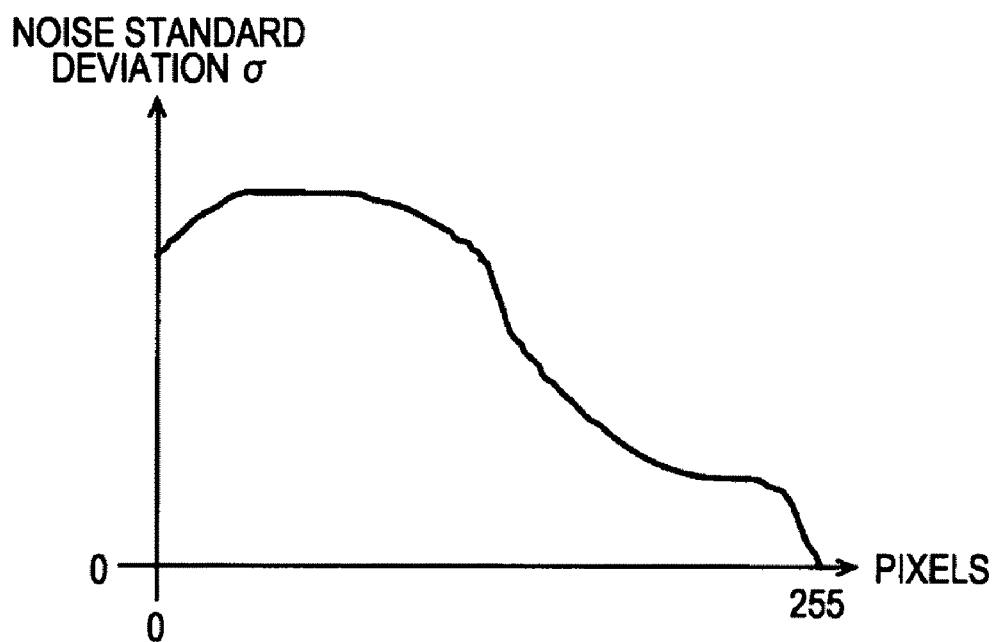
FIG. 32 is a diagram used to describe a configuration example of one example of an addition rate calculating unit according to an embodiment of the present invention.

According to this example, a noise model memory 607 for the luminance component is provided. A noise standard deviation $\sigma$ as to the luminance value of the pixel value is calculated beforehand and stored in the noise model memory 607. That is to say, when the luminance value of the pixel value is taken as the horizontal axis and the noise standard deviation $\sigma$ is taken as the vertical axis, the noise standard deviation $\sigma$ becomes as shown in FIG. 32, for example. As shown in FIG. 32, the noise standard deviation $\sigma$ as to a bright pixel is small, and the noise standard deviation $\sigma$ as to a bright pixel is large.

Note that the feature diagram in FIG. 32 is not RAW data, but shows imaging data after gamma correction has been applied. This differs from the case in FIG. 3 showing RAW data from the imaging device 11, but there is no substantial difference between the two.

With the noise model, noise differs by brightness of the image, whereby multiple noise models according to the image brightness Lx are stored in the noise model memory 607.

As described above, the brightness Lx for each target block obtained from the maximum luminance value MaxTAR and minimum luminance value MinTAR is supplied to the noise model memory 607 as a noise model for selection according to brightness. Thus, which noise model to use is defined by the brightness Lx.

Also, the luminance data Ytg of the target data TGv via the low-pass filter 601 is supplied to the noise model memory 607, and a noise standard deviation $\sigma Y$ defined by the brightness Lx and luminance data Ytg is obtained from the noise model memory 607. The noise standard deviation $\sigma Y$ is supplied to the addition rate transform output units 608 and 609.

Further, the hit rate $\beta$ from the motion vector computing unit 15 and the external gain GA are supplied to the addition rate transform output units 608 and 609.

The addition rate transform output unit 608 uses a transform function wherein the pixel absolute value of difference $\Delta P \times Y$, the noise standard deviation $\sigma Y$, the hit rate $\beta$, and the gain GA serve as transform parameters, and the adding rate $\alpha YA$ based on the pixel absolute value of difference $\Delta P \times Y$ is output.

Also, the addition rate transform output unit 609 uses a transform function wherein the average absolute value of difference $\Delta MeY$, the noise standard deviation $\sigma Y$, the hit rate $\beta$, and the gain GA serve as transform parameters, and the adding rate $\alpha YB$ based on the average absolute value of difference $\Delta MeY$ is output.

The addition rate transform output units 608 and 609 basically define the adding rate $\alpha$ from the noise standard deviation $\sigma$ and the difference value. Note that at the addition rate transform output units 608 and 609, the noise standard deviation $\sigma$ is the noise standard deviation $\sigma Y$ from the noise model memory 607, and the difference value is the pixel absolute value of difference $\Delta P \times Y$ and the average absolute value of difference $\Delta MeY$. The output adding rate $\alpha$ is the adding rate $\alpha YA$ and $\alpha YB$.

Figure 33:
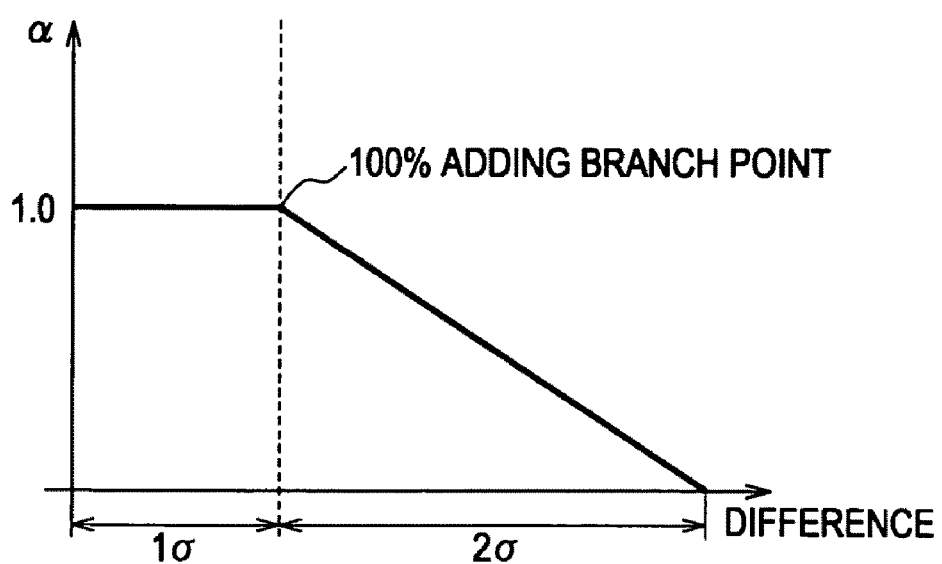
FIG. 33 is a diagram used to describe a configuration example of one example of an addition rate calculating unit according to an embodiment of the present invention.

According to the present embodiment, as shown in FIG. 33, when the difference value is at a predetermined first threshold or lower that can be set as a multiple of the noise standard deviation $\sigma$, the frame is assumed to be a background image portion, and the adding rate $\alpha$ is $\alpha=1$ which is the maximum value.

When the difference value is in the range of (first threshold<difference value<second threshold), the frame is assumed to be a portion indeterminate whether background portion or moving subject portion, and as shown in FIG. 33, the adding rate $\alpha$ becomes linearly smaller as the difference value becomes greater. In the range of (difference value$\leqq$second threshold), the frame is determined to be a moving subject portion, and adding rate $\alpha$ is $\alpha=0$ which is the minimum value.

When the background matching degree of the target block is unknown, as described above in order to reduce situations such as double exposure in a moving subject portion, the first threshold is considered to be a value exceeding safety, and the adding rate $\alpha$ is suppressed entirely. That is to say, if the frame is clearly a background image portion, the first threshold and second threshold are set as large values, and image adding can be performed with as great an adding rate as possible.

However, when the background matching degree of the target block is unknown, reducing situations such as double exposure at the moving subject portions should be considered for all of the target blocks. Therefore, normally, as shown in the example in FIG. 33, the first threshold is one time the standard deviation $\sigma$ (1$\sigma$), and the second threshold is three times the standard deviation (3$\sigma$).

Conversely, according to the present embodiment, as described above, the background matching degree is computed for each target block as the hit rate $\beta$ which is the indicator value thereof. Accordingly, by using the background matching degree indicator value $\beta$, the background still image portions can be added with a greater adding rate.

Figure 34:
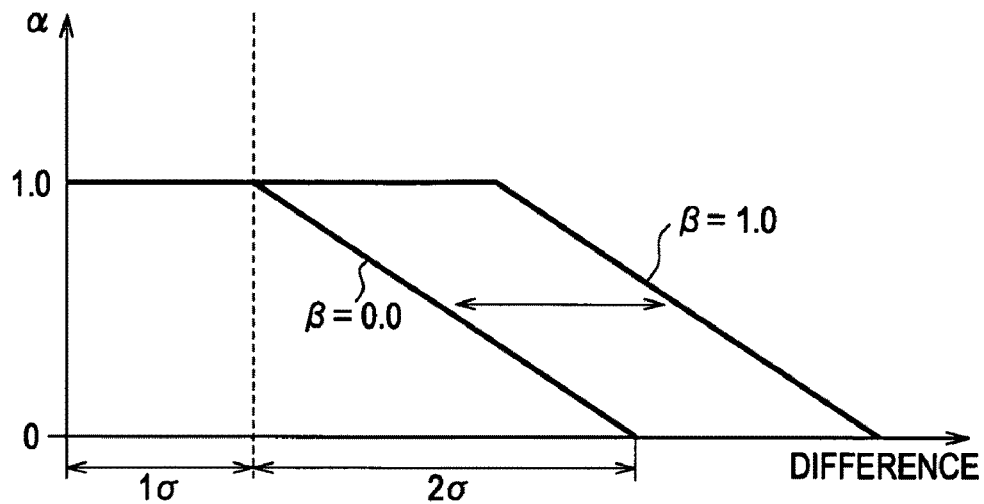
FIG. 34 is a diagram used to describe a configuration example of one example of an addition rate calculating unit according to an embodiment of the present invention.

The addition rate transform output features of the addition rate transform output units 608 and 609 in the case of considering the hit rate $\beta$ are shown in FIG. 34.

That is to say, in the example in FIG. 34, the first threshold as to the difference value is modified according to the hit rate $\beta$. That is to say, when the hit rate $\beta$ is the minimum and $\beta=0$ (moving subject portion), similar to the case in FIG. 33, the first threshold is set to one time the standard deviation $\sigma$ (1$\sigma$). When the hit rate $\beta$ is $\beta>0$, the first threshold is modified to a greater value according to the value of the hit rate $\beta$.

In the example in FIG. 34, the slope of the decrescent line of the adding rate $\alpha$ from the time that the difference value has become greater than the first threshold is fixed to a constant.

Accordingly, in the example in FIG. 34, the second threshold is automatically modified according to the modification of the first threshold.

Figure 35:
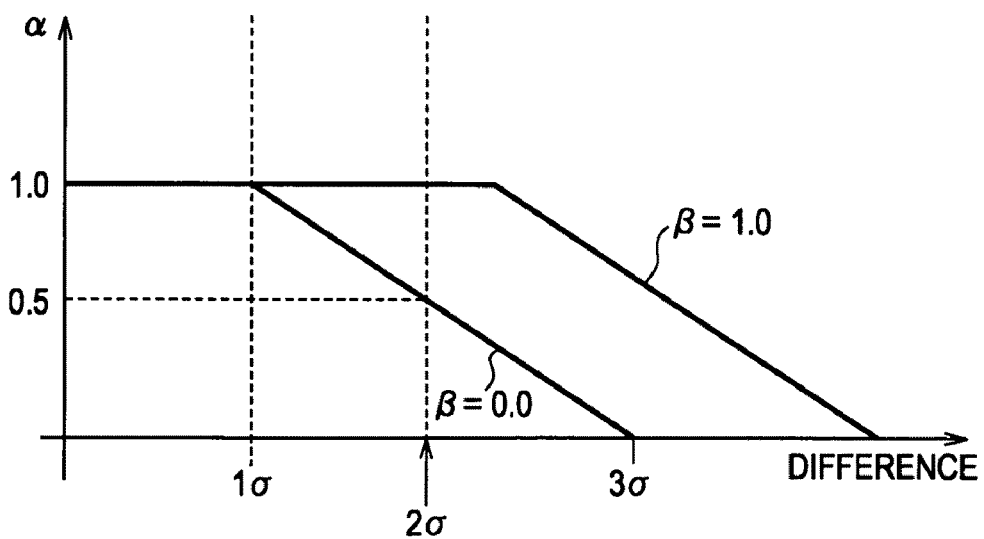
FIG. 35 is a diagram used to describe a configuration example of one example of an addition rate calculating unit according to an embodiment of the present invention.

For example, as shown in FIG. 35, in the case of the example in FIG. 33 that does not take the hit rate β into consideration (β=0), when the difference value is 2σ, the adding rate α is constantly 0.5. Conversely, in the case that takes the hit rate β into consideration, as shown in FIG. 35, at a background still image portion where the hit rate β=1.0, the adding rate α is α=1, and adding is performed with the maximum adding rate.

Thus, at a background still image portion, a greater adding rate α is set according to the hit rate β, and the desired noise reduction effects are obtained. Also, at the moving subject portion, the adding rate α is suppressed so as to be low according to the hit rate β, whereby the effect of reducing the state of double exposure can be maintained.

Note that with the above-described example, only the first threshold is modified according to the hit rate β, the slope of the decrescent line of the adding rate α from the time that the difference value has become greater than the first threshold is fixed to a constant, but the second threshold can also be modified according to the hit rate so as to modify the slope of the decrescent line.

Next, the contribution of the gain GA at the addition rate transform output units 608 and 609 will be described. The gain GA is a parameter for further modification control of the adding rate α computed as above. As described above, the gain GA herein is set by the user or set according to the image brightness according to shooting conditions. For example in the case of setting by the user, in the case of obtaining a greater noise reduction effect with NR addition, the gain GA is set to be greater. The adding rate α computed as described above is subjected to modification control to the value according to the gain GA.

FIG. 36 shows the relation between the gain GA, hit rate β, and adding rate α at the addition rate transform output units 608 and 609. FIG. 36 shows the adding rate α as a value based on a standard adding rate α=0, with the adding rate in the case of the hit rate β=0 as the standard adding rate α=0.

In the example in FIG. 36, the gain GA can be set to be modified to the four levels of GA=0, GA=1, GA=2, and GA=3 by the user or by shooting conditions. The hit rate β is also set to four levels of β=0, β=0.25, β=0.5, and β=1.0.

The adding rate α is the coefficient K times the standard adding rate α0 (K≧1), and the coefficient K is a multiple according to a combination of the gain GA and hit rate β.

Thus, with the addition rate transform output unit 608, an output adding rate αYA based on the pixel difference of the luminance component is output from the pixel absolute value of difference ΔP×Y, noise standard deviation σY, hit rate β, and gain GA. Also with the addition rate transform output unit 608, an output adding rate αYB based on the average difference of the luminance component is output from the average absolute value of difference ΔMeY, noise standard deviation σY, hit rate β, and gain GA.

The average difference is not calculated for the color difference signal component, and only the pixel absolute value of difference is calculated, and similar to the above-described luminance component, an adding rate based on the color difference component is computed.

FIG. 31 is the processing portion for the color difference component in the adding rate calculating unit 24. The adding rage calculating processing for the color difference components will be described with reference to FIG. 31.

That is to say, the blue color difference data Cbtg from among the target image data TGv is supplied to the absolute-value-of-difference computing unit 623 via the low-pass filter 621. Also, the blue color difference data Cbmc from among the motion compensation image data MCv is supplied to the absolute-value-of-difference calculating unit 623 via the low-pass filter 622. The absolute-value-of-difference calculating unit 623 computes a pixel absolute value of difference ΔP×Cb of the color difference data Cbtg and color difference data Cbmc for each pixel, and the computed pixel difference absolute difference ΔP×Cb is supplied to the addition rate transform output unit 625.

Similar to the case of the luminance component, a noise model memory 624 for the blue color difference component o the pixel value is provided, and the noise standard deviation σ as to the blue color difference component value of the pixel value is computed beforehand and stored in the noise model memory 624. Similar to the case of the luminance component, multiple noise models according to the brightness Lx of the image is stored in the noise model memory 624.

The brightness Lx for each target block and the color difference data Cbtg of the target image data TGv via the low-pass filter 621 are supplied to the noise model memory 624. Thus, a noise standard deviation σCb that is defined by the brightness Lx and color difference data Cbtg is obtained from the noise model memory 624, and supplied to the addition rate transform output unit 625.

Further, the hit rate β from the motion vector computing unit 21 and an external gain GA are supplied to the addition rate transform output unit 625.

The addition rate transform output unit 625 has a configuration similar to the above-described addition rate transform output units 608 and 609, from which is obtained an adding rate αCb defined by a combination of the pixel absolute value of difference ΔP×Cb, noise standard deviation σCb, hit rate β, and gain GA.

Similarly, the red color difference data Crtg from among the target image data TGv is supplies to a absolute-value-of-difference calculating unit 633 via the low-pass filter 631. Also, the red difference data Crmc from among the motion compensation image data MCv is supplied to the absolute-value-of-difference calculating unit 633 via the low-pass filter 632. The absolute-value-of-difference calculating unit 633 computes a pixel absolute value of difference ΔP×Cr of the color difference data Crtg and color difference data Crmc for each pixel, and supplies the computed pixel absolute value of difference ΔP×Cr to the addition rate transform output unit 635.

Similar to the case of the luminance component, a noise model memory 634 for the red color difference component of the pixel value is provided, similar to the case of the luminance component, and a noise standard deviation σ as to the red color difference component value of the pixel value is computed beforehand and stored in the noise model memory 634. Similar to the case of the luminance component, multiple noise models according to the brightness Lx of the image are stored in the noise model memory 634.

The brightness Lx for each target block and the color difference data Crtg of the target image data TGv via the low-pass filter 631 is supplied to the noise model memory 634. Thus, a noise standard deviation σCr that is defined by the brightness Lx and color difference data Crtg is obtained from the noise model memory 634 and supplied to the addition rate transform output unit 635.

Further, the hit rate β from the motion vector computing unit 21 and the external gain GA are supplied to the addition rate transform output unit 635.

The addition rate transform output unit 635 has a similar configuration to the above-described addition rate transform output units 608 and 609, from which is obtained an adding rate αCr that is defined by a combination of the pixel absolute value of difference ΔP×Cr, the noise standard deviation σCr, hit rate β, and gain GA.

Also, according to the present embodiment, the adding rate is obtained based also on the pixel dispersion value of the target image. The dispersion value is obtained for the pixel of interest (free pixel) and for example eight pixels in the periphery near thereof. A dispersion value is obtained for each of the luminance component and color difference component. The adding rate is computed from all of the obtained dispersion values.

That is to say, as shown in FIG. 30, the luminance data Ytg of the target block image data TGv is supplied to the spatial dispersion filter 610 via the low-pass filter 601. From this spatial dispersion filter 610, a dispersion value VaY is obtained for the pixel of interest (free pixel) and for example 8 pixels in the periphery near thereof, for a total of 9 pixels.

Also, as shown in FIG. 31, the blue color data Cbtg of the image data TGv of the target block is supplied to the spatial dispersion filter 626 via the low-pass filter 621. From this spatial dispersion filter 626, a dispersion value VaCb is obtained for the pixel of interest (free pixel) and for example 8 pixels in the periphery near thereof, for a total of 9 pixels.

Further, the red color difference data Crtg of the target block image data TGv is supplies to the spatial dispersion filter 636 via the low-pass filter 631. From this spatial dispersion filter 636, a dispersion value VaCr is obtained for the pixel of interest (free pixel) and for example 8 pixels in the periphery near thereof, for a total of 9 pixels.

The dispersion values Vay, VaCb, and VaCr are supplied to the addition rate transform output unit 612 after being added at the adding unit 611, as shown in FIG. 30. Further, the hit rate β from the motion vector computing unit 15 and the external gain GA are supplied to the addition rate transform output unit 612.

An adding rate αC obtained with the addition rate transform output unit 612 is to suppress the adding rate in the case that the target block image has few texture components and the brightness level change is smooth (in the case of gradation). With image processing divided into blocks as with the present embodiment, block borders becomes highly conspicuous to the human eye, and even more so in the case that the brightness level change is smooth.

In order to realize the above, basically, the adding rate is lowered as the dispersion value within the blocks is lowered. At the adding rate transform output unit 612 of the present embodiment, the dispersion value is taken as the horizontal axis, while the dispersion value is divided into several levels by predetermined level width, and the output adding rates are determined according to the dispersion value for each level, as shown in FIG. 37A.

In the example in FIG. 37A, the dispersion values are divided into five levels for every level width 8, whereby the adding rate as to the dispersion values 0 through 7 is set to 0.0, the adding rate as to the dispersion values 8 through 15 is set to 0.25, the adding rate as to the dispersion values through 23 is set to 0.5, the adding rate as to the dispersion values 24 through 31 is set to 0.75, and the adding rate as to the dispersion values 32 and greater is set to 1.0.

Now, in the case of layering images, the block borders become noticeable as described above, because there are differences in the layered images. In other words, the background still image portions have no difference in the layered images, so the adding rates according to dispersion value do not have to be suppressed.

Thus, according to the present embodiment, with the addition rate transform output unit 612, the level widths of the dispersion values are controlled according to the hit rate β, and the greater the hit rate β is, the smaller the level width of the dispersion value is. Thus, for the background still image portion, reduction of the adding rate according to the dispersion value is suppressed, and addition is performed with as high an adding rate as possible.

That is to say, in the example in FIGS. 37A through 37C, when the hit rate β is a low value such as β=0, for example, the level width of the dispersion value is "8" as shown in FIG. 37A. When the hit rate β is a value such as β=0.5, for example, the level width of the dispersion value is "4" as shown in FIG. 37B.

Further, when the hit rate β is β=1 showing that the frame is a background still image portion, the level width of the dispersion value is "0" as shown in FIG. 37C. That is to say, at this time, reduction of the adding rate by the dispersion value is not performed.

As described above, the gain GA is supplied to the addition rate transform output unit 612, enabling control of the output adding rate by the gain GA. In the case of this example, the level widths of the dispersion values are subject to modification control by the gain GA and by combinations with the hit rate β.

FIG. 38 shows the relation between the gain GA, hit rate β, and level width at the addition rate transform output unit 612. In the example in FIG. 38 also, the gain GA can be set to be modified to the four levels of GA=0, GA=1, GA=2, and GA=3 by the user or by shooting conditions. The hit rate β is set to the four levels of β=0, β=0.25, β=0.5, β=1.0.

Note that the example in FIG. 38 is configured so that the level widths can be realized by bit shift computation.

Note that as shown in FIGS. 37A through 37C, according to the present embodiment, in the event of computing the adding rate using a dispersion value, the configuration enables setting multiple levels using the level widths for the dispersion value, but a configuration may be used wherein multiple levels are not used; rather linear interpolation is performed between multiple levels. Also, two-dimensional curve interpolation or three-dimensional curve interpolation may be performed instead of linear interpolation.

Thus, with the addition rate transform output units 608, 609, 612, 625, and 635, adding rates αYA, αYB, αC, αCb, αCr are computed according to luminance difference value, color difference value, luminance average difference value, dispersion value, as well as values according to the hit rate β.

According to the present embodiment, the adding rates αYA, αYB, αC, αCb, αCr are synthesized, whereby the output adding rate α of the adding rate calculating unit 21 is obtained. That is to say, as shown in FIG. 30, the adding rates αYA and αYB from the addition rate transform output unit 608 and 609 are multiplied with the multiplier 613 and the multiplication result thereof is supplied to the multiplier 614. The adding rate αCb from the addition rate transform output unit 625 is supplied to the multiplier 614, and multiplied with the multiplication results of the multiplier 613.

The multiplication result of the multiplier 614 is supplied to the multiplier 615. The adding rate αCr is supplied from the addition rate transform output unit 635 to the multiplier 615, and is multiplied with the multiplication results of the multiplier 614. Also, the multiplication result of the multiplier 615 is supplied to the multiplier 616. The adding rate αC from the addition rate transform output unit 612 is supplied to the multiplier 616, and multiplied with the multiplication result of the multiplier 615.

Thus, multiplication results wherein all of the computed adding rates αYA, αYB, αC, αCb, αCr have been multiplied is obtained from the multiplier 616, and this is output as the output adding rate α of the adding rate calculating unit 24.

Thus, the adding rate α as a value according to the hit rate β is computed in pixel increments from the adding rate calculating unit 24, and supplied to the adding unit 23.

The target block image data TGv and the motion compensation block image data MCv are added in pixel increments, according to adding rate α for each pixel from the adding rate calculating unit 24. The adding image data from the adding unit 23 is recorded in the recording/playing apparatus unit 5, via the image memory unit 4 and still image codec unit 16.

ADVANTAGES OF THE EMBODIMENT

According to the above-described embodiment, a hit rate β which is an indicator value of background matching degrees for each target block is used, and the adding rate α can be increased at the still image portion, whereby a significant advantage can be obtained in that an image having a great noise reduction effect can be obtained.

Also, with the moving subject portion, the adding rate α is reduced so as to not be added, whereby situations wherein the moving portion have a state such as double exposure is reduced.

Now, according to the present embodiment, one of the multiple image frames to be added is set to have a strong noise reduction strength of the intra-screen NR, whereby the detail portion of the signal component may be lost with the one image frame.

However, according to the present embodiment, with the intra-screen NR processing unit 14, the noise reduction strength of the intra-screen NR of the second image frame and thereafter are set to be weak, whereby the signal component in the second image frame and thereafter is less likely to be lost.

At the adding NRT processing unit 20, the second image frame and thereafter, wherein the signal component is less likely to be lost, is added to the first image frame whereby the signal components can be restored.

Particularly, according to the present embodiment, the still image portion is added with a large adding rate α, thereby having a favorable image state from the restoration of the signal components. Also, noise reduction advantages in the temporal direction by the image adding are favorably obtained.

On the other hand, the moving subject portion has a small adding rate, whereby the restoration of the signal components and the noise reduction in the temporal direction are reduced, but since this is a moving portion, there is the advantage that deterioration of the signal component is not noticeable. The noise reduction effect at the intra-screen NR processing unit 14 as to the first image frame is great, so there is less noise. That is to say, the advantage can be obtained wherein images such as double exposure can be reduced, while image data of the moving subject portion having less noise can be obtained.

The advantages of the present embodiment will be further described. As described above, multiple-sheet adding NR processing performs position matching of the two images of the standard image (target image) and reference image, and evaluation of the difference value of the image having position matched the standard image and reference image, as a correlation value, is performed.

As shown in FIGS. 33 through 35, if the evaluation value is 1σ the average is added 100%, and if between 1σ and 3σ the adding rate of the position matched image is changed to 0 through 99% and adding averages are performed.

With the multiple-sheet adding NR processing, unlike the intra-screen NR processing, the pixels of the same pixel positions with a shifted time axis are averaged. Accordingly, if a still region, the edge portions of the image (reference image) that is position-matched with the standard image comes to the same phases, whereby even if pixel averaging is performed the edge portions are not blurred. In other words, there is little deterioration of the signal components.

Also, in the case of a moving subject region, the correlation value of the evaluation value is not within 3σ, whereby averaging processing is not performed, the edges do not blur or become transparent. This is a feature of the multiple-sheet image adding NR processing of the embodiment.

In the case that multiple-sheet image adding is performed with the intra-screen NR processing as before where the threshold θth is uniformly 3σ, the noise component can obtain a noise reduction effect of 3σ+δ (δ is the noise reduction effect in the multiple-sheet adding NR processing).

Figure 45:
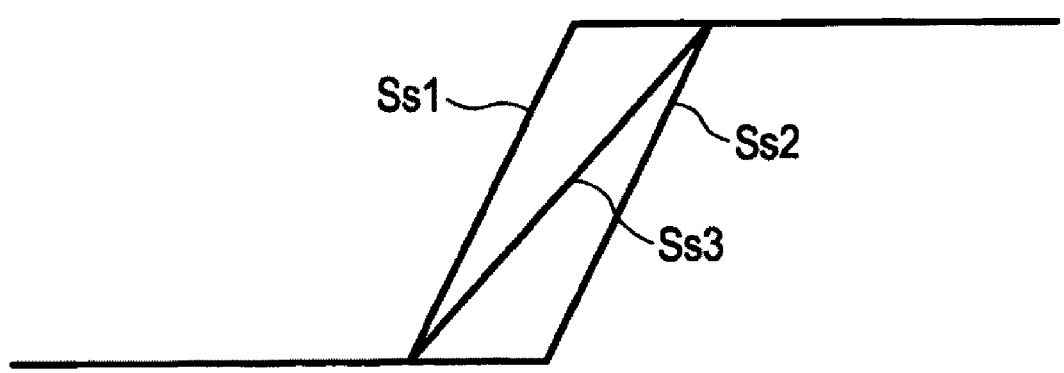
FIG. 45 is a diagram to describe the relation between signal deterioration by the screen NR processing and addition NR processing.

However, with the multiple input images to be added, the edge components for all of the signals are blurring in the same way, and therefore are not restored. Further, as shown in FIG. 45, in the case that position-matching of the images with one another is not performed in pixel increments with the adding NR processing unit 20, the edge components of the signal can blur even further.

On the other hand, in the case that the threshold θth of the intra-screen NR processing is uniformly 1σ, the edge components of the signal are not saved, and the noise components can only obtain a noise reduction effect of 1σ+δ.

Conversely, according to the above-described embodiment, even the signal components that have blurred with the first frame of the intra-screen NR can be restored from this feature, by performing adding averages of the signal components of the second of the multiple image frames and thereafter to be added.

Also, by setting the threshold θth in the first frame of the intra-screen NR processing to 3σ and setting the threshold θth in other images of the intra-screen NR processing to 1σ, the noise components can obtain a noise reduction effect of 3σ+δ.

That is to say, with a still image region the edge components of the signal components remain and a high noise reduction effect is obtained, and even with a moving subject range an image can be obtained which has a 3σ noise reduction effect that is the same as one capture normally.

Other Embodiment and Modified Example

In the case of performing adding NR processing for the still image, there may be various examples such as how to set selection of the target image and reference images, or in what sequence to layer the images.

In the case of layering multiple images, an image that becomes the standard for motion detection has to be selected. With the above-described embodiment, the image at the moment of the shutter being closed is the image desired by the user, whereby the first imaged image is set to be the standard image. That is to say, the user releases the shutter, and using an image shot later in time, performs layering as to the first image that is shot.

The above-described adding method sets the NR image as a result of layering the target image and reference image to be the next target image, and in the second image layering and thereafter, the target image becomes an image that has been subjected to constant NR processing. This adding method is called a target adding method.

Figure 39:
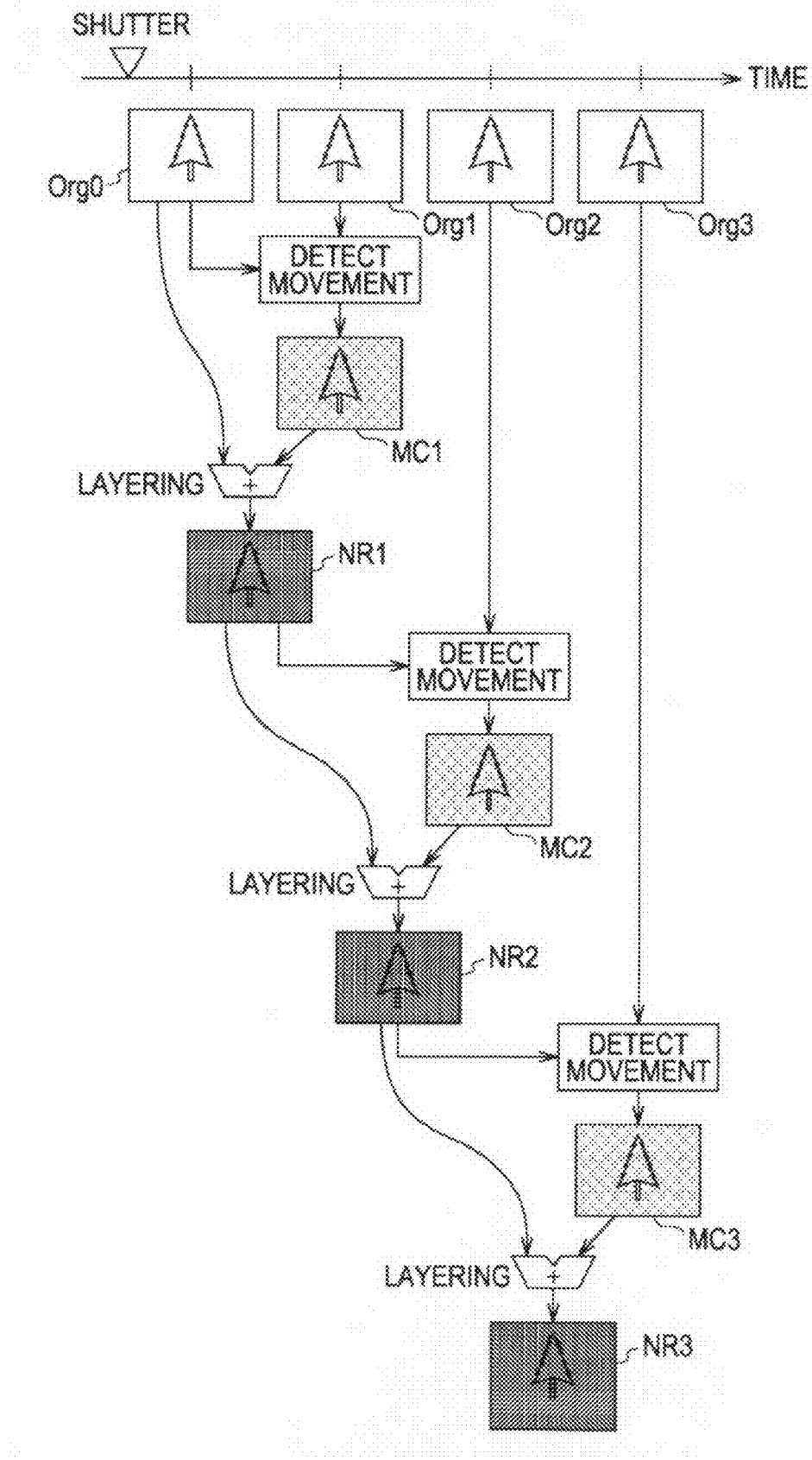
FIG. 39 is a diagram describing an example of multiple-image adding processing with the addition unit according to an embodiment of the present invention.

The image diagram of image layering of the target adding method is shown in FIG. 39, as an example of shooting four images at high-speed continuous shooting.

Let us say that the shot images are, in sequence temporally from the point-in-time of pressing the shutter, Org0, Org1, Org2, and Org3. As shown in FIG. 39, first the shot image Org0 is the target image and the shot image Org1 is the reference image, and a motion compensation image MC1 is created. The shot image Org0 and motion compensation image MC1 are layered to create an adding NR image NR1.

Next, the adding NR image NR1 is the target image and the shot image Org2 is the reference image, thereby creating a motion compensation image MC2. The adding NR image NR1 and motion compensation image MC2 are layered to create an adding NR image NR2.

Next, the adding NR image NR2 is the target image and the shot image Org3 is the reference image, thereby creating a motion compensation image MC3. The adding NR image NR2 and motion compensation image MC3 are layered to create an adding NR image NR3, wherein the four images are ultimately synthesized into one image.

Beside the target adding method wherein the target image is constantly the adding NR image as described above, there is a reference adding method whereby the reference image is constantly the adding NR image, and the present invention can also be applied to the reference adding method.

Figure 40:
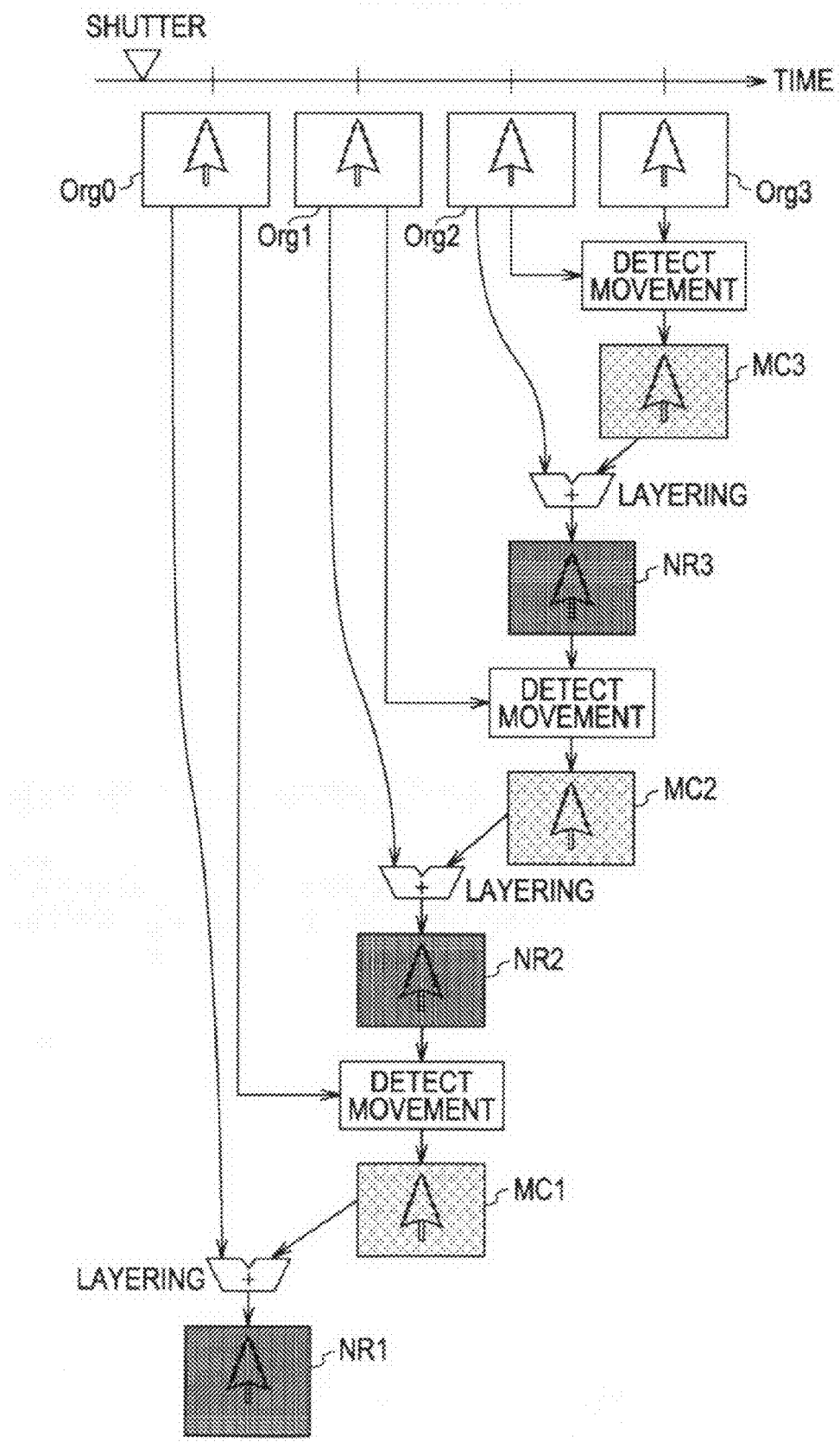
FIG. 40 is a diagram describing another example of multiple-image adding processing with the addition unit according to an embodiment of the present invention.
Figure 42:
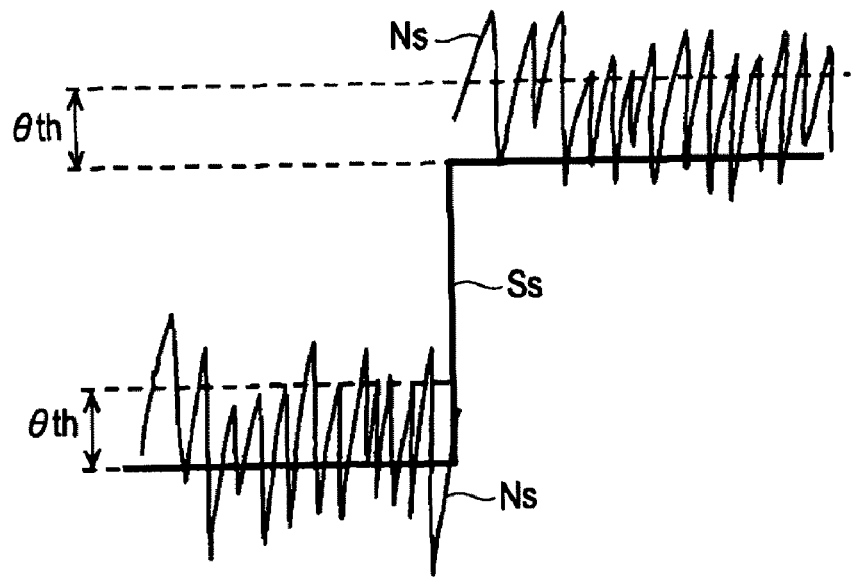
FIG. 42 is a diagram to describe the relation between noise reduction strength in the intra-screen NR processing and noise reduction and signal component elimination.
Figure 43:
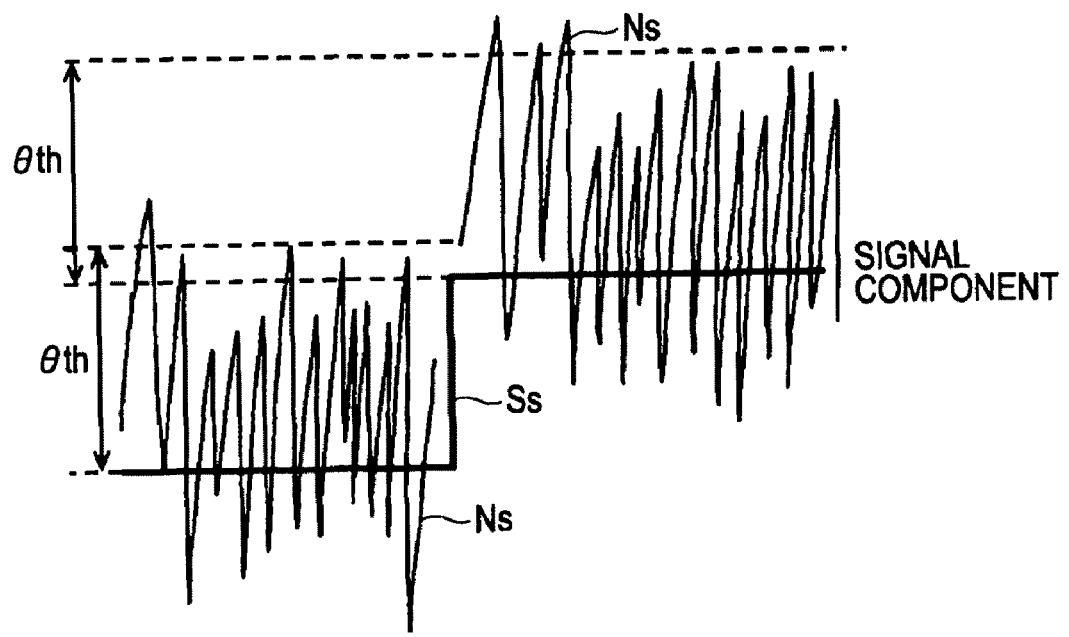
FIG. 43 is a diagram to describe the relation between noise reduction strength in the intra-screen NR processing and noise reduction and signal component elimination.
Figure 44:
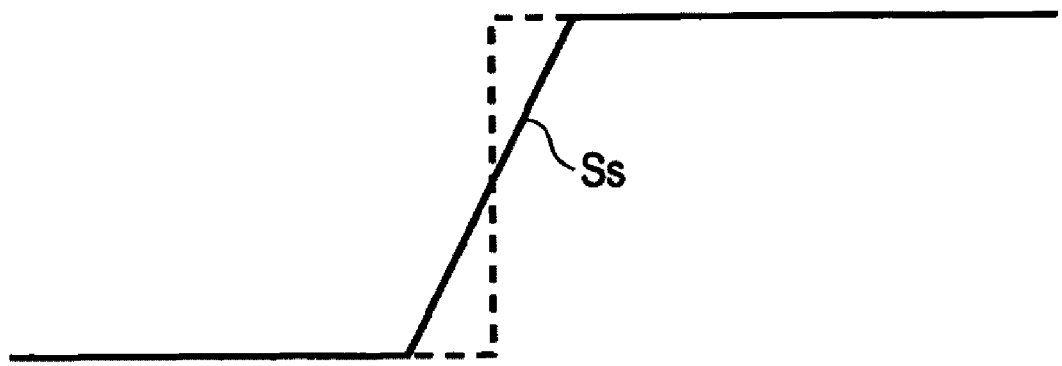
FIG. 44 is a diagram to describe signal deterioration by the screen NR processing.

Similar to the case in FIG. 39, FIG. 40 shows an image diagram of a reference adding method, exemplifying shooting four images with high-speed continuous shooting.

First, the imaged image Org2 is set to be the target image, the imaged image Org3 as the reference image, and a motion compensation image MC3 is created. The imaged image Org2 and motion compensation image MC3 are layered together to create the adding NR image NR3.

Next, the imaged image Org1 is set to be the target image, the adding NR image NR3 as the reference image, and a motion compensation image MC2 is created. The imaged image Org2 and adding NR image NR3 are layered together to create the adding NR image NR2.

Next, the imaged image Org0 is set to be the target image, the adding NR image NR2 as the reference image, and a motion compensation image MC1 is created. The imaged image Org0 and motion compensation image MC1 are layered together to create the adding NR image NR1. The adding NR image NR1 becomes the final one synthesized NR image.

Even in the case of the reference adding method, strengthening the noise reduction strength of the intra-screen NR for the first imaged image Org0, and weakening the noise reduction strength of the intra-screen NR for the other imaged images Org1, Org2, and Org3 will be favorable.

Note that as in the above example, when the noise reduction strength of the intra-screen NR for the first imaged image frame from among the multiple imaging frames subjected to adding NR processing is strengthened, a most favorable effect can be obtained.

However, according to the present invention, the noise reduction strength of the intra-screen NR processing is changeable, and the lost signal components can be restored by adding the image frame wherein signal components still remain from the weak intra-screen NR as to the image frame wherein strong intra-screen NR has been performed and signal components lost. Accordingly, control of the noise reduction strength of the intra-screen NR for the multiple imaging frames to be added is not limited to the above-described example.

That is to say, the image frame with strong noise reduction strength of the intra-screen NR processing may be not just one frame, but may be an option number such as two frames, three frames, etc. Also, the image frame with strong noise reduction strength may be not just one frame, but may be multiple image frames, such as handling the second frame in the same way.

Also, the noise reduction strength of the intra-screen NR processing may be not just two levels as in the above-described example, but may be three or more levels, such as maximum strength, medium strength, minimum strength, and so forth. In this case, which frame to have which noise reduction strength is also optional as in the above. Note that a setting state wherein the noise reduction strength is weak may include a case wherein intra-screen NR processing is not performed.

Also, the above-described embodiment illustrates a case at the time of imaging a still image, but the present invention can be applied to the time of imaging a moving image. For example, at the time of starting to shoot a moving image, the noise reduction strength of the intra-NR processing is strengthened, and the noise reduction strength of the intra-screen NR processing is otherwise weakened. Also, in the case of once recorded moving image data, a scene change position is detected, and settings can be made such that the noise reduction strength of the intra-screen NR processing can be strengthened at the scene change position, and the noise reduction strength of the intra-screen NR processing is otherwise weakened.

Note that according to the above-described embodiment, the adding NR processing is performed for YC data, but the intra-screen NR processing is performed as to RAW signals, whereby the present invention is applicable even in a case of performing adding NR processing as to the RAW image signals.

Note that the above-described embodiment illustrates a case wherein the image processing apparatus is an imaging apparatus, but it goes without saying that the image processing apparatus to which the present invention can be applied is not restricted to an imaging apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   image adding means to perform noise reduction processing in a spatial direction by adding a plurality of images while performing motion compensation;
   intra-screen noise reducing means to perform noise reduction processing in the spatial direction within one image for each of said plurality of images, before said adding with said image adding means;
   control means to vary noise reduction strength in said spatial direction by said intra-screen noise reducing means as to a plurality of images to be added with said image adding means; and
   determining means to determine for each of said images whether a portion thereof is a background portion with no movement or a moving portion,
   wherein said image adding means performs said image adding with an adding rate different from said background portion and said moving portion, so that the adding rate of the image is as great as that of said background portion, in accordance with determination results from said determining means.

2. The image processing apparatus according to claim 1, wherein said plurality of images are imaged images obtained by imaging with an imaging device; and wherein said control means control said intra-screen noise reduction means so that the noise reduction strength in said spatial direction as to at least one imaged image from among a plurality of imaged images added with said image adding processing means is stronger than other imaged images.

3. An image processing apparatus comprising:

image adding means to perform noise reduction processing in a spatial direction by adding a plurality of images while performing motion compensation;

intra-screen noise reducing means to perform noise reduction processing in the spatial direction within one image for each of said plurality of images, before said adding with said image adding means; and control means to vary noise reduction strength in said spatial direction by said intra-screen noise reducing means as to a plurality of images to be added with said image adding means, wherein said image adding means add said plurality of images in increments of pixels, and in accordance with the difference between the pixels being added together, performs said image adding so that the adding rate of said image becomes greater as said difference becomes smaller.

4. The image processing apparatus according to claims 1 or 3, wherein a changeable range of the noise reduction strength in said spatial direction includes not performing noise reduction in said spatial direction.

5. An image processing method for an image processing apparatus having image adding means, intra-screen noise reducing means, control means, and determining means, said method comprising the steps of:

said image adding means performing noise reduction processing in a spatial direction by adding a plurality of images while performing motion compensation;

said intra-screen noise reducing means performing noise reduction processing in the spatial direction within one image for each of said plurality of images, before said adding with said image adding means, in accordance with control instructions from said control means to vary the noise reduction strength in said spatial direction as to a plurality of images to be added in said adding of images; and said determining means determining for each of said images whether a portion thereof is a background portion with no movement or a moving portion, wherein said image adding means performs said image adding with an adding rate different from said background portion and said moving portion, so that the adding rate of the image is as great as that of said background portion, in accordance with determination results from said determining means.

6. The image processing method according to claim 5, wherein said plurality of images are imaged images obtained by imaging with an imaging device;

and wherein said control means control said intra-screen noise reduction means so that in said intra-screen noise reduction, the noise reduction strength in said spatial direction as to at least one imaged image from among the plurality of imaged images added with said image adding processing means becomes stronger than that of the other imaged images.

7. An imaging apparatus comprising:

an imaging device;

intra-screen noise reduction means to perform noise reduction processing in a spatial direction within one imaged image, said imaged image obtained by imaging with said imaging device;

image adding means to perform noise reduction processing in the spatial direction by adding a plurality of said imaged images subjected to said noise reduction processing with said intra-screen noise reduction means, while performing motion compensation;

control means to vary of noise reduction strength in said spatial direction by said intra-screen noise reduction means as to a plurality of images to be added with said image adding processing means;

determining means to determine for each of said images whether a portion thereof is a background portion with no movement or a moving portion; and recording means to record the image that is a result of adding with said image adding processing means in a recording medium, wherein said image adding means performs said image adding with an adding rate different from said background portion and said moving portion, so that the adding rate of the image is as great as that of said background portion, in accordance with determination results from said determining means.

8. An image processing apparatus comprising:

an image adding unit to perform noise reduction processing in a spatial direction by adding a plurality of images while performing motion compensation;

an intra-screen noise reducing unit to perform noise reduction processing in the spatial direction within one image for each of said plurality of images, before said adding with said image adding unit;

a control unit to vary noise reduction strength in said spatial direction by said intra-screen noise reducing unit as to a plurality of images to be added with said image adding unit; and a determining unit to determine for each of said images whether a portion thereof is a background portion with no movement or a moving portion, wherein said image adding unit performs said image adding with an adding rate different from said background portion and said moving portion, so that the adding rate of the image is as great as that of said background portion, in accordance with determination results from said determining unit.

9. An image processing method for an image processing apparatus having an image adding unit, an intra-screen noise reducing unit, a control unit, and a determining unit, said method comprising the steps of:

said image adding unit performing noise reduction processing in a spatial direction by adding a plurality of images while performing motion compensation;

said intra-screen noise reducing unit performing noise reduction processing in the spatial direction within one image for each of said plurality of images, before said adding with said image adding unit, in accordance with control instructions from said control unit to vary noise reduction strength in said spatial direction as to a plurality of images to be added in said adding of images; and said determining means determining for each of said images whether a portion thereof is a background portion with no movement or a moving portion, wherein said image adding unit performs said image adding with an adding rate different from said background portion and said moving portion, so that the adding rate of the image is as great as that of said background portion, in accordance with determination results from said determining unit.

10. An imaging apparatus comprising:

an imaging device;

an intra-screen noise reduction unit to perform noise reduction processing in a spatial direction within one imaged image, said imaged image obtained by imaging with said imaging device;

an image adding unit to perform noise reduction processing in the spatial direction by adding a plurality of said imaged images subjected to said noise reduction processing with said intra-screen noise reduction unit, while performing motion compensation;

a control unit to vary noise reduction strength in said spatial direction by said intra-screen noise reduction unit as to a plurality of images to be added with said image adding processing unit;

a determining unit to determine for each of said images whether a portion thereof is a background portion with no movement or a moving portion; and a recording unit to record the image that is a result of adding with said image adding processing unit in a recording medium, wherein said image adding unit performs said image adding with an adding rate different from said background portion and said moving portion, so that the adding rate of the image is as great as that of said background portion, in accordance with determination results from said determining unit.

* * * * *